United States Patent
Rosen et al.

(10) Patent No.: US 11,209,588 B2
(45) Date of Patent: *Dec. 28, 2021

(54) TECHNIQUES FOR ENHANCED DIFFUSION LIGHTING

(71) Applicant: Resilience Magnum IP, LLC, Cleveland, OH (US)

(72) Inventors: Steven Rosen, Hunting Valley, OH (US); Ronald Cozean, Madison, CT (US); Eric Allen, Long Beach, CA (US); David Edward Mordetzky, Oak Park, CA (US); Megan Horvath, Cleveland, OH (US); Anthony John Pyros, Cleveland, OH (US); John Elwood, Santa Ana, CA (US); Michael Chang, Long Beach, CA (US); Elie Attarian, Chatsworth, CA (US)

(73) Assignee: Resilience Magnum IP, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,929

(22) Filed: Oct. 5, 2020

(65) Prior Publication Data

US 2021/0018673 A1 Jan. 21, 2021

Related U.S. Application Data

(63) Continuation of application No. 16/544,023, filed on Aug. 19, 2019, now Pat. No. 10,809,443, which is a
(Continued)

(51) Int. Cl.
*F21V 8/00* (2006.01)
*G02B 3/00* (2006.01)
(Continued)

(52) U.S. Cl.
CPC ............ *G02B 6/0051* (2013.01); *F21K 9/232* (2016.08); *F21V 3/04* (2013.01); *F21V 23/0457* (2013.01);
(Continued)

(58) Field of Classification Search
CPC .. G02B 6/0051; G02B 6/0053; G02B 3/0006; G02B 5/0278; G02B 5/0226;
(Continued)

(56) References Cited

U.S. PATENT DOCUMENTS

| 6,147,624 A | 11/2000 | Clapper |
| 6,236,303 B1 | 5/2001 | Wagner et al. |

(Continued)

FOREIGN PATENT DOCUMENTS

| CN | 105371177 A | 3/2016 |
| CN | 105959380 A | 9/2016 |

OTHER PUBLICATIONS

Final Office Action received for U.S. Appl. No. 16/682,085 dated Oct. 28, 2020, 27 pages.
(Continued)

*Primary Examiner* — Donald L Raleigh
(74) *Attorney, Agent, or Firm* — Amin, Turocy & Watson, LLP

(57) ABSTRACT

Techniques for creating, configuring, and employing diffusion light devices are presented. Such light device(s) can comprise or be associated with a light management component (LMC) that can employ sensors to monitor environmental conditions in a defined area of people or vehicles, and a diffusion component that can diffuse or otherwise process light. At least a portion of the diffusion component and/or a light component can be formed of a fabric that can emit light and/or diffuse light. LMC can enhance function of the light device to manage diffusion of light or perform other
(Continued)

tasks to enhance user experience and safety and security of people or vehicles. Based on results of analyzing sensor data relating to the conditions, LMC can determine and facilitate implementing an adjustment(s) to a parameter(s) of the diffusion component or light component to achieve desired emission or diffusion of light.

19 Claims, 19 Drawing Sheets

Related U.S. Application Data continuation of application No. 16/044,047, filed on Jul. 24, 2018, now Pat. No. 10,408,988.

(60) Provisional application No. 62/568,294, filed on Oct. 4, 2017, provisional application No. 62/609,008, filed on Dec. 21, 2017.

(51) Int. Cl.
| | | |
|---|---|---|
| *G02B 5/02* | (2006.01) | |
| *F21V 3/04* | (2018.01) | |
| *F21V 23/04* | (2006.01) | |
| *F21V 33/00* | (2006.01) | |
| *F21K 9/232* | (2016.01) | |

(52) U.S. Cl.
CPC ........ *F21V 33/0008* (2013.01); *G02B 3/0006* (2013.01); *G02B 5/0226* (2013.01); *G02B 5/0278* (2013.01); *G02B 6/0041* (2013.01); *G02B 6/0053* (2013.01)

(58) Field of Classification Search
CPC ..... G02B 6/0041; F21V 3/04; F21V 23/0457; F21V 33/0008; F21K 9/232
See application file for complete search history.

(56) References Cited

U.S. PATENT DOCUMENTS

| | | | |
|---|---|---|---|
| 6,528,954 | B1 | 3/2003 | Lys |
| 6,946,974 | B1 | 9/2005 | Racunas, Jr. |
| 7,026,954 | B2 | 4/2006 | Slemmer et al. |
| 7,111,952 | B2 * | 9/2006 | Veskovic ............ E06B 9/32 362/1 |
| 7,824,065 | B2 | 11/2010 | Maxik |
| 8,280,558 | B2 | 10/2012 | Picco |
| 8,283,812 | B2 | 10/2012 | Azancot et al. |
| 8,362,713 | B2 | 1/2013 | Recker et al. |
| 8,545,033 | B2 | 10/2013 | Gielen |
| 8,600,786 | B2 | 12/2013 | Stefik et al. |
| 8,674,616 | B2 | 3/2014 | Holman et al. |
| 8,950,461 | B2 * | 2/2015 | Adams ............ E06B 9/38 160/84.02 |
| 9,367,050 | B2 | 6/2016 | Jain et al. |
| 9,560,388 | B2 | 1/2017 | Ogle et al. |
| 9,594,956 | B2 | 3/2017 | Cohen et al. |
| 9,595,193 | B1 | 3/2017 | Duale et al. |
| 9,601,018 | B2 | 3/2017 | Cogill et al. |
| 9,644,799 | B2 | 5/2017 | Crayford et al. |
| 9,700,641 | B2 | 7/2017 | Hawkins et al. |
| 9,893,551 | B2 | 2/2018 | Cheatham, III et al. |
| 9,938,765 | B2 * | 4/2018 | Berman .......... H05B 47/11 |
| 10,210,355 | B1 | 2/2019 | Lai |
| 10,251,242 | B1 | 4/2019 | Rosen et al. |
| 10,677,402 | B2 | 6/2020 | Rosen et al. |
| 10,867,486 | B2 | 12/2020 | Rosen et al. |
| 2002/0171562 | A1 | 11/2002 | Muraki |
| 2004/0022058 | A1 | 2/2004 | Birrell |
| 2005/0128751 | A1 | 6/2005 | Roberge et al. |
| 2005/0248299 | A1 | 11/2005 | Chemel et al. |
| 2006/0044798 | A1 | 3/2006 | Pazula |
| 2006/0197684 | A1 | 9/2006 | Tremblay |
| 2008/0191009 | A1 | 8/2008 | Gressel et al. |
| 2009/0059603 | A1 | 3/2009 | Recker et al. |
| 2009/0303079 | A1 | 12/2009 | Khim |
| 2010/0007525 | A1 | 1/2010 | Shanbhag et al. |
| 2010/0060485 | A1 | 3/2010 | Kim |
| 2010/0309024 | A1 | 12/2010 | Mimeault |
| 2011/0006893 | A1 | 1/2011 | Finch et al. |
| 2011/0193872 | A1 | 8/2011 | Biernath et al. |
| 2012/0011033 | A1 | 1/2012 | Salgia |
| 2012/0066144 | A1 | 3/2012 | Berkvens et al. |
| 2012/0092192 | A1 | 4/2012 | Wong |
| 2012/0098655 | A1 | 4/2012 | Preta et al. |
| 2013/0002587 | A1 | 1/2013 | Biggs et al. |
| 2013/0073350 | A1 | 3/2013 | Blustein |
| 2013/0113936 | A1 | 5/2013 | Cohen et al. |
| 2013/0300911 | A1 | 11/2013 | Beckman |
| 2014/0049963 | A1 | 2/2014 | McGuire |
| 2014/0049972 | A1 | 2/2014 | McGuire |
| 2014/0055990 | A1 | 2/2014 | Reed |
| 2014/0217914 | A1 | 8/2014 | Maxik |
| 2014/0262057 | A1 | 9/2014 | Chambers et al. |
| 2015/0195100 | A1 | 7/2015 | Imes et al. |
| 2015/0286938 | A1 | 10/2015 | Blair et al. |
| 2016/0047164 | A1 | 2/2016 | Lundy et al. |
| 2016/0085884 | A1 | 3/2016 | Schafer et al. |
| 2016/0135271 | A1 | 3/2016 | Alexander |
| 2016/0104325 | A1 | 4/2016 | Lu |
| 2016/0216443 | A1 | 7/2016 | Morgan et al. |
| 2016/0359325 | A1 | 12/2016 | Kawata et al. |
| 2017/0073074 | A1 | 3/2017 | Gagnon et al. |
| 2017/0094756 | A1 | 3/2017 | Saffari |
| 2017/0192406 | A1 | 7/2017 | Ashdown et al. |
| 2017/0247289 | A1 | 8/2017 | Waldschmidt et al. |
| 2017/0322350 | A1 | 11/2017 | Montagne |
| 2018/0096634 | A1 | 4/2018 | Walker et al. |
| 2018/0154032 | A1 | 6/2018 | Dombrovsky |
| 2018/0156429 | A1 | 6/2018 | Carlet et al. |
| 2018/0163934 | A1 | 6/2018 | Miller |
| 2018/0167516 | A1 | 6/2018 | Warrick |
| 2018/0211503 | A1 | 7/2018 | Baliga et al. |
| 2018/0216791 | A1 | 8/2018 | Leung et al. |
| 2018/0224596 | A1 | 8/2018 | Creasman et al. |
| 2018/0259141 | A1 | 9/2018 | Yamaguchi et al. |
| 2018/0313660 | A1 | 11/2018 | Eyster et al. |
| 2019/0069379 | A1 | 2/2019 | Kastee et al. |
| 2019/0104181 | A1 | 4/2019 | Rosen et al. |

OTHER PUBLICATIONS

Final Office Action received for U.S. Appl. No. 16/044,027 dated Oct. 8, 2020, 29 pages.
Final Office Action received for U.S. Appl. No. 16/043,875 dated Jan. 25, 2020, 13 pages.
Non-Final Office Action received for U.S. Appl. No. 16/044,047 dated Dec. 26, 2018, 22 pages.
Notice of Allowance received for U.S. Appl. No. 16/044,073 dated Nov. 8, 2018, 20 pages.
Non-Final Office Action received for U.S. Appl. No. 16/043,974 dated May 2, 2019, 28 pages.
Non-Final Office Action received for U.S. Appl. No. 16/043,798 dated Jun. 27, 2019, 15 pages.
Non-Final Office Action received for U.S. Appl. No. 16/130,720 dated Jul. 25, 2019, 37 pages.
Non-Final Office Action received for U.S. Appl. No. 16/270,646 dated Aug. 21, 2019, 29 pages.
Non-Final Office Action received for U.S. Appl. No. 16/739,627 dated Feb. 7, 2020, 19 pages.
Non-Final Office Action received for U.S. Appl. No. 16/544,023 dated Apr. 9, 2020, 28 pages.
Non-Final Office Action received for U.S. Appl. No. 16/043,997 dated Apr. 8, 2020, 46 pages.
Non-Final Office Action received for U.S. Appl. No. 16/821,007 dated May 1, 2020, 36 pages.
Non-Final Office Action received for U.S. Appl. No. 16/044,027 dated Jun. 22, 2020, 48 pages.

(56) References Cited

OTHER PUBLICATIONS

Notice of Allowance received for U.S. Appl. No. 16/043,949 dated May 21, 2020, 49 pages.
Non-Final Office Action received for U.S. Appl. No. 16/043,875 dated May 27, 2020, 15 pages.
Non-Final Office Action received for U.S. Appl. No. 16/043,875 dated Jul. 8, 2020, 36 pages.
Notice of Allowance received for U.S. Appl. No. 16/043,997 dated Aug. 7, 2020, 46 pages.
Non-Final Office Action received for U.S. Appl. No. 16/856,434 dated Sep. 1, 2020, 50 pages.
U.S. Appl No. 16/544,023, U.S. Appl. No. 16/044,047, filed Aug. 19, 2019, filed Jul. 24, 2018.
Non-Final Office Action received for U.S. Appl. No. 16/739,627 dated Apr. 26, 2021, 31 pages.
Non-Final Office Action received for U.S. Appl. No. 16/043,875 dated May 26, 2021, 45 pages.
Non-Final Office Action received for U.S. Appl. No. 16/044,027 dated Jun. 9, 2021, 29 pages.
Non-Final Office Action received for U.S. Appl. No. 17/099,928 dated Jun. 24, 2021, 53 pages.
Notice of Allowance received for U.S. Appl. No. 17/005,534 dated Aug. 4, 2021, 50 pages.
Final Office Action received for U.S. Appl. No. 16/739,627 dated Sep. 30, 2021, 33 pages.
Non-Final Office Action received for U.S. Appl. No. 17/099,898 dated Sep. 24, 2021, 68 pages.

* cited by examiner

TECHNIQUES FOR ENHANCED DIFFUSION LIGHTING

CROSS-REFERENCE TO RELATED APPLICATIONS

This application is a continuation of, and claims priority to, U.S. patent application Ser. No. 16/544,023, filed Aug. 19, 2019, and entitled "TECHNIQUES FOR ENHANCED DIFFUSION LIGHTING," which is a continuation of U.S. patent application Ser. No. 16/044,047, filed Jul. 24, 2018, and entitled "TECHNIQUES FOR ENHANCED DIFFUSION LIGHTING," which claims priority to U.S. Provisional Patent Application Ser. No. 62/609,008 filed on Dec. 21, 2017, entitled "TECHNIQUES FOR ENHANCED DIFFUSION LIGHTING," and U.S. Provisional Patent Application Ser. No. 62/568,294 filed on Oct. 4, 2017, entitled "SELF AWARE LIGHTS THAT SELF-CONFIGURE," the entireties of all aforementioned applications are incorporated herein by reference.

BACKGROUND

Typical smart lights have limited capabilities focused primarily on changing lighting colors based on a user's configuration. Furthermore, such smart lights usually can require extensive manual user configuration using applications (e.g. mobile phone apps, computer programs, etc.) that are not intuitive and can involve an undesirable amount of learning on the part of the user.

The above-described description is merely intended to provide a contextual overview relating to lighting devices, and is not intended to be exhaustive.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus, and/or computer program products that can facilitate a self-aware light that can perform flow management are described.

According to one or more embodiments, a system is provided. The system can comprise a light component of a diffusion light device, the light component configured to emit light to facilitate illumination of an area associated with the diffusion light device. The system also can include a diffusion component of the diffusion light device, the diffusion component configured to diffuse at least one of the light or other light associated with the area to produce diffused light, wherein the diffusion component is further configured to emit the diffused light to the area, and wherein at least the diffusion component is at least partially formed of a fabric that is configurable to diffuse at least one of the light or the other light to produce the diffused light. The system further can include a memory that stores machine-executable components, and a processor that executes the machine-executable components stored in the memory. The machine-executable components can comprise: a light management component of the diffusion light device, the light management component configured to determine a light profile for the diffusion light device based at least in part on characteristics of the diffusion light device and environmental conditions associated with the area associated with the diffusion light device, wherein the light management component is further configured to control operation of the diffusion component, including control of configuration of the fabric of the diffusion component, to control the diffusion of at least one of the light or the other light to produce the diffused light based at least in part on the light profile.

In accordance with one or more other embodiments, a method is provided. The method can comprise determining, by a system comprising a processor, a light profile for a light device based at least in part on attributes of the light device and conditions associated with an area associated with the light device. The method also can comprise controlling, by the system, diffusion of a light produced by the light device, based at least in part on the light profile, to emit diffused light to the area, wherein the controlling comprises controlling configuration of a material employed by the light device to at least one of emit the light or diffuse the light to facilitate the controlling of the diffusion of the light.

In yet one or more other embodiments, a device is presented. The device can comprise: a light component configured to emit light to facilitate illumination of an area associated with the device. The device also can include a sensor component configured to comprise one or more sensors configured to sense conditions associated with the area and generate sensor data based at least in part on the sensing of the conditions. The device further can include a diffusion component configured to diffuse at least one of the light or other light associated with the area to produce diffused light, wherein the diffusion component is further configured to emit the diffused light to the area, and wherein at least a portion of the diffusion component is formed of a material that is configurable to diffuse at least one of the light or the other light to produce the diffused light. The device also can include a memory that stores machine-executable components; and a processor that executes the machine-executable components stored in the memory. The machine-executable components can comprise a light management component configured to generate a light profile for the device based at least in part on characteristics of the device and the sensor data relating to the conditions associated with the area, and wherein the light management component is further configured to control operation of the diffusion component, including control of configuration of the material of the diffusion component, to control the diffusion of at least one of the light or the other light to produce the diffused light based at least in part on the light profile.

The following description and the annexed drawings set forth certain illustrative aspects of the specification. These aspects are indicative, however, of but a few of the various ways in which the principles of the specification may be employed. Other advantages and enhanced features of the specification will become apparent from the following detailed description of the specification when considered in conjunction with the drawings.

DETAILED DESCRIPTION

Figure 1:
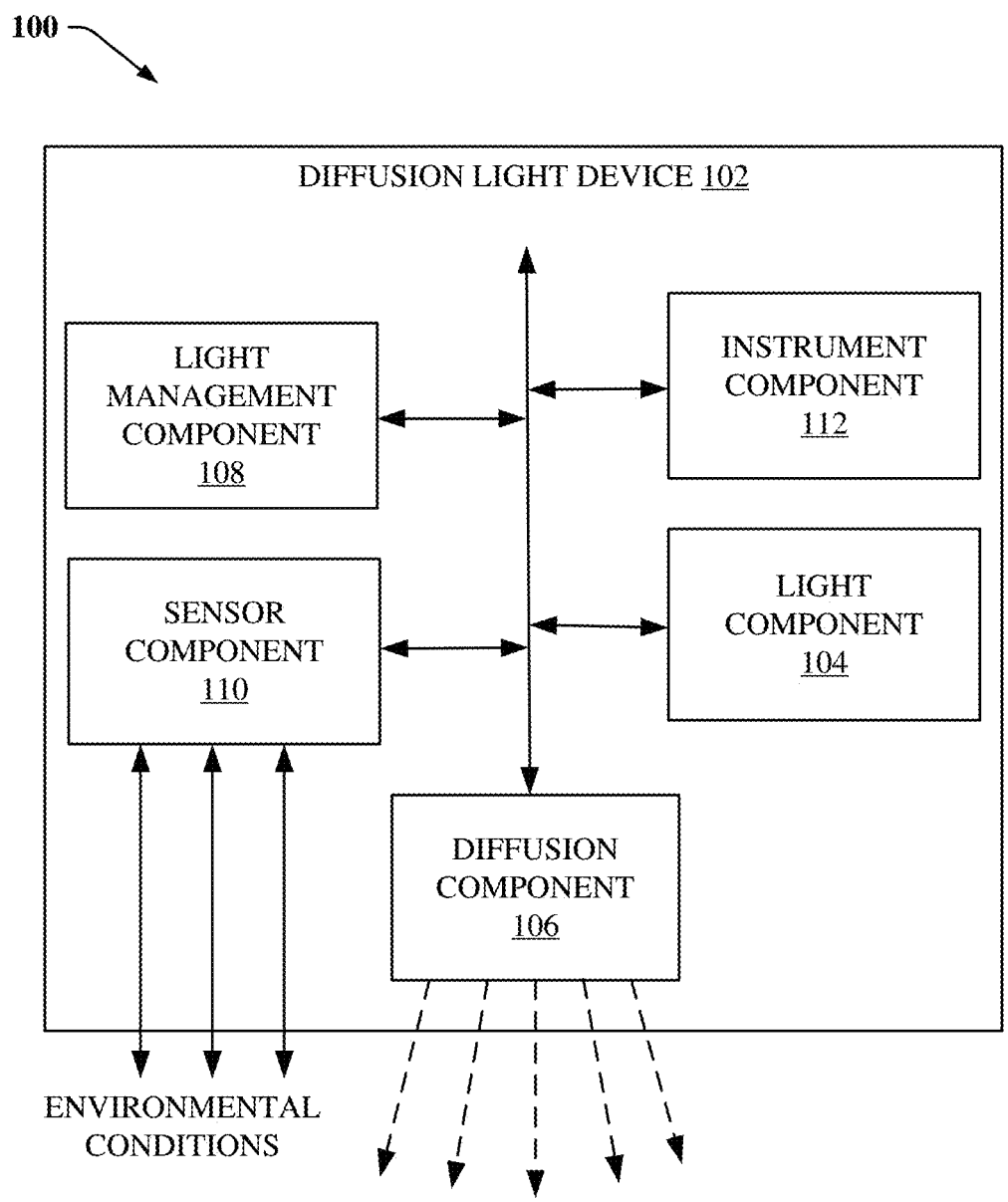
FIG. 1 illustrates a block diagram of an example system for a diffusion light device, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With regard to diffusion lighting, traditional mechanisms for controlling light diffusion typically can either be static (e.g., window roller shades, curtains, lampshades, frosted glass), or limited to manual changes (e.g., vertical or horizontal blinds).

Light devices, such as smart light may be employed to adjust lighting conditions. However, typical smart lights have limited capabilities focused primarily on changing lighting colors based on a user's configuration. Furthermore, such smart lights usually can require extensive manual user configuration using applications (e.g. mobile phone apps, computer programs, etc.) that are not intuitive and can involve an undesirable amount of learning on the part of the user. It can be desirable to provide improved diffusion lighting devices that can provide desirable and extensive control over the diffusion of lighting to enhance user experience, and the safety and security of people and/or vehicle traffic.

In accordance with various aspects and embodiments, techniques for creating, configuring, and employing enhanced light devices for diffusing or otherwise processing light are presented. A diffusion light device can comprise a light management component that can control and enhance (e.g., improve or optimize) the emission of light, including the emission of diffused lighting, and other operations associated with the diffusion lighting device based at least in part on conditions associated with the diffusion light device and/or other diffusion light devices associated with (e.g., in communication with) the diffusion light device and/or user preferences of a user of the diffusion light device. The diffusion light device can comprise a sensor component that can comprise a set of sensors that can sense conditions (e.g., environmental conditions, user conditions) associated with an area where the diffusion light device is located and/or a user associated with the diffusion light device. In some embodiments, the diffusion light device can be mobile or can readily be moved (e.g., a diffusion light device integrated with an article of clothing, such as a shirt, of a user), wherein the area where the diffusion light device is located can change.

The diffusion light device can include a light component that can be associated with (e.g., communicatively connected to) the light management component. The light component can comprise one or more light elements (e.g., one or more light-emitting diodes (LEDS) or other type of light element) that can emit light from the light component. The light management component can control operations of the light component, and can control properties and/or characteristics of the light being emitted from the light component.

In some embodiments, the diffusion light device can comprise or be associated with (e.g., integrated with, or in proximity to and interaction with) a diffusion component through which light can be processed (e.g., diffused, filtered, altered, and/or otherwise processed) the processed light can be emitted from the diffusion component. The diffusion component can be associated with the light component to receive and process the light emitted by the light component. The diffusion component also can be associated with (e.g., communicatively connected to) the light management component, wherein the light management component can control operations, characteristics, and/or properties of the diffusion component to facilitate processing light signals and the emission of light (e.g., diffused or otherwise processed light) from the diffusion component (e.g., to the environment where the diffusion light device is located).

The light management component can monitor conditions associated with the area (e.g., the environment) and/or the user. For instance, the light management component can monitor and receive (e.g., from sensors of the sensor component) sensor data relating the conditions associated with the area and/or the user. The light management component can analyze the sensor data to facilitate determining the conditions associated with the area and/or the user, and controlling operations, parameters, characteristics, and/or properties of the diffusion light device based at least in part on the conditions associated with the area and/or the user. The light management component also can analyze user preferences (e.g., preference data) associated with the user of the diffusion light device. Based at least in part on the results of the analysis of the sensor data and/or the user preferences, the light management component can determine adjustments to make to operations, parameters, characteristics, and/or properties of the diffusion light device in response to the conditions associated with the area and/or the user. To facilitate controlling the operations, parameters, characteristics, and/or properties of the diffusion light device, the light management component can perform adjustments to the operations, parameters, characteristics, and/or properties of the diffusion light device or can communicate instructions to other components (e.g., light component and/or diffusion component) to facilitate adjusting respective operations, parameters, characteristics, and/or properties of or associated with respective components of the diffusion light device, wherein the respective components can perform such respective adjustments to the respective operations, parameters, characteristics, and/or properties of or associated with the respective components based at least in part on the instructions.

In certain embodiments, the light component and/or the diffusion component can comprise one or more materials and/or fabrics (e.g., LED materials and/or fabrics) through which light can be produced, emitted, and/or processed (e.g., diffused, filtered, or altered, . . . ). In other embodiments, the light component and/or the diffusion component can comprise particles, such as nano-particles, that can be controlled (e.g., electronically controlled and/or aligned) by the light management component to manage the emission of light (e.g., by the light component), the diffusion or other processing of light by the diffusion component, and/or the emission of such diffused or otherwise processed light from the diffusion component.

In accordance with various embodiments, the diffusion light device can be, can comprise, can be associated with (e.g., integrated with, or interacting with), and/or can be in the shape and size of a window cover, a window shade, window curtains, or window blinds, as more fully described herein. In accordance with various other embodiments, the diffusion light device can be, can comprise, can be associated with (e.g., integrated with, or interacting with), and/or can be in the shape and size of a lamp shade or a lamp cover, as more fully described herein. In still other embodiments, the diffusion light device can be, can comprise, can be associated with (e.g., integrated with, or interacting with), and/or can be in the shape and size of an item of clothing (e.g., a shirt or coat, a pair of pants, or a pair of shoes that can be worn by a user), as more fully described herein.

In some aspects, a diffusion light device can communicate with one or more other diffusion light devices and/or other devices (e.g., communication devices, such as a mobile phone, a computer, an electronic tablet, an electronic gaming device, a television, electronic eyewear or bodywear, . . . ) to facilitate desirable (e.g., enhanced, improved, optimized, acceptable) function and operation of the diffusion light device and/or the one or more other diffusion light devices to manage light emission and diffusion or other processing of light in the area(s) associated with (e.g., covered by) the diffusion light device and the one or more other diffusion light devices, enhance user experience and enjoyment in such area(s), and enhance safety and security of the user, other people, and/or vehicle traffic associated with such area(s). A diffusion light device can understand its environment and device ecosystem using the sensors and instruments of the diffusion light device, and can perform (e.g., automatically perform) a self-configuration to enhance (e.g., optimize or improve) its functionality for the environment and device ecosystem.

It is to be appreciated and understood that, in some embodiments, a diffusion light device can be a retrofit light bulb with sensors, instruments, and components (e.g., light management component, diffusion component) integrated therein. In certain embodiments, a diffusion light device can have all or a portion of the sensors, instruments, or components integrated into a light fixture (e.g., socket, holder, ballast) associated with the diffusion light device.

With regard to the example aspects and embodiments disclosed herein, there can be coordination amongst a set of diffusion light devices to achieve a desired objective (e.g. goal, intention, purpose, action, operation, configuration, etc.), whether explicitly stated or not. Further, although the terms "diffusion light device," "self-aware diffusion light device," and "self-aware light" are used herein, in accordance with various embodiments, the example implementations of diffusion light devices (e.g., self-aware diffusion light devices) disclosed herein can include one or more diffusion light devices operating independently or in a distributed fashion, as applicable. All such embodiments are envisaged by and part of the disclosed subject matter.

These and other aspects and embodiments of the disclosed subject matter will now be described with respect to the drawings.

FIG. 1 illustrates a block diagram of an example system 100 for a diffusion light device, in accordance with various aspects and embodiments of the disclosed subject matter. The disclosed subject matter is directed to machine (e.g., computer) processing systems, machine-implemented methods, apparatus, and/or machine program products that can facilitate efficiently, effectively, and automatically (e.g., with little or no direct involvement from a user) employing one or more diffusion light devices (e.g., one or more self-aware diffusion light devices) that can perform (e.g., automatically perform) self-configuration (e.g., self-configuration of parameters) to facilitate providing enhanced user experience and enhanced safety and security of users.

For example, when (and if) installed in a desired place, the system 100 (e.g., the diffusion light device 102 of the system 100) can employ sensors, tools, and communication components (e.g., communication devices) to facilitate determining the place of the system 100 in the environment and device ecosystem and perform (e.g., automatically perform) a configuration (e.g., an auto-configuration) of the system 100 (e.g., the components of the system 100). In an example, the system 100 (e.g., the diffusion light device 102 of the system 100) can employ one or more sensors that can provide information (e.g., sensor information) that can facilitate understanding the physical environment in which the system 100 is installed, and facilitate determining how the system 100 fits into and/or can desirably interact with the physical environment. In another example, the system 100 (e.g., the diffusion light device 102) can communicate via one or more communication networks to facilitate identifying and communicating with one or more other systems (e.g., flow management lights of other systems) and/or other devices in the device ecosystem, and facilitate determining how the system 100 fits into and/or can desirably interact with the device ecosystem. As more fully disclosed herein, based at least in part on such determinations, the system 100 (e.g., the diffusion light device 102 of the system 100) can generate a light profile for the diffusion light device 102 and can perform (e.g., automatically perform) a configuration (e.g., an auto-configuration) of the diffusion light device 102 according to (e.g., conforming to) the light profile. It is to be appreciated and understood that a user interface (not shown) can be provided that can allow a user to manually adjust the light profile and/or configuration generated by the system 100.

To facilitate self-configuration, when more than one diffusion light device is employed, the diffusion light devices (e.g., 102) described herein can be in communication with each other, and/or can communicate with another device(s) (e.g., mobile phone, a computer, an electronic tablet, an electronic gaming device, a television, . . . ), to exchange information that can be used (and analyzed) by the respective diffusion light devices to enable the respective diffusion light devices to each determine a desirable (e.g., suitable, enhanced, or optimal) configuration of such diffusion light device. The diffusion light devices (e.g., of or associated with the system 100) can coordinate amongst themselves to make decisions regarding respective actions to be taken by the respective diffusion light devices. In some implementations, the diffusion light devices can receive instructions from another device, such as a device of a control system or a communication device (e.g., mobile phone, computer, . . . ), regarding actions to be taken by the diffusion light devices. The diffusion light devices also can receive instructions from a user (e.g., an operator) regarding actions to be taken by the diffusion light devices or devices (e.g., drone devices) associated with the diffusion light devices. A diffusion light device 102 can autonomously make decisions regarding actions to be taken by the diffusion light device 102. It is to be appreciated and understood that diffusion light devices can employ any of the decision-making methods disclosed herein, alone or in combination, regarding actions to be taken by the diffusion light devices of or associated with the system 100.

The diffusion light device 102 can comprise a light component 104, a diffusion component 106, a light management component 108, a sensor component 110, and an instrument component 112. The light component 104 can emit the light to an area in proximity to the location of the light component 104. The light component 104 can comprise one or more light elements (e.g., one or more LEDs or other type(s) of light element(s)) that can produce and emit respective portions of the light emitted by the light component 104, for example, in response to power received from a power source(s) (e.g., an electric grid system, a battery, a solar power cell system). The light component 104 can emit light of one or more colors, emit light at one or more illumination levels, and/or emit light in one or more directions.

The diffusion component 106 can be associated with (e.g., connected to, in proximity to, or integrated with) the light component 104, wherein the diffusion component 106 can receive and process light emitted by the light component 104. For instance, the diffusion component 106 can desirably diffuse or otherwise process (e.g., filter, alter, . . . ) light being emitted from the light component 104, wherein such light can be passed through and processed by the diffusion component 106, in accordance with defined light management criteria, as more fully described herein.

In accordance with various embodiments, the light component 104 and/or the diffusion component 106 can comprise one or more materials and/or fabrics (e.g., LED materials and/or fabrics) through which light can be produced, emitted, and/or processed (e.g., diffused, filtered, or altered, . . . ). In some embodiments, the light component 104 and/or the diffusion component 106 can comprise particles, such as nano-particles, that can be controlled (e.g., electronically controlled and/or aligned) by the light management component 108 to manage the emission of light (e.g., by the light component 104), the diffusion or other processing of light by the diffusion component 106, and/or the emission of such diffused or otherwise processed light from the diffusion component 106.

In accordance with various embodiments, the diffusion light device 102 can be, can comprise, can be associated with (e.g., integrated with, or interacting with), and/or can be in the shape and size of a window cover, a window shade, window curtains, window blinds, or other window treatment, as more fully described herein. In accordance with various other embodiments, the diffusion light device 102 can be, can comprise, can be associated with (e.g., integrated with, or interacting with), and/or can be in the shape and size of a lamp shade or a lamp cover, as more fully described herein. In still other embodiments, the diffusion light device 102 can be, can comprise, can be associated with (e.g., integrated with, or interacting with), and/or can be in the shape and size of an item of clothing (e.g., a shirt or coat, a pair of pants, or a pair of shoes that can be worn by a user), as more fully described herein. For example, the materials and/or fabrics of or associated with the light component 104 and/or the diffusion component 106 can be sized and/or shaped to conform to, correspond to, encompass, or substantially encompass all or part of an exterior portion of the diffusion light device 102 (e.g., a window treatment, a lamp shade or cover, an item (e.g., article) of clothing, . . . ).

In certain embodiments, the diffusion light device 102 can be in a fixed position (e.g., attached to a wall, ceiling, or floor, or in an otherwise fixed position) or a semi-fixed position (e.g., placed on a floor, a counter, a piece of furniture, or a shelf, or in an otherwise semi-fixed position). In other embodiments, the diffusion light device 102 can be mobile or can readily be moved (e.g., a diffusion light device 102 comprising or part of (e.g., integrated with) an article of clothing, such as a shirt, of a user; a diffusion light device 102 comprising or part of a vehicle, such as an automobile, a train, a drone, . . . ), wherein the area where the diffusion light device 102 is located can readily change.

The light management component 108 can be associated with (e.g., connected to) the light component 104, the diffusion component 106, the sensor component 110, the instrument component 112, and/or another component(s) of the diffusion light device 102 to facilitate controlling operation of the diffusion light device 102. For instance, the light management component 108 can control operation of the respective components (e.g., light component 104, diffusion component 106, instrument component 112, . . . ) of the diffusion light device 102, and/or other diffusion light devices associated with the diffusion light device 102, based at least in part on the results of analyzing sensor data received from the sensor component 110 and/or other data (e.g., user preferences), in accordance with the light profile and/or environment profile associated with the diffusion light device 102 and generated by the light management component 108, as more fully described herein.

The sensor component 110 can comprise or employ one or more sensors that can sense respective conditions associated with the environment(s) (e.g., physical environment, logical environment, communication network environment) in which the diffusion light device 102 is situated or with which the diffusion light device 102 is associated. The one or more sensors of the sensor component 110 can comprise, for example, a radio frequency identification (RFID) reader, a navigation device, a camera, a video camera, a three-dimensional camera, a global positioning system (GPS) device, a motion sensor, a radar sensor or device, a temperature or heat sensor, a weather sensor, a humidity sensor, a barometer, a Doppler radar, a light sensor, a thermal imaging sensor or device, an infrared camera, an audio sensor, an ultrasound imaging sensor or device, a light detection and ranging (LIDAR) sensor, a sound navigation and ranging (SONAR) sensor or device, a microwave sensor, a smoke detector, a chemical sensor, a radiation sensor, an electromagnetic field sensor, a pressure sensor, a spectrum analyzer, a scent sensor, a moisture sensor, a biohazard sensor, a touch sensor, a gyroscope, an accelerometer, an altimeter, a microscope, a magnetometer, a sensor or device capable of seeing through or inside of objects, or any other desired (e.g., suitable) sensors. It is to be appreciated and understood that the diffusion light device 102 can comprise one or more configurable and/or removably attached sensors of the sensor component 110. For instance, the diffusion light device 102 can comprise a modular configuration that can allow for one or more of the sensors of the sensor component 110 to be added or removed by a manufacturer or a user.

The instrument component 112 can comprise or employ one or more instruments, tools, or devices that can perform respective functions or tasks. The instrument component 112 can include, for example, a projectile launcher, a liquid sprayer, an air blower, a flame thrower, a heat projector, a cold projector, a scent projector, a chemical projector, an electric discharge device, a fire extinguisher, a laser device, or any other suitable tools to perform any task. The instrument component 112 also can comprise, for example, a display screen, a video projector, an audio speaker, indicators (e.g., visual indicators (e.g., LEDs) or audio indicators), or any other suitable instrument, tool, or device. It is to be appreciated and understood that the diffusion light device 102 can comprise configurable and/or removably attached instruments, tools, or devices. For example, the diffusion light device 102 can comprise a modular configuration that can allow for one or more instruments, tools, or devices to be added or removed by the manufacturer or user.

With further regard to the light management component 108, the light management component 108 can monitor conditions (e.g., environmental conditions, user conditions) associated with the area (e.g., the environment) and/or the user of the diffusion light device 102. For instance, the light management component 108 can monitor and receive (e.g., from one or more sensors of the sensor component 110) sensor data relating the conditions associated with the area and/or the user. The light management component 108 also can retrieve user preferences from a user profile of the user and/or can receive user data input by the user via an interface of the diffusion light device 102 or a communication device of the user, wherein the communication device can be communicatively connected to the diffusion light device 102 to facilitate the communication of data, including the user data, between the communication device and the diffusion light device 102.

The light management component 108 can analyze the sensor data and/or the user-related data (e.g., user preferences, user data input) associated with the user to facilitate determining the conditions associated with the area and/or the user. Based at least in part on the results of analyzing the sensor data and/or the user preferences, the light management component 108 can determine the conditions associated with the area and/or the user. Also, based at least in part on the results of analyzing the sensor data, the user preferences and/or user input data, and/or other data (e.g., the defined light management criteria, the environment profile associated with the environment, the user profile, and/or the light profile associated with the diffusion light device 102), the light management component 108 can determine one or more adjustments (e.g., modifications) that can be made to operations, parameters, characteristics, and/or properties of respective components (e.g., light component 104, diffusion component 106, . . . ) of the diffusion light device 102 to facilitate controlling operations, parameters, characteristics, and/or properties of the diffusion light device 102, in response to the conditions associated with the area and/or the user.

In some embodiments, the light management component 108 can update the environment profile associated with the environment based at least in part on the environmental conditions determined as a result of analyzing the sensor data, update the user profile associated with the user based at least in part on the user conditions determined as a result of analyzing the user-related data, and/or update the light profile associated with the diffusion light device 102 based at least in part on the environmental conditions, environmental profile, user conditions, user profile, and/or other information. Based at least in part on such updates to the environment profile, user profile, and/or light profile, the light management component 108 can determine the one or more adjustments that can be made to the operations, parameters, characteristics, and/or properties of respective components of the diffusion light device 102.

In other embodiments, the light management component 108 can determine the one or more adjustments that can be made to the operations, parameters, characteristics, and/or properties of respective components of the diffusion light device 102, based at least in part on the results of analyzing the sensor data, the user preferences, the user input data, and/or the other data, in accordance with the defined light management criteria. The light management component 108 also can update the environment profile based at least in part on the environmental conditions determined as a result of analyzing the sensor data, update the user profile based at least in part on the user conditions determined as a result of analyzing the user-related data, and/or update the light profile based at least in part on the environmental conditions, environmental profile, user conditions, user profile, and/or other information, wherein such updated profiles can be stored in a data store of or associated with the diffusion light device 102.

To facilitate controlling the respective operations, parameters, characteristics, and/or properties of the respective components (e.g., light component 104, diffusion component 106, . . . ) of the diffusion light device 102, the light management component 108 can perform the adjustments to the operations, parameters, characteristics, and/or properties of the diffusion light device 102 or can communicate instructions to other components (e.g., light component 104, diffusion component 106, . . . ) to facilitate adjusting the respective operations, parameters, characteristics, and/or properties of or associated with the respective components of the diffusion light device 102, wherein the respective components (e.g., light component 104, diffusion component 106, . . . ) can perform such respective adjustments to the respective operations, parameters, characteristics, and/or properties of or associated with the respective components based at least in part on the instructions.

The light management component 108 can facilitate controlling (e.g., adjusting or modifying) the respective operations, parameters, characteristics, and/or properties of the light component 104 in a number of ways. For example, the light management component 108 can control switching the light component 104 between an on state (e.g., illuminated state) or off state (e.g., no light illumination), control (e.g., adjust) an illumination level of the light component 104 and/or control which light elements of the light component 104 are illuminated to facilitate controlling the illumination level of the light component 104, control a color of the light emitted by the light component 104, and/or control a direction of emission of light by the light component 104, based at least in part on the light profile of the diffusion light device 102 and/or a user profile (e.g., user preferences stored in the user profile) associated with a user of the diffusion light device 102, in accordance with defined light management criteria.

As another example, the light management component 108 can control the emission of light by the light component 104 and the diffusion of light or other processing of light by the diffusion component 106, based at least in part on the light profile of the diffusion light device 102 and/or a user profile (e.g., user preferences stored in the user profile) associated with a user of the diffusion light device 102, in accordance with defined light management criteria. For instance, the light management component 108 can control operations, parameters, characteristics, and/or properties of the light component 104, and can control the characteristics and/or properties of the light being emitted from the light component 104, in accordance with the defined light management criteria, as more fully disclosed herein.

The light management component 108 also can control (e.g., modify or adjust) operations, parameters, characteristics, and/or properties of the diffusion component 106 to facilitate desirable (e.g., enhanced, suitable, or optimal) diffusion and/or other processing of light signals and the emission of light (e.g., diffused or otherwise processed light) from the diffusion component 106 (e.g., to the environment where the diffusion light device 102 is located), in accordance with the defined light management criteria, as more fully disclosed herein. For instance, based at least in part on results of analyzing sensor data and/or other data (e.g., user preferences) that indicates the diffusion of light or other processing of light performed by the diffusion component 106 should be adjusted, the light management component 108 can adjust one or more parameters of the diffusion component to adjust one or more characteristics or properties of the diffusion component 106 (e.g., one or more characteristics or properties of the material(s) or fabric(s) of the diffusion component 106, and/or one or more characteristics or properties of a filter(s) (e.g., diffusion filter) of the diffusion component 106) to facilitate adjusting the diffusion of light or other processing of light by the diffusion component 106.

For example, a diffusion light device 102 can be, can comprise, or can be associated with (e.g., integrated with) an article of clothing (e.g., shirt, jacket, pants, or shoes) that can be worn by a user. All or part of the article of clothing can be formed of a fabric(s) or material(s) that can be at least part of the diffusion component 106 and/or part of the light component 104, wherein the fabric(s) or material(s) can be employed to diffuse or otherwise process light emitted by the light component 104 and/or can comprise one or more light elements of the light component 104 that can emit light that can be diffused or otherwise processed by other parts of the fabric(s) or material(s) that can constitute the diffusion component 106.

The user can be jogging at sunset, wherein the environment can start to get darker as the sun continues to set during the user's jog. During a first period of time, when the sun has almost set and the illumination level from the sun in the environment has gotten somewhat lower, as compared with when the sun has not set, but it is still not very dark outside in the environment, one or more sensors of the sensor component 110 can sense such illumination conditions in the environment. The light management component 108 can receive sensor data from the one or more sensors, wherein the sensor data can indicate such illumination conditions. The light management component 108 can analyze the sensor data and, based at least in part on the analysis results, can determine that first light parameter settings for the light component 104 and first diffusion parameter settings for the diffusion component 106, in accordance with the defined light management criteria. The first light parameter settings can be employed to have the light component 104 emit light at a first illumination level that can be relatively lower, since there is still some ambient light in the environment. The first diffusion parameter settings can be employed to have the diffusion component 106 (e.g., the fabric(s) or material(s) of the diffusion component 106) diffuse the light emitted from the light component 104 at a first light diffusion level that can widen or spread the pattern of the emitted light beam by a first amount or degree and can reduce the intensity of the emitted light by a first amount or level, wherein, since the illumination level of the light from the light component 104 is already relatively lower, the amount of reduction in intensity of the light performed by the diffusion component 106 can be relatively lower. The light component 104 can have its parameters set and can emit light based at least in part on the first light parameter settings. The diffusion component 106 can have its parameters set and can interact with the emitted light to diffuse the emitted light at the first light diffusion level based at least in part on the first diffusion parameter settings.

During a second period of time, when the sun has set and the illumination level in the environment is relatively low (e.g., it is essentially dark outside), as compared to the first period of time, one or more sensors of the sensor component 110 can sense such lower illumination conditions in the environment. The light management component 108 can receive sensor data from the one or more sensors, wherein the sensor data can indicate such lower (e.g., darker) illumination conditions in the environment. The light management component 108 can analyze the sensor data and, based at least in part on the analysis results, can determine that second light parameter settings for the light component 104 and second diffusion parameter settings for the diffusion component 106, in accordance with the defined light management criteria. The second light parameter settings can be employed to have the light component 104 emit light at a second illumination level that can be relatively higher than the first illumination level, since it is now darker in the environment. The second diffusion parameter settings can be employed to have the diffusion component 106 (e.g., the fabric(s) or material(s) of the diffusion component 106) diffuse the light emitted from the light component 104 at a second light diffusion level that can widen or spread the pattern of the emitted light beam by a second (e.g., higher) amount or degree (e.g., beyond the widening or spreading of light through the first light diffusion level) and can reduce the intensity of the emitted light by a second amount or level, wherein, since the illumination level of the light from the light component 104 is relatively higher, the amount of reduction in intensity of the light performed by the diffusion component 106 can be relatively higher during the second period of time (as compared to the reduction in light intensity resulting from the first diffusion parameter settings). The light component 104 can have its parameters set and can emit light based at least in part on the second light parameter settings. The diffusion component 106 can have its parameters set and can interact with the emitted light to diffuse the emitted light at the second light diffusion level based at least in part on the second diffusion parameter settings.

The diffusion performed using the second diffusion parameter settings can be desirable while the user is jogging at night wearing the article of clothing that is or is associated with (e.g., integrated with) the diffusion light device 102, for example, because the relatively higher level of light diffusion can reduce the intensity of the emitted light to facilitate reducing light glare, which can be distracting or annoying, and can increase the spread of the pattern of the light beam to make it easier for other people to see the user at night and to identify the user (e.g., identify that the object they see in the dark is a person jogging while wearing an article of clothing that is illuminated, wherein, for instance, the shape of the diffused light emitted from the diffusion component 106 into the environment can correspond or substantially correspond to the shape of all or a part of the article of clothing). Such controlled diffusion of light by the diffusion light device 102 can enhance the safety and security of the user as well as other people (e.g., other people walking, jogging, or bicycling; other people who are driving motor vehicles) who may encounter the user.

As still other examples, the light management component 108 can modify the parameters, characteristics, or properties of the light component 104 (e.g., modify illumination level, color, or other characteristics) and/or the diffusion component 106 (e.g., modify the diffusion characteristics or parameters) based at least in part on various sensed conditions, such as, for example, ambient illumination in the environment, weather or air conditions (e.g., temperature, humidity level, air quality (e.g., clear visibility, unclear visibility and/or smoke)), activity (e.g., a type of activity, such as, for example, reading, exercising, watching television, listening to music, having a party, . . . ) of a user(s) in the environment, music (e.g., type or genre of music, volume of music, artist, song) playing in the environment, a program (e.g., type of movie or television show, genre of movie or show) playing on the television in the environment, a time of day (e.g., morning, afternoon, evening, night), a time of year (e.g., weekday, weekend, holiday), and/or other conditions associated with the environment.

As yet another example, the light management component 108 can control display of visual information or indicators by the diffusion light device 102, control emission of audio information or indicators of the diffusion light device 102, control communication of information, notification, or indicators from the diffusion light device 102 to another device (e.g., another diffusion light device, a communication device, such as a mobile phone, computer, etc., or a device associated with law enforcement or an emergency response entity, etc.), and/or control other elements, features, or parameters of the diffusion light device 102, based at least in part on the light profile of the diffusion light device 102 and/or a user profile (e.g., user preferences stored in the user profile) associated with a user of the diffusion light device 102, in accordance with the defined light management criteria, as more fully described herein.

In some embodiments, the light management component 108 can, over time, learn (e.g., automatically learn) contexts of people, vehicle traffic, and/or other objects or entities at various times and control operations of the diffusion light device(s) 102 accordingly for the particular context at a specific time. For instance, the light management component 108 can monitor conditions associated with the area(s) associated with the diffusion light device(s) 102 (e.g., as such conditions are sensed by the sensor component 110), and can determine (e.g., automatically determine) a context associated with the area(s). The light management component 108 can control (e.g., automatically control, adjust, or modify) parameters or other characteristics of the light component 104, the diffusion component 106, instrument component 112 or other component of the diffusion light device(s) 102 based at least in part on the determined context. For instance, the light management component can determine a context configuration, comprising respective parameters and/or characteristics of the respective components of the diffusion light device(s) 102, based at least in part on the determined context, in accordance with the defined light management criteria. The light management component 108 can store information relating to the determined context (e.g., information relating to the context configuration) in the light profile. The light management component 108 and the sensor component 110 can continue to monitor conditions associated with the area. The light management component 108 can determine or predict that the context has or occurred or is about to occur based at least in part on the conditions associated with the area, the information relating to the context, and/or other information. In response, the light management component 108 can facilitate configuring (e.g., automatically configuring) the respective components (e.g., light component 104, diffusion component 106, . . . ) of the diffusion light device(s) 102, based at least in part on the information relating to the context configuration (e.g., information relating to the respective parameters and characteristics of the respective components of the diffusion light device(s) 102 associated with the context configuration).

The light management component 108 can control (e.g., automatically control, adjust, or modify) operations of the diffusion light device(s) 102 in relation to, for example, enhancing security and safety of people or traffic, emergency situations, business and sales operations, horticulture systems, and one or more other desired situations, systems, or objectives (e.g. goal, intention, purpose, action, operation, configuration, . . . ). These and other features of or associated with the diffusion light devices (e.g., 102) can reduce, minimize, or eliminate the need for a user to perform manual configuration of the diffusion light devices or other parameters associated with the diffusion light devices.

With further regard to the one or more sensors of the sensor component 110, the RFID reader of the sensor component 110 can sense and/or identify RFID tags in proximity to the diffusion light device 102 (e.g., in proximity to the RFID reader of the diffusion light device 102). The navigation device can facilitate generating directions in connection with or in relation to the diffusion light device 102. The camera, the video camera, and/or the three-dimensional camera respectively can capture multi-dimensional visual images in proximity to the diffusion light device 102. The GPS device can facilitate sensing a location of the diffusion light device 102 or an object(s) in proximity to the diffusion light device 102 and/or generating directions in connection with the diffusion light device 102. The motion sensor can sense movement and/or direction of movement of an object(s) in proximity and relation to the diffusion light device 102 (e.g., in proximity to the motion sensor of the diffusion light device 102). The radar sensor or device can employ radar technology to facilitate detecting an object(s), including detecting the location and/or movement of an object(s), in proximity to the diffusion light device 102 (e.g., in proximity to the radar sensor of the diffusion light device 102).

A temperature or heat sensor can sense, measure, determine, or facilitate determining a temperature of the environment or an object in proximity to the diffusion light device 102 (e.g., in proximity to the temperature sensor of the diffusion light device 102). A weather sensor can sense weather conditions of or associated with the environment in proximity to or relevant to the diffusion light device 102. A humidity sensor can detect, measure, determine, or facilitate determining the humidity level of the environment in proximity to the diffusion light device 102 (e.g., in proximity to the humidity sensor of the diffusion light device 102). A barometer can sense, measure, determine, or facilitate determining the air pressure level of the environment in proximity to the diffusion light device 102 (e.g., in proximity to the barometer of the diffusion light device 102). A Doppler radar can employ the Doppler effect to sense, measure, determine, or facilitate determining movement of objects and/or velocity of movement of objects in proximity to the diffusion light device 102 (e.g., in proximity to the Doppler radar of the diffusion light device 102).

A light sensor can detect or measure light or an amount of light in proximity to the diffusion light device 102 (e.g., in proximity to the light sensor of the diffusion light device 102). A thermal imaging sensor or device, or an infrared camera, can detect, measure, or determine an amount of radiation of the environment or objects in the environment in proximity to the thermal imaging sensor or device, and can generate thermal images (e.g., thermograms) of the radiation of the environment or objects in the environment, based at least in part on the detecting, measuring, or determining the amount of radiation. An audio sensor can sense audio signals, measure audio signals, or facilitate identifying audio signals in proximity to the diffusion light device 102 (e.g., in proximity to the audio sensor of the diffusion light device 102). An ultrasound imaging sensor or device can employ ultrasound technology to detect features of or objects in an environment in proximity to the diffusion light device 102 (e.g., in proximity to the ultrasound imaging sensor or device of the diffusion light device 102), and can facilitate generation of images (e.g., ultrasound images) that can represent the features of or objects in the environment in proximity to the diffusion light device 102.

A LIDAR sensor or device can employ a laser light (e.g., a pulsed laser light) to detect features of or objects in an environment in proximity to the diffusion light device 102 (e.g., in proximity to the LIDAR sensor or device of the diffusion light device 102), and can facilitate generation of images (e.g., LIDAR images) that can represent the features of or objects in the environment in proximity to the diffusion light device 102. A SONAR sensor or device that can employ ultrasound technology to detect features of or objects in the environment in proximity to the diffusion light device 102, and the distance between the features or objects and the diffusion light device 102, and can facilitate generation of images (e.g., SONAR images) that can represent the features of or objects in the environment in proximity to the diffusion light device 102 (e.g., in proximity to the SONAR sensor or device of the diffusion light device 102).

A microwave sensor can employ microwaves to facilitate detecting objects, including the movement of objects, in the environment in proximity to the diffusion light device 102 (e.g., in proximity to the microwave sensor of the diffusion light device 102). A smoke detector can detect smoke or other air impurities, or measure smoke or other air impurities, in the environment in proximity to the diffusion light device 102 (e.g., in proximity to the smoke detector of the diffusion light device 102). A chemical sensor can detect, measure, and/or facilitate identifying chemical elements or information in the environment in proximity to the diffusion light device 102. A radiation sensor can detect, measure, and/or facilitate identifying radiation, including an amount or a type of radiation, in the environment in proximity to the diffusion light device 102 (e.g., in proximity to the radiation sensor of the diffusion light device 102). An electromagnetic field sensor can sense or measure electromagnetic fields in the environment in proximity to the diffusion light device 102 (e.g., in proximity to the electromagnetic field sensor of the diffusion light device 102).

A pressure sensor can detect or measure pressure (e.g., an amount of pressure) in the environment in proximity to the diffusion light device 102 (e.g., in proximity to the pressure sensor of the diffusion light device 102). A spectrum analyzer can detect and measure the spectral composition of electrical signals, acoustic pressure waves, optical light waves, or other signals that are in the environment in proximity to the diffusion light device 102 (e.g., in proximity to the spectrum analyzer of the diffusion light device 102).

A scent sensor can sense and/or facilitate identifying scents in the environment (e.g., in the air of the environment or emitted by an object(s) in the environment) in proximity to the diffusion light device 102 (e.g., in proximity to the scent sensor of the diffusion light device 102). A moisture sensor can detect an amount of moisture in the environment (e.g., in the air of the environment or emitted by an object(s) in the environment) in proximity to the diffusion light device 102 (e.g., in proximity to the moisture sensor of the diffusion light device 102). A biohazard sensor can detect, measure, and/or facilitate identifying a biohazardous condition in the environment (e.g., in the air of the environment or emitted by an object(s) in the environment) in proximity to the diffusion light device 102 (e.g., in proximity to the biohazard sensor of the diffusion light device 102).

A touch sensor that can detect contact with the diffusion light device 102 or a device or surface associated with the diffusion light device 102, and/or can facilitate identifying a type of touch or contact (e.g., a touch or contact by a finger or hand of a user, a touch or contact by or with an inanimate object) with the diffusion light device 102 or the device or surface associated with the diffusion light device 102. A gyroscope can sense, measure, determine, and/or facilitate determining motion, direction of motion, position, orientation, and/or rotation of the diffusion light device 102 or an object in proximity to or associated with the diffusion light device 102. An accelerometer can sense, measure, determine, and/or facilitate determining acceleration, velocity, motion, direction of motion, position, orientation, and/or rotation of the diffusion light device 102 or an object in proximity to or associated with the diffusion light device 102. An altimeter can detect, measure, and/or identify an altitude of the diffusion light device 102 or an object in proximity to the diffusion light device 102.

A microscope can be employed to detect or observe very small objects and/or small details on objects in the environment in proximity to the diffusion light device 102 (e.g., in proximity to the microscope of the diffusion light device 102). A magnetometer can detect, measure, determine, and/or facilitate determining magnetism, direction of a magnetic field (e.g., magnetic or electromagnetic field), strength of a magnetic field, or relative change of a magnetic field in the environment in proximity to the diffusion light device 102 (e.g., in proximity to the magnetometer of the diffusion light device 102).

With further regard to the one or more instruments of the instrument component 112, the projectile launcher can be employed to launch, emit, eject, or project a projectile from the diffusion light device 102, for example, at an object or entity. The projectile can be, for example, a tag (e.g., paint or chemical tag) that can permanently or semi-permanently mark the object or entity (e.g., criminal) it hits to tag the object or entity to facilitate identifying that the object or entity was present in proximity to the diffusion light device 102. The projectile also can be a weapon that can be employed to strike and disable an object or entity in proximity to the diffusion light device 102.

The liquid sprayer can spray or emit desired liquids, such as, for example, water, fire retardant, horticulture-related liquids on or in the direction of desired targets (e.g., object, entity, fire, plants or flowers, etc.) in proximity to the diffusion light device 102. For example, in response to a heat sensor and/or smoke detector sensing a fire in proximity to the diffusion light device 102, the light management component 108 can determine that fire retardant is to be sprayed on the fire, and can instruct the liquid sprayer to spray fire retardant on the fire. In response to the instruction, the liquid sprayer can spray fire retardant on the fire.

The air blower can blow air or create an air flow in the area (e.g., environment) in proximity to the diffusion light device 102. The air blower can be employed, for example, to try to blow smoke out of an area in proximity to the flow management light (e.g., to another area outside of the building or to another desired area) or to create an air flow to blow or clear away a harmful chemical in the air in proximity to the diffusion light device 102. For instance, in response to the smoke detector detecting smoke in proximity to the diffusion light device 102, the light management component 108 can determine that the air blower is to be turned on to blow the smoke out of the area in proximity to the diffusion light device 102, and can instruct the air blower to blow air in a certain direction. In response to the instruction, the air blower can switch to an on state and blow air in the certain direction to blow the smoke out of the area.

The flame thrower can be employed to emit flames in a controlled manner and desired direction (e.g., at a desired target). The flame thrower can be employed, for example, to emit flames in a controlled manner to create a controlled burn of agriculture or other materials. For instance, as part of land management, in response to a determination by the light management component 108 of the diffusion light device 102 (e.g., on a land vehicle, or on an air vehicle (e.g., helicopter, plane, drone)) that a certain area of land should be cleared to facilitate desirable land management, in accordance with defined environment criteria, the light management component 108 can determine that the flame thrower is to be employed to clear that certain area of land, and can instruct the flame thrower to emit flames in a controlled manner in the direction of the certain area of land. In response to the instruction, the flame thrower can emit flames in a controlled manner in the direction of the certain area of land.

The heat projector can project, emit, or blow heat in a desired direction, in a desired area, or on a desired object or entity. For instance, the temperature sensor can sense a temperature level in the area of the diffusion light device 102. The light management component 108 can determine that the temperature is too low, in accordance with defined environment criteria. The light management component 108 can instruct the heat projector to emit heat to increase the temperature in the area in proximity to the diffusion light device 102 to a desired temperature, in accordance with the defined environment criteria.

The cold projector can project, emit, or blow colder air in a desired direction, in a desired area, or on a desired object or entity. For example, the temperature sensor can sense a temperature level in the area of the diffusion light device 102. The light management component 108 can determine that the temperature is too high based at least in part on the defined environment criteria. The light management component 108 can instruct the cold projector to emit colder air to decrease the temperature in the area in proximity to the diffusion light device 102 to a desired temperature, in accordance with the defined environment criteria.

The scent projector can emit, spray, or project one or more desired scents (e.g., fragrances, chemicals) in the area in proximity to the diffusion light device 102. This can, for example, facilitate achieving a desired scent or smell in the area. For instance, in accordance with the defined environment criteria relating to scent, the light management component 108 can determine that a particular scent is to be emitted in a particular amount in the area, or can determine that the amount of the particular scent being emitted in the area should be adjusted (e.g., increased, or decreased, in response to a detected change in environmental conditions in the area). The light management component 108 can instruct the scent projector to emit the particular scent in a specified amount to introduce a desired amount of the particular scent in the area in proximity to the diffusion light device 102, in accordance with the defined environment criteria.

The chemical projector can emit, spray, or project one or more desired chemicals in the area in proximity to the diffusion light device 102. For example, it can be desired to emit chemicals (e.g., pesticides) on agricultural land or plants, or in a room(s) of or an area around a building, to reduce or control insects, animals, weeds, fungus, and/or other undesired pests. For instance, in accordance with the defined environment criteria relating to chemicals, the light management component 108 can determine that a particular chemical is to be emitted in a particular amount in a particular area in which the diffusion light device 102 is located or to which the diffusion light device 102 can travel (e.g., via a vehicle associated with the diffusion light device 102), or can determine that the amount of the particular chemical being emitted in the particular area should be adjusted (e.g., increased, or decreased, in response to a detected change in environmental conditions in the area). The light management component 108 can instruct the chemical projector to emit the particular chemical in a specified amount to introduce a desired amount of the particular chemical in the particular area in proximity to the diffusion light device 102, in accordance with the defined environment criteria.

The electric discharge device that can be employed to discharge electricity or static in an area or of an object in proximity to the diffusion light device 102. For example, a sensor of the sensor component 110 can detect that an object in proximity to the diffusion light device 102 is electrically charged, wherein the light management component 108 determine that such electrical charge of the object is undesirable based at least in part on the defined environment criteria. The light management component 108 can instruct the electric discharge device to discharge the electrical charge of the object. In response to the instruction, the electric discharge device can operate to desirably discharge the electrical charge of the object.

The fire extinguisher can be employed to emit or spray fire retardant or another desired liquid and/or chemical to facilitate extinguishing a fire in an area in proximity to the diffusion light device 102 or reachable by the diffusion light device 102 (e.g., via a vehicle associated with the diffusion light device 102). For instance, in response to a heat sensor and/or smoke detector sensing a fire in the area, the light management component 108 can determine that fire retardant is to be sprayed on the fire, and can instruct the fire extinguisher to spray fire retardant on the fire. In response to the instruction, the fire extinguisher can spray fire retardant on the fire to facilitate extinguishing the fire.

The laser device can be utilized to emit a laser light to perform one or more desired tasks. For example, in response a smoke detector detecting smoke in an area in proximity to the diffusion light device 102, wherein the smoke can make it difficult for a person to see a safe path through the area, the light management component 108 can determine that the laser device should be engaged to emit a laser light that can illuminate the area and/or facilitate illuminating a safe path through the area to enable the person to be able to better see the area and safely proceed through the area. In response to, and in accordance with, an instruction from the light management component 108, the laser device can emit laser light to the area or a desired portion (e.g., safe path) of the area in proximity to the diffusion light device 102.

The display screen and/or the video projector can be employed to facilitate displaying and/or projecting desired information (e.g., location information, directions, emergency or hazard information, alerts or notifications, videos) to a person in the area of the diffusion light device 102. For instance, in response to an emergency situation (e.g., fire, explosion, or gun shots) detected by one or more sensors (e.g., video camera, smoke detector, heat sensor, biohazard sensor, chemical sensor, audio sensor) in a building employing flow management lights (e.g., 102) at various locations in or around the building, the light management component 108 (e.g., employing a GPS device or other instrument) can determine a desirable (e.g., safe) path of travel for a person to travel through the building to safely exit the building. The light management component 108 can employ the display screen and/or the video projector to display or project a map detailing the path of travel, written directions, and/or other visual information (e.g., information regarding the type of hazard(s) or emergency that exists) to the person, so that the person can be notified of the emergency situation and/or hazard(s) and of the path of travel to take to safely exit the building. Additionally or alternatively, in some implementations, the light management component 108 can coordinate with other flow management lights (and flow management components of the other flow management lights) in the building to have flow management lights along the travel path to be lit (e.g., with the lights themselves being lit and/or indicators (e.g., green colored indicators) being lit) to highlight and show the travel path to the person. Other flow management lights that are off the travel path and/or are in a hazardous area can be differently lit from the flow management lights along the travel path and/or can employ different indicators (e.g., red indicators) to facilitate indicating, to the person, that the person should not proceed into those areas associated with those other flow management lights.

The audio speaker(s) can be employed to provide audio information (e.g., location information, directions, emergency or hazard information, alerts or notifications, music) to a person(s) located in the area in proximity to the diffusion light device 102. For example, in response to an emergency situation (e.g., fire, explosion, or gun shots) detected by one or more sensors in a building employing flow management lights (e.g., 102) at various locations in or around the building, the light management component 108 (e.g., employing a GPS device or other instrument) can determine a desirable (e.g., safe) path of travel for a person to travel through the building to safely exit the building. The light management component 108 can employ the audio speaker(s) to emit or present map or direction information detailing the path or direction of travel and/or other audio information (e.g., information regarding the type of hazard(s) or emergency that exists) to the person(s), so that the person(s) can be notified of the emergency situation and/or hazard(s) and of the path or direction of travel to take to safely exit the building.

The diffusion light device 102 also can employ one or more indicators, which can comprise visual indicators (e.g., LEDs) or audio indicators. For example, in addition to or as an alternative to other visual information or audio information that can be presented by the diffusion light device 102, the light management component 108 can facilitate the presentation of one or more visual indicators (e.g., via one or more LED indicators) and/or audio indicators (e.g., via one or more audio speakers) to facilitate providing information to a person(s) in proximity to the diffusion light device 102, and/or notifying or alerting the person(s) to a condition (e.g., environmental, emergency, and/or hazardous condition) in or near the area in proximity to the diffusion light device 102. For instance, a visual indicator can be a green-colored light (e.g., green-colored LED) and/or arrow-shaped indicator light to indicate a person is on a desired (e.g., correct, appropriate, and/or safe) travel path by traveling in the area of the diffusion light device 102, whereas visual indicator can be a red-colored light (e.g., red-colored LED) and/or X-shaped indicator light to indicate a person is not on the desired (e.g., correct, appropriate, or safe) travel path by traveling in the area of the diffusion light device 102 and/or there may be a hazard in that area.

In some embodiments, the light component 104, the diffusion component 106, the light management component 108, the sensor component 110, and the instrument component 112 can be integrated together to form a device (e.g., a diffusion light device 102), as more fully described herein. In other embodiments, as more fully disclosed herein, all or a portion of the diffusion component 106 can be implemented in a device that can be distinct from, but associated with (e.g., connected to), the light component 104, the light management component 108, the sensor component 110, and/or the instrument component 112; all or a portion of the light management component 108 can be implemented in a device that can be distinct from, but associated with (e.g., connected to), the light component 104, the diffusion component 106, the sensor component 110, and/or the instrument component 112; all or a portion of the sensor component 110 (e.g., all or a portion of the sensors of the sensor component 110) can be implemented in a device that can be distinct from, but associated with, the light component 104, the diffusion component 106, the light management component 108, and/or the instrument component 112; and/or all or a portion of the instrument component 112 (e.g., all or a portion of the instruments, tools, etc., of the instrument component 112) can be implemented in a device that can be distinct from, but associated with, the light component 104, the diffusion component 106, the light management component 108, and/or the sensor component 110.

Figure 2:
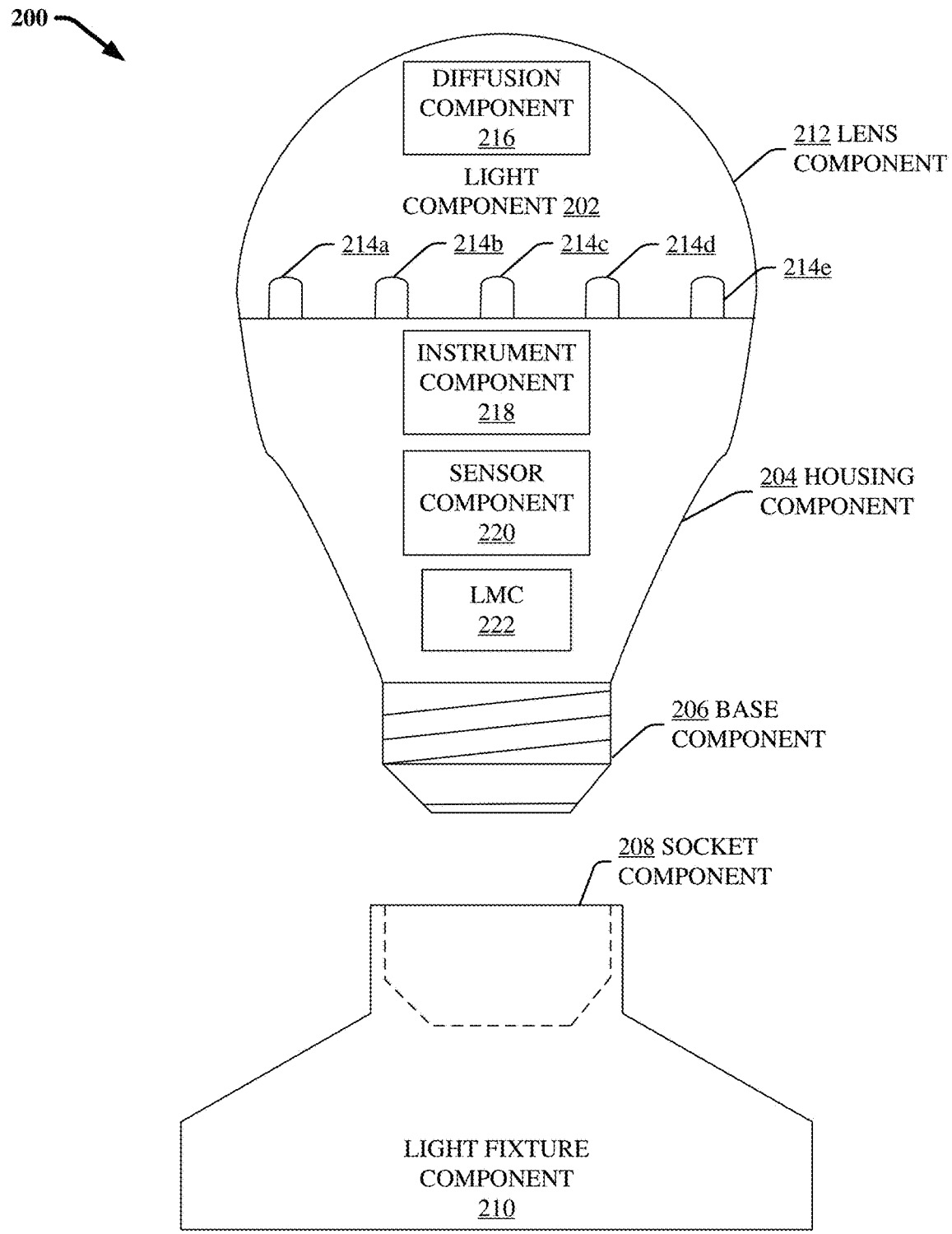
FIG. 2 depicts a block diagram of an example, non-limiting diffusion light device, in accordance with one or more aspects and embodiments described herein.

Referring briefly to FIG. 2, FIG. 2 depicts a block diagram of an example, non-limiting diffusion light device 200 (e.g., a diffusion light system employed in a diffusion light device), in accordance with one or more aspects and embodiments described herein. The diffusion light device 200 can comprise a light component 202 (e.g., a light bulb), which can be associated with (e.g., integrated with, connected to, part of) a housing component 204 that can provide a structure or casing that can house or contain one or more components of the diffusion light device 200, wherein the structure or casing of the housing component 204 can be formed from one or more desired materials (e.g., metal, polymer material, glass, ceramic, fiberglass, etc.).

The diffusion light device 200 also can comprise a base component 206 that can be installed (e.g., as a retrofit) into a socket component 208 of a light fixture component 210 (e.g., holder or ballast) of or associated with the diffusion light device 200. The base component 206 at least partially can be formed of a conductive material (e.g., metal) to facilitate forming an electrical connection between the base component 206 and the socket component 208, when the base component 206 is inserted (e.g., screwed into or connected to) the socket component 208, to facilitate powering the diffusion light device 200. The diffusion light device 200 further can include a lens component 212 that can be associated with the light component 202 and housing component 204, wherein the lens component 212 can provide a desired lens, medium, or conduit through which light can be emitted from the light component 202 of the diffusion light device 200.

The light component 202 can comprise one or more light elements (e.g., light emitting elements or devices), such as, for example, light elements 214a, 214b, 214c, 214d, and/or 214e (e.g., LED, organic LED (OLED), filament, quantum dot, incandescent, high-intensity discharge (HID), neon, fluorescent, compact fluorescent (CFL), electroluminescent (EL), laser, or any other suitable light emitting element). The respective light elements (e.g., 214a, 214b, 214c, 214d, and/or 214e) can emit respective light beams of respective light intensities (e.g., respective illumination levels) and/or respective colors, in accordance with the defined light management criteria.

The diffusion light device 200 also can comprise a diffusion component 216 that can be associated with (e.g., connected to, in proximity to, or integrated with) the light component 202. The diffusion component 216 can receive and process light emitted by the light component 202. For example, the diffusion component 216 can desirably diffuse or otherwise process (e.g., filter, alter, . . . ) light being emitted from the light component 202, wherein such light can be passed through and processed by the diffusion component 216, in accordance with the defined light management criteria, as more fully described herein.

The diffusion light device 200 further can include an instrument component 218, a sensor component 220, and a light management component (LMC) 222. The instrument component 218 can comprise one or more instruments, tools, or devices (e.g., a projectile launcher, a liquid sprayer, an air blower, . . . ) that can perform respective functions or tasks, as more fully disclosed herein. The sensor component 220 can comprise or employ one or more sensors (e.g., RFID reader, navigation device, video camera, GPS device, motion sensor, . . . ) that can sense respective conditions associated with the environment(s) (e.g., physical environment, logical environment, communication network environment) in which the diffusion light device 200 is situated or with which the diffusion light device 200 is associated, as more fully described herein.

The light management component 222 can be associated with (e.g., connected to) the light component 202, diffusion component 216, instrument component 218, sensor component 220, and other components of the diffusion light device 200 to facilitate controlling operation of the diffusion light device 200, including controlling operation of the light component 202, diffusion component 216, instrument component 218, sensor component 220, and other components of the diffusion light device 200, and/or other diffusion light devices associated with the diffusion light device 200, in accordance with the light profile, environment profile, and/or user profile associated with the diffusion light device 200 and generated or maintained by the light management component 222, as more fully disclosed herein. The light management component 222 can receive environment-related information from one or more sensors of the sensor component 220 and/or from another source(s) (e.g., another diffusion light device) of environment-related information, wherein the environment-related information can relate to an environment in an area in which the diffusion light device 200 is installed or is located. The light management component 222 can analyze the environment-related information to generate analysis results. The light management component 222 can determine and generate an environment profile that can describe characteristics of the environment, based at least in part on the analysis results, in accordance with the defined environment criteria.

The light management component 222 also can determine and generate a light profile for the diffusion light device 200, based at least in part on the results of the analysis of the environment profile, light-related information associated with the diffusion light device 200, and/or a user profile associated with a user of the diffusion light device 200, in accordance with defined light management criteria. The light-related information can comprise information regarding the capabilities, specifications, features, characteristics, status, etc., of the diffusion light device 200 and components (e.g., light component 202, diffusion component 216, instrument component 218, sensor component 220, . . . ) thereof. The light management component 222 can employ the light profile to configure (e.g., automatically, dynamically, or self configure) one or more parameters (e.g., by setting or modifying a parameter(s)) of the diffusion light device 200, wherein such configuration of the diffusion light device 200 can be based at least in part on conditions (e.g., current conditions, predicted future conditions) of the environment in the area in which the diffusion light device 200 is installed or is located, as determined, for example, by the light management component 222 from the environment profile and/or the user profile. The configuration of the diffusion light device 200 and the operation of the diffusion light device 200, as controlled by the light management component 222, can enable the diffusion light device 200 to take action (e.g., perform a responsive action) in response to the conditions of the environment in the area in which the diffusion light device 200 is installed or is located. When the light management component 222 determines a particular action(s) is appropriate (e.g., in accordance with the defined light management criteria), the particular action(s) can comprise, for example, controlling (e.g., adjusting) one or more parameters of the light elements (e.g., 214a, 214b, 214c, 214d, and/or 214e) of the light component 202 to control one or more respective characteristics or properties of the respective light elements, controlling (e.g., adjusting) one or more parameters of the diffusion component 216 to control one or more respective characteristics or properties of the diffusion component 216 to desirably diffuse or otherwise process light emitted by the light component 202, and/or executing one or more tools (e.g., projectile launcher, liquid sprayer, and/or air blower, . . . ) of the instrument component 218.

It is to be appreciated and understood that, while five light elements 214a, 214b, 214c, 214d, and 214e are depicted in FIG. 2 for illustrative purposes only, the diffusion light device 200 can include any desired (e.g., suitable) number of light elements. It is also to be appreciated and understood that the diffusion light device 200 can comprise other components (not shown) or exclude one or more components. For example, the diffusion light device 200 can exclude the lens component 212 and/or the light fixture component 210. In another example, the diffusion light device 200 can comprise one or more reflectors, one or more shades, one or more positioning motors, and/or any other components desired (e.g., that are suitable), in accordance with functionality described herein.

Figure 3:
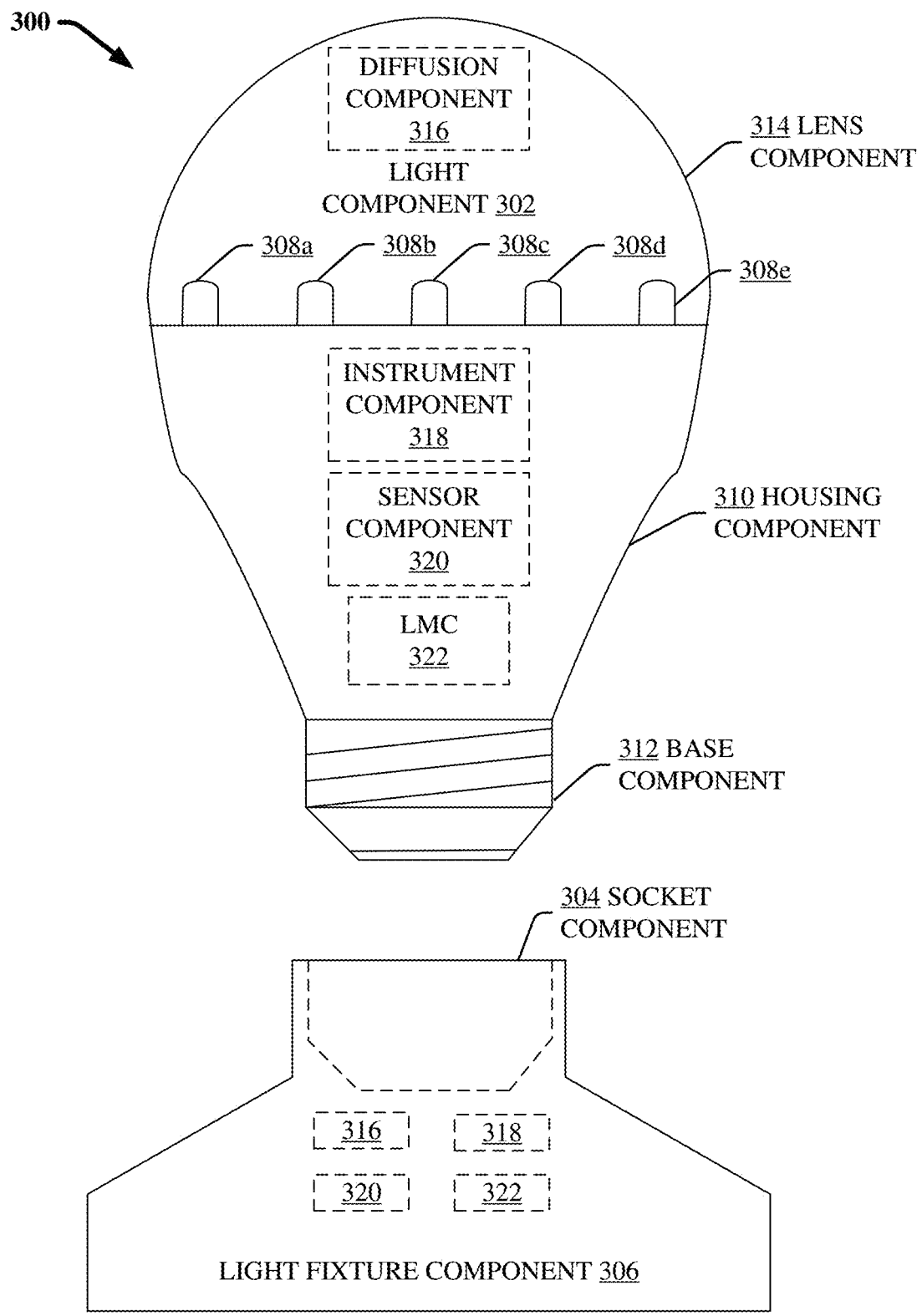
FIG. 3 illustrates a block diagram of an example, non-limiting diffusion light device, in accordance with one or more aspects and embodiments of the disclosed subject matter.

FIG. 3 illustrates a block diagram of an example, non-limiting diffusion light device 300, in accordance with one or more aspects and embodiments of the disclosed subject matter. The diffusion light device 300 can comprise a light component 302. The diffusion light device 300 can comprise a socket component 304 and a light fixture component 306 (e.g., self-aware light fixture component). The light component 302 can comprise one or more light emitting elements, such as, for example, light emitting elements 308a, 308b, 308c, 308d, and/or 308e. The diffusion light device 300 also can include a housing component 310, a base component 312, a lens component 314, a diffusion component 316, an instrument component 318, a sensor component 320, and a light management component (LMC) 322. The base component 312 of the light component 302 can be installed into the socket component 304 of the light fixture component 306.

The diffusion light device 300 can comprise the same or similar functionality as the diffusion light device 200 of FIG. 2 (and diffusion light devices disclosed herein). The difference between the diffusion light device 300 and the diffusion light device 200 can be that a portion of the diffusion component 316, all or a portion of instrument component 318, all or a portion of the sensor component 320, and/or all or a portion of the light management component 322 can be situated in or associated with the light fixture component 306, wherein all or a portion of the diffusion component 316, none or a portion of the instrument component 318, none or a portion of the sensor component 320, and/or none or a portion of the light management component 322 can be situated in the housing component 310 of the diffusion light device 300.

It is to be appreciated and understood that the light fixture component 306 (e.g., self-aware light fixture component) can include other components (not shown) or exclude one or more components. For example, the light fixture component 306 can include one or more light elements (e.g., light emitting devices or indicators), one or more reflectors, one or more shades, one or more positioning motors, or any other suitable components needed according to functionality described herein. It is to be appreciated that the light component 302 can communicate with the light fixture component 306 via a wired or wireless communication connection. For example, the base component 312 can be connected to the socket component 304, which can form a wired communication connection.

While FIGS. 2 and 3 depict a diffusion light device (e.g., 200, 300) that can be fit or inserted into a light fixture component (e.g., 210, 306), it is to be appreciated and understood that a single light fixture component can comprise a plurality of socket components (e.g., 208, 304) for installation of a plurality of lights (e.g., light components or bulbs).

Figure 4:
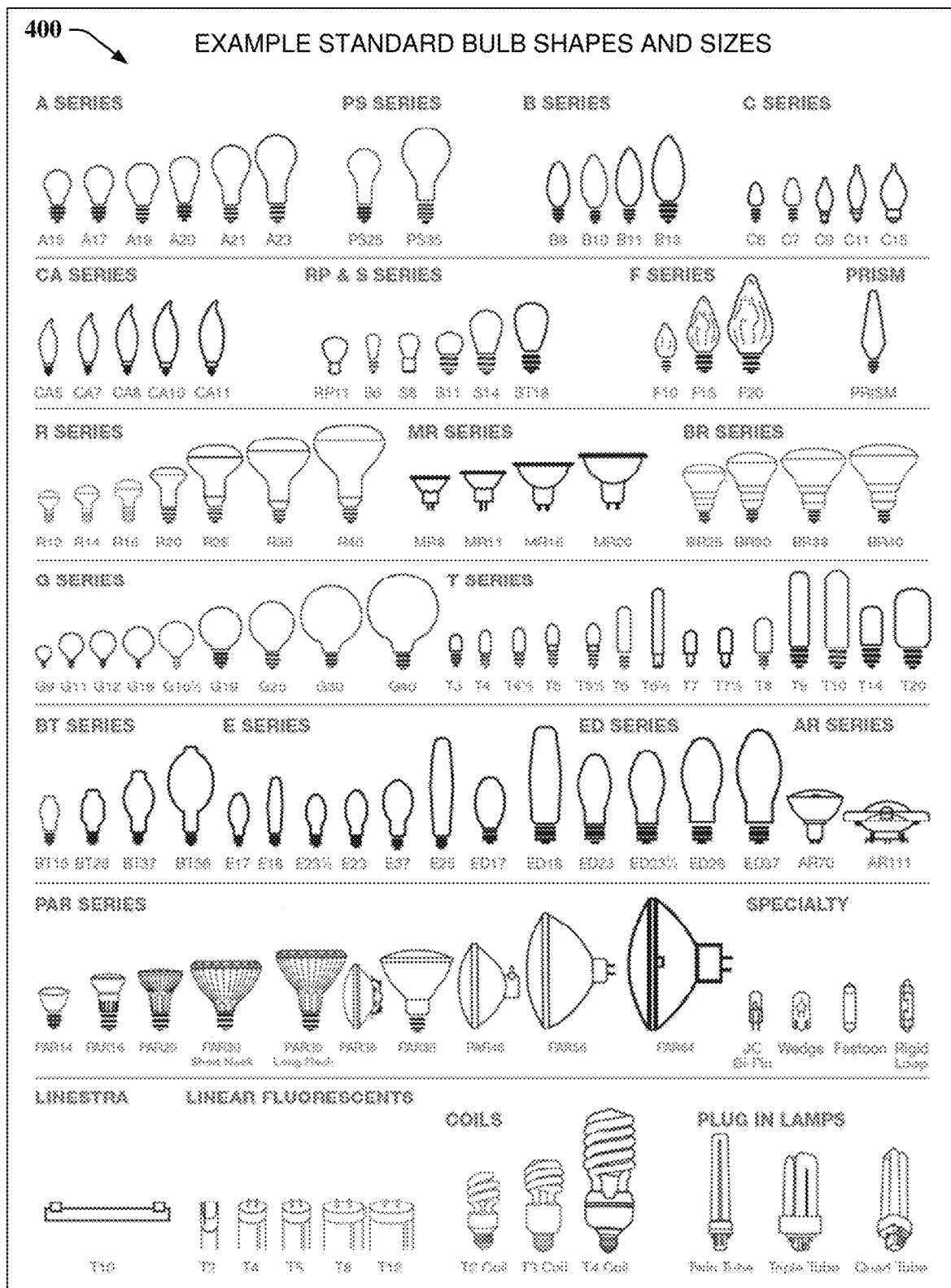
FIG. 4 presents an example, non-limiting light bulb diagram of standard shapes and sizes of light bulbs that can be employed for one or more light elements of a light component for a diffusion light device, in accordance with various aspects and embodiments of the disclosed subject matter.

Referring briefly to FIG. 4 (along with FIGS. 1, 2, and 3), FIG. 4 presents an example, non-limiting light bulb diagram 400 of standard shapes and sizes of light bulbs that can be employed for one or more light elements of a light component (e.g., 102, 202, 302) for a diffusion light device, in accordance with various aspects and embodiments of the disclosed subject matter. It is to be appreciated and understood that the diffusion light device can be customized to be in any suitable shape and any suitable size, employing one or more light elements or bulbs having desired shapes and sizes, for an application in which a diffusion light device is to be installed, in accordance with various aspects and embodiments of the disclosed subject matter.

Figure 5:
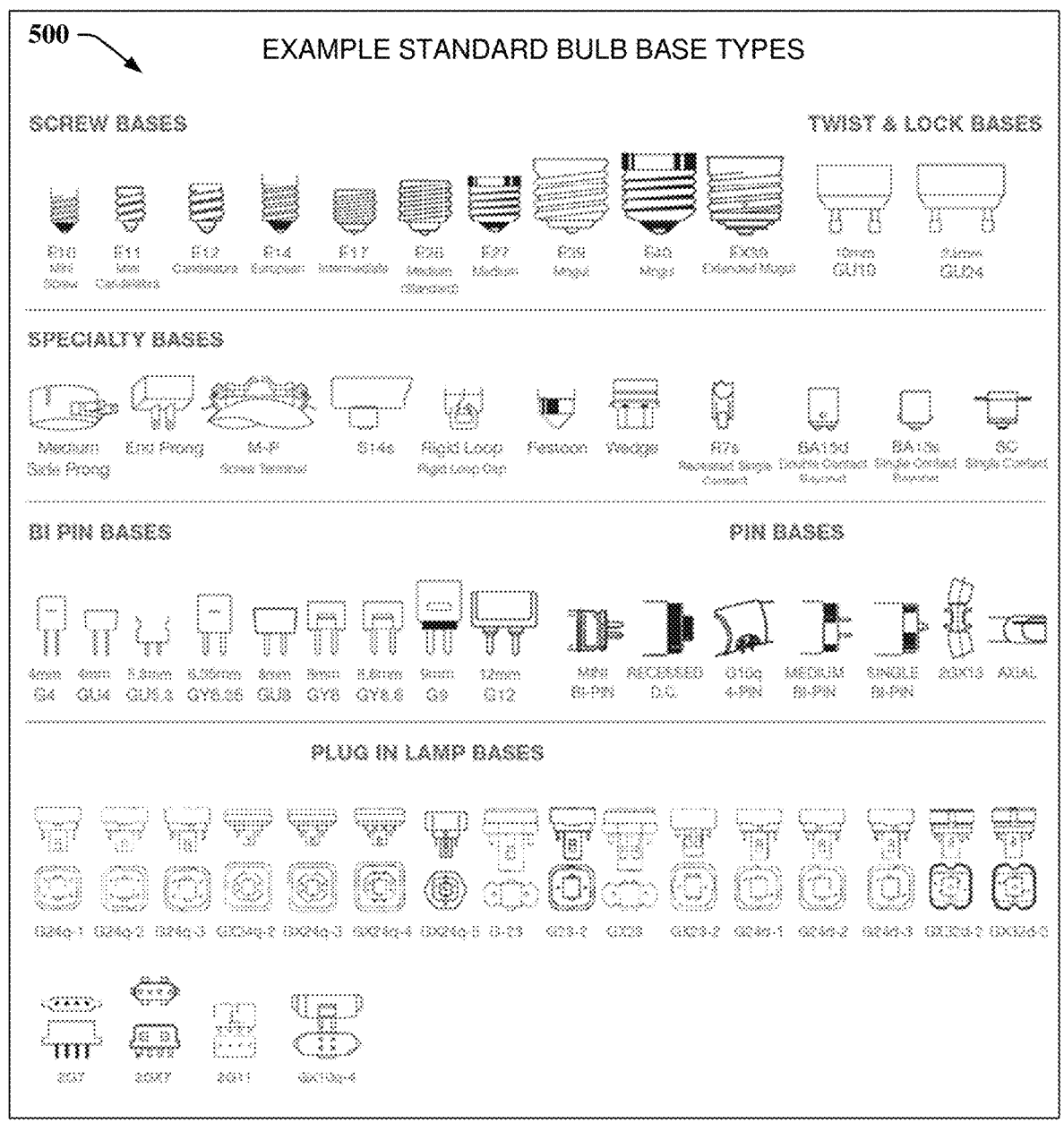
FIG. 5 illustrates an example, non-limiting diagram of standard types of base components, in accordance with various aspects and embodiments of the disclosed subject matter.

Referring briefly to FIG. 5 (along with FIGS. 1, 2, and 3), FIG. 5 illustrates an example, non-limiting diagram 500 of standard types of base components (e.g., that can be employed for base component 206 or 312), in accordance with various aspects and embodiments of the disclosed subject matter. It is to be appreciated and understood that a base component (e.g., 206, 312) can be customized to be in any desired (e.g., suitable) form for an application in which a light element(s) or bulb(s) of the diffusion light device is to be installed. Likewise, the socket component (e.g., 208, 304) can be customized to be compatible with the base component (e.g., 206, 312). Additionally, the light fixture component (e.g., 210, 306) can be customized to be in any desirable (e.g., suitable) form for an application in which a light element(s) or bulb(s) of the diffusion light device is to be installed.

With further regard to FIG. 1 (along with FIGS. 2 and 3), the system 100 (e.g., the diffusion light device 102 of the system 100) can comprise one or more power sources (not shown). Non-limiting examples the one or more power sources can include electrical grid power, a battery, an electrochemical cell, a fuel cell, natural gas generated electric power, compressed air generated electric power, diesel fuel generated electric power, gasoline generated electric power, oil generated electric power, propane generated electric power, a nuclear power system, a solar power system, a wind power system, a piezoelectric power system, microelectrical mechanical systems (MEMS)-generated electric power, an inductive power system, a radio-frequency power system, a wireless power transfer mechanism, and/or any other suitable power source. In an example, the diffusion light device 102 of the system 100 can have a constantly, or substantially constantly, available power source, such as that provided by an electrical power grid. In another example, a diffusion light device 102 of the system 100 can comprise a temporary power source, such as a battery (e.g. disposable battery or rechargeable battery). In a further example, a diffusion light device 102 of the system 100 can generate and store its own power, such as by solar via a solar cell, fuel cell, radio-frequency harvesting, induction, piezoelectric, electro-mechanical, chemical, nuclear, carbon based-fuel, and/or any other suitable self-generating power source. This can be advantageous for long-term installations (e.g. where frequent battery changes would be required) that do not have a constantly available power source, such as an outdoor environment where a power outlet may not readily be available (e.g. a porch, a yard, a camping site, a farm field, a park, a sports field, etc.), or an indoor location where a power outlet may not readily be available (e.g. a closet, a sunroom, a cabinet, a drawer, a garage, a barn, a shed, an indoor location where an extension cord is not desired, etc.). It is to be appreciated and understood that the diffusion light device 102 can comprise a plurality of different power sources, with one or more power sources acting as a backup for another power source. It is to be appreciated and understood that the diffusion light device 102 also can include configurable power sources. For example, the diffusion light device 102 can include a modular configuration that can allow for one or more power sources to be added or removed by a manufacturer or user.

A diffusion light device (e.g., the diffusion light device 102 of the system 100, diffusion light device 200, diffusion light device 300) can comprise one or more computers, one or more processors, one or more memories, and/or one or more programs. A diffusion light device (e.g., 102, 200, 300) can communicate via any suitable form of wireless or wired communication using a communication component or device of or associated with the diffusion light device. Non-limiting examples of wireless communication can include, for example, radio communication, optical communication, sonic communication, electromagnetic induction communication, or any other suitable wireless communication.

A diffusion light device (e.g., 102, 200, 300) can be constructed of any desired (e.g., suitable) material(s) appropriate for environments in which the diffusion light device will operate. A diffusion light device can have suitable protection against an environment in which the diffusion light device will operate, wherein non-limiting examples of the materials that can be used to construct the diffusion light device can comprise materials that can be weather resistant, crush resistant, fire resistant, heat resistant, cold resistant, pressure resistant, impact resistant, liquid and/or solid material ingress protected or resistant, chemical resistant, corrosion resistant, shatter resistant, scratch resistant, bio-contamination resistant, electromagnetic pulse resistant, electrical shock resistant, projectile resistant, explosion resistant, or any other suitable resistance for an environment in which the diffusion light device can operate.

The computer processing systems, computer-implemented methods, apparatus and/or computer program products of a diffusion light device (e.g., 102, 200, 300) can employ hardware and/or software that can solve problems that can be highly technical in nature (e.g., related to complex coordination between respective diffusion light devices, complex coordination between one or more diffusion light devices and another device, performance of self-configuration of a diffusion light device(s)) that are not abstract and that cannot be performed as a set of mental acts by a human One or more embodiments of the subject computer processing systems, methods, apparatuses and/or computer program products can enable one or more diffusion light devices (e.g., 102, 200, 300) to coordinate amongst themselves, and optionally with other devices, to perform actions to understand the environment in which the one or more diffusion light devices are installed, determine an objective (e.g. goal, intention, purpose, action, operation, configuration, etc.) of such installation, perform a self-configuration of the diffusion light device(s) according to such determined objective, and operate to achieve such determined objective. For example, the diffusion light devices can employ artificial intelligence to learn their environment, and learn actions to facilitate performing self-configuration of the diffusion light devices and to operate for a determined objective of the installation in the environment.

Figure 6:
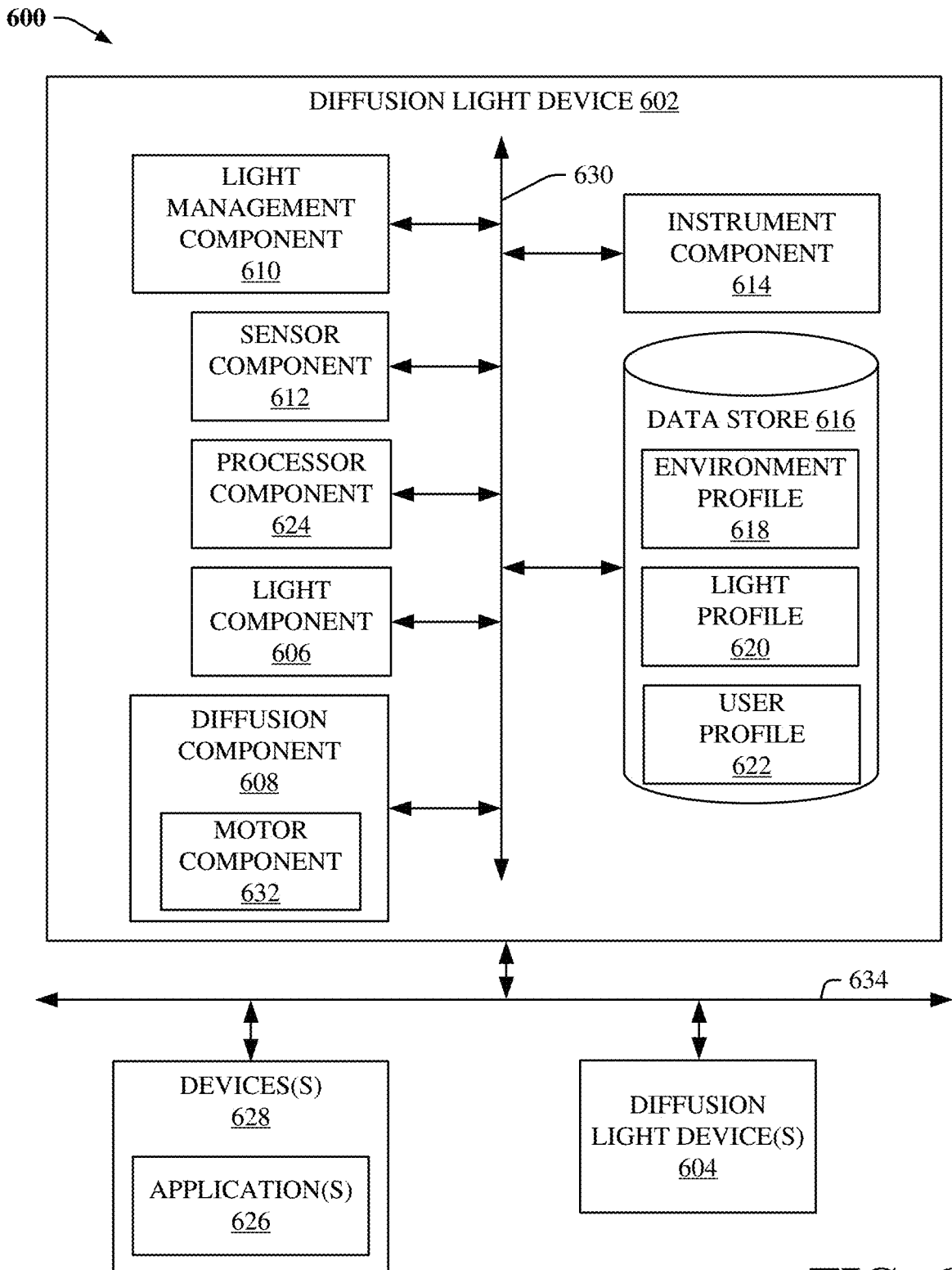
FIG. 6 illustrates a block diagram of an example, non-limiting system that can employ a set of diffusion light devices that can coordinate with each other and/or another device(s), in accordance with various aspects and embodiments of the disclosed subject matter.

FIG. 6 illustrates a block diagram of an example, non-limiting system 600 that can employ a set of diffusion light devices that can coordinate with each other and/or another device(s), in accordance with various aspects and embodiments of the disclosed subject matter. The set of diffusion light devices can comprise a plurality of diffusion light devices, including a diffusion light devices 602 and one or more other diffusion light devices, such as diffusion light devices 604. The diffusion light devices 602 and 604 can comprise the same or similar components and functionality as the diffusion light devices (e.g., diffusion light device 102 of system 100, diffusion light device 200, diffusion light device 300) disclosed herein.

In accordance with various embodiments, the diffusion light devices 602 and 604 can be or include the structure and/or functionality of one or more of diffusion light devices 102, 200, or 300, and/or any other structure and/or functionality described herein for diffusion light devices. In one example, the diffusion light device 602 can be a different type of diffusion light device than diffusion light device 604. In another example, a diffusion light device 604 can be the same type of diffusion light device as diffusion light device 602 and/or can include one or more components (e.g., light component, diffusion component, light management component, instrument component, and/or sensor component, . . . ) that can be found in the diffusion light device 602. It is to be appreciated and understood that, in the disclosure herein in which more than one diffusion light device is employed, the diffusion light devices can comprise one or more diffusion light devices 602 and/or one or more diffusion light devices 604.

The respective diffusion light devices (e.g., 602, 604) of the set of diffusion light devices can learn, understand, and react (e.g., respond) to the respective environments in which the respective diffusion light devices are installed or located, determine respective objectives of such installation or location, perform respective self-configuration of the respective diffusion light devices according to the respective determined objectives and the defined light management criteria, and respectively operate to achieve the respective determined objectives, in accordance with one or more aspects and embodiments described herein.

The diffusion light device 602 can include a light component 606 comprising one or more light elements, a diffusion component 608, a light management component 610, a sensor component 612 comprising one or more sensors, and an instrument component 614 comprising one or more instruments. The light component 606, diffusion component 608, light management component 610, sensor component 612, and instrument component 614 can respectively be the same as or similar to, and/or can comprise the same or similar functionality as, respective components (e.g., respectively named components), as more fully described herein.

The diffusion light device 602 also can include or otherwise be associated with one or more data stores (e.g., one or more memories), such as data store 616, that can store machine (e.g., computer) executable components (e.g., machine executable components can include, but are not limited to, a portion of the light component 606, a portion of the diffusion component 608, all or a portion of the light management component 610, a portion of the sensor component 612, a portion of the instrument component 614, and/or all or a portion of other associated components). The data store 616 can store an environment profile 618 that can comprise data (e.g., environment data) that can relate to and/or describe characteristics (e.g., attributes) of an environment in which the diffusion light device 602 is installed or located.

The data store 616 also can store a light profile 620 that can comprise data that can relate to and/or describe the environment profile 618, capabilities of the diffusion light device 602 and configuration of the diffusion light device 602. For example, the data in the light profile 620 can comprise specifications of the diffusion light device 602, parameters of the diffusion light device 602, environmental data of the environment profile, mapping information that can map the characteristics of the environment and/or user preferences or user input information (e.g., information regarding parameter or function settings as selected by the user and/or obtained from a user profile 622) associated with a user to characteristics of the diffusion light device 602, to respective functions of the diffusion light device 602, to respective parameters of respective components of the diffusion light device 602, and/or to responsive actions that can be performed by the diffusion light device 602 (e.g., by the light component 606, diffusion component 608, light management component 610, sensor component 612, instrument component 614, and/or the processor component 624, ... ) to respond to a condition(s) (e.g., environmental condition(s)) of or associated with the environment.

The data store further can store a user profile(s) 622 of a user(s) that can comprise user preferences and/or other information associated with the user. The user preferences and/or other information can include desired parameter settings, features settings, and/or function settings, etc., of the diffusion light device 602. The user can select such settings via a user interface (e.g., keyboard or keypad, voice interface, or touch display screen) of the diffusion light device 602 and/or via a user interface and/or an application 626 of another device 628 that can communicate with the diffusion light device 602. There can be separate user profiles for different users of the diffusion light device 602.

The data store 616 can store data structures (e.g., user data, metadata), code structure(s) (e.g., modules, objects, hashes, classes, procedures) or instructions, information relating to operation of the diffusion light device 602 or associated diffusion light devices (e.g., 604), parameters, responsive actions (e.g., responsive to environmental conditions of the environment), policies, defined light management criteria, defined environment criteria, algorithms (e.g., defined light management algorithm(s)), protocols, interfaces, tools, and/or other information, to facilitate controlling operations associated with the diffusion light device 602. In an aspect, the processor component 624 can be functionally coupled (e.g., through a system bus 630 and/or a memory bus (not shown in FIG. 6)) to the data store 616 in order to store and retrieve information desired to operate and/or confer functionality, at least in part, to the light component 606, diffusion component 608, light management component 610, sensor component 612, instrument component 614, the processor component 624, motor component 632, and data store 616, etc., and/or substantially any other operational aspects of the diffusion light device 602.

The diffusion light device 602 also can include or otherwise be associated with at least one processor component, including the processor component 624, that can execute the machine executable components and/or machine executable instructions stored in the data store 616. The processor component 624 can work in conjunction with the other components (e.g., the light component 606, diffusion component 608, the light management component 610, sensor component 612, instrument component 614, data store 616, and motor component 632) to facilitate performing the various functions of the diffusion light device 602. The processor component 624 can employ one or more processors, microprocessors, or controllers that can process data, such as information relating to operation of the diffusion light device 602 or associated diffusion light devices (e.g., 604), parameters, responsive actions (e.g., responsive to environmental conditions of the environment), policies, defined light management criteria, defined environment criteria, algorithms (e.g., defined light management algorithm(s)), protocols, interfaces, tools, and/or other information, to facilitate operation of the diffusion light device 602, as more fully disclosed herein, and control data flow between the diffusion light device 602 and other components or devices (e.g., one or more other diffusion light device (e.g., 604) associated with the communication network 634, one or more devices, such as device(s) 628, associated with the communication network 634, network devices of the communication network 634, data sources, applications, ... ) associated with the diffusion light device 602.

In some embodiments, the diffusion light device 602 can include a motor component 632 that can comprise one or more motors (e.g., one or more servo motors) that can be employed to adjust (e.g., modify, change) a beam spread of light emitted from the light component 606 and/or a beam spread of processed light (e.g., diffused light) emitted from the diffusion component 608. In some implementations, the one or more motors of the motor component 632 can include or be associated with a sensor that can provide position information regarding the position of the motor (e.g., servo motor) as feedback to facilitate controlling position of the motor and thereby controlling the beam spread of light or processed light. In certain embodiments, the one or more of the motors can be micro servo motors.

The system bus 630 of the diffusion light device 602 can couple the various components including, but not limited to, the light component 606, diffusion component 608, light management component 610, the sensor component 612, the instrument component 614, the data store 616, the processor component 624, motor component 632, and/or other components of the diffusion light device 602 to each other. The one or more other diffusion light devices (e.g., 604) can comprise the same or similar components and/or functionality as the diffusion light device 602. For reasons of brevity, the components (e.g., light component, diffusion component, light management component, sensor component, instrument component, data store, processor component, motor component, . . . ) of the one or more other diffusion light devices (e.g., 604) are not shown in FIG. 6.

The communication network 634 can comprise a macro communication network and/or a micro communication network. The macro communication network can be, can comprise, or can be associated with a core network, a cellular network, an IP-based network, wireless fidelity (Wi-Fi), Wi-Max, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Wi-Max, Gi-Fi, Hi-Fi, Bluetooth, ZigBee, etc., and/or can be associated with (e.g., connected to) the macro communication network. The micro communication network can be or can comprise, for example a local area network (LAN) or wireless LAN (WLAN), that can facilitate connecting certain devices (e.g., diffusion light devices (e.g., 602, 604) and/or other devices (e.g., 628)) associated with the micro communication network to each other and/or to the macro communication network. The macro communication network and/or a micro communication network can employ radio communication, microwave communication, satellite communication, optical communication, sonic communication, electromagnetic induction communication, or any other desired (e.g., suitable) communication technology.

Respective communication devices (e.g., diffusion light device 602, diffusion light device(s) 604, and/or device(s) 628, . . . ) can be associated with (e.g., communicatively connected to) the communication network 634 via a wireless communication connection or a wireline (e.g., wired) communication connection (e.g., via a cell and associated base station). The respective communication devices (e.g., diffusion light device 602, diffusion light device(s) 604, and/or device(s) 628, . . . ) can operate and communicate in the communication network environment. At various times, a communication device (e.g., diffusion light device 602, diffusion light device(s) 604, and/or device(s) 628, . . . ) can be communicatively connected via a wireless communication connection(s) to one or more radio access networks (RANs) (not shown), which can comprise one or more base stations (not shown) to communicatively connect the communication device to the communication network 634 to enable the communication device to communicate with other communication devices associated with (e.g., communicatively connected to) the communication network 634 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 634 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 634 (e.g., macro communication network, micro communication network, core network, cellular network, or a network comprising a core network, a cellular network, and/or an IP-based network) can facilitate routing voice and data communications between a communication device(s) (e.g., diffusion light device 602, diffusion light device(s) 604, and/or device(s) 628, . . . ) and another communication device associated with the communication network 634 in the communication network environment. The communication network 634 also can allocate resources to the communication devices in the communication network 634, convert or enforce protocols, establish and enforce quality of service (QOS) for the communication devices, provide applications or services in the communication network 634, translate signals, and/or perform other desired functions to facilitate system interoperability and communication in the communication network 634 (e.g., wireless portion of the communication network 634 or wireline portion of the communication network 634). The communication network 634 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., diffusion light device 602, diffusion light device(s) 604, and/or device(s) 628, . . . ) is moved through a wireless communication network environment, at various times, the communication device(s) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., a macro base station or micro base station) can serve a specified coverage area to facilitate communication by the communication device(s) (e.g., diffusion light device 602, diffusion light device(s) 604, and/or device(s) 628, . . . ) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) (e.g., diffusion light device 602, diffusion light device(s) 604, and/or device(s) 628, . . . ) located in the respective area covered by the respective cell, where such coverage can be achieved via a wireless link (e.g., uplink (UL), downlink (DL)). When an attachment attempt is successful, the communication device(s) (e.g., diffusion light device 602, diffusion light device(s) 604, and/or device(s) 628, . . . ) can be served by the AP and incoming voice and data traffic can be paged and routed to the communication device(s) through the AP, and outgoing voice and data traffic from the communication device(s) can be paged and routed through the AP to other communication devices in the communication network environment. In an aspect, the communication device(s) (e.g., diffusion light device 602, diffusion light device(s) 604, and/or device(s) 628, . . . ) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

It is to be appreciated and understood that, in some embodiments, the diffusion light device 602 can establish a direct communication connection (e.g., a direct wireline or wireless communication connection) with the other diffusion light device(s) 604 and/or the device(s) 628, and can communicate with the other diffusion light device(s) 604 and/or the device(s) 628 without using the communication network 634.

The device 628 can be any electronic device that can electronically interact (e.g. unidirectional interaction or bidirectional interaction) with the diffusion light device 602 and/or diffusion light device(s) 604, wherein non-limiting examples of a device 628 can comprise a wearable electronic device or a non-wearable electronic device. It is to be appreciated that interaction can include in a non-limiting example, communication, control, physical interaction, or any other suitable interaction between devices (e.g., between the device 628 and the diffusion light device 602). A wearable device can include, for example, heads-up display glasses, a monocle, eyeglasses, contact lens, sunglasses, a headset, a neck band, a watch, a visor, a cap, a mask, a headband, clothing, or any other suitable device that can be worn by a human or non-human user, wherein the wearable device comprises electronic components. Non-wearable devices can comprise, for example, a mobile device, a mobile phone, a camera, a camcorder, a video camera, a laptop computer, a tablet device (e.g., an electronic tablet or electronic notebook), a desktop computer, a server system, a set top box (e.g., a cable set top box, a satellite set top box), a cable modem, a television set, a monitor, a media extender device, a blu-ray device, a DVD (digital versatile disc or digital video disc) device, a compact disc device, a video game system, a portable video game console, an audio/video receiver, a radio device, a portable music player, a navigation system (e.g., a GPS system), a car stereo, a mainframe computer, a robotic device, an artificial intelligence system, a home automation system, a security system, a messaging system, a presentation system, a sound system, a warning system, a fire suppression system, a lighting system, a network storage device, a communication device, a web server device, a network switching device, a network routing device, a gateway device, a network hub device, a network bridge device, a control system, a washing machine, a dryer, a refrigerator, a dishwashing machine, an oven, a stove, a microwave, a coffee maker, a kitchen appliance, a toy, or any other suitable device. In some embodiments, the device 628 can be equipped with a communication device that can enable the device 628 to communicate with the diffusion light device 602 and/or the diffusion light device(s) 604 over the communication network 634 or via a direct communication connection (e.g., a direct wireline or wireless communication connection). It is to be appreciated that the device 628 can be employed by a user to interact with the diffusion light device 602 and/or the diffusion light device(s) 604.

In some embodiments, two or more of the respective diffusion light devices (e.g., 602, 604) can coordinate with each other to understand the respective environments in which the respective diffusion light devices (e.g., 602, 604) are installed or located, determine respective objectives of the respective installations or locations, perform respective self-configurations according to the respective objectives, and respectively operate to achieve the respective objectives.

For instance, the diffusion light device 602 can be associated with an area, and another diffusion light device(s) 604 can be associated with another area(s), which can be completely distinct from the area or can partially cover (e.g., encompass) the area associated with the diffusion light device 602. The light management component 610 (e.g., a network component of the light management component 610) of the diffusion light device 602 can detect and contact the other diffusion light device(s) 604 (e.g., a network component(s) of the other light management component(s) of the other diffusion light device(s) 604) via the communication network 634 or a direct communication connection. The respective light management components of the respective diffusion light devices (e.g., 602, 604) can exchange network-related information and/or other information to facilitate setting up a communication connection with each other, and can establish the communication connection(s) between the diffusion light device 602 and the other diffusion light device(s) 604 based at least in part on the network-related information and/or other information. The communication connection can be a wireline communication connection and/or a wireless communication connection.

The diffusion light device 602 can communicate, via the communication connection and the communication network 634 (or direct communication connection), the environment profile 618, the light profile 620, and/or user profile 622 associated with the diffusion light device 602 to the at least one other diffusion light device 604, wherein the environment profile can comprise environmental profile information regarding the environmental conditions associated with the area associated with (e.g., in proximity to) the diffusion light device 602, the light profile can comprise light profile information regarding the features (e.g., characteristics, attributes, functions, . . . ) of the diffusion light device 602, and the user profile can comprise information regarding user preferences and/or other information associated with the user. The other diffusion light device(s) 604 can communicate, via the communication connection and the communication network 634 (or the direct communication connection), its environment profile(s), light profile(s), and/or user profile(s) associated with the other diffusion light device(s) 604 to the diffusion light device 602, wherein the environment profile(s) associated with the other diffusion light device(s) 604 can comprise environmental profile information regarding the environmental conditions associated with the other area(s) associated with (e.g., in proximity to) the other diffusion light device(s) 604, the light profile(s) associated with the other diffusion light device (s) 604 can comprise light profile information regarding the features (e.g., characteristics, attributes, functions, . . . ) of the other diffusion light device(s) 604, and the user profile(s) can comprise information regarding user preferences and/or other information associated with the other user(s).

The respective diffusion light devices (e.g., 602, 604) can determine and coordinate respective actions, which can be responsive to the respective environmental conditions associated with the respective diffusion light devices (e.g., 602, 604), between the diffusion light device 602 and the other diffusion light device(s) 604, based at least in part on the results of analyzing the respective environmental profile information, the respective light profile information, and/or the respective user profile information associated with the respective diffusion light devices (e.g., 602, 604). For instance, the light management component 610 of the diffusion light device 602, and/or another light management component(s) of the other diffusion light device(s) 604, can analyze (e.g., respectively analyze) the respective environmental profile information, the respective light profile information, and/or the respective user profile information associated with the respective diffusion light devices (e.g., 602, 604). Based at least in part on the results (e.g., the respective results) of the analysis (e.g., the respective analysis), the light management component 610 of the diffusion light device 602, and/or the other light management component(s) of the other diffusion light device(s) 604, can determine the respective actions that are to be performed by the respective diffusion light devices (e.g., 602, 604), in accordance with the defined light management criteria. The diffusion light device 602 (e.g., light management component 610) and the other diffusion light device(s) 604 (e.g., other light management component(s)) can negotiate and coordinate with each other to facilitate determining the respective actions that the respective diffusion light devices (e.g., 602, 604) are to perform to be responsive to the respective environmental conditions associated with the respective diffusion light devices.

In response to determining the respective actions and coordinating the respective actions between the respective diffusion light devices (e.g., 602, 604), the respective diffusion light devices (e.g., 602, 604) can perform the respective actions. For instance, the diffusion light device 602 and the other diffusion light device (s) 604 can perform their respective actions in a coordinated manner to be responsive to the respective environmental conditions associated with the respective diffusion light devices (e.g., 602, 604). For example, the light component 606, diffusion component 608, light management component 610, instrument component 614, and/or the processor component 624 of the diffusion light device 602 can respectively perform operations to facilitate performing the action(s) (e.g., responsive action (s)) determined for the diffusion light device 602. Similarly, the other light component(s), other diffusion component(s), other flow management component(s), other instrument component(s), and/or other processor component(s) of the other diffusion light device(s) 604 can respectively perform operations to facilitate performing the action(s) determined for the other diffusion light device(s) 604.

It is to be appreciated and understood that the various aspects of systems (e.g., the system 600 or other system(s) disclosed herein), apparatuses or processes described or explained in this disclosure can constitute machine-executable component(s) embodied within machine(s) (e.g., computer(s)), e.g., embodied in one or more machine readable mediums (or media) associated with one or more machines. Such component(s), when executed by the one or more machines, e.g., one or more computers, one or more computing devices, one or more virtual machines, etc., can cause the one or more machines to perform the operations described herein.

It also is to be appreciated and understood that, in some implementations, a user (e.g., an operator) can employ a user interface (not shown) of an application 626 on a device (e.g., 628) to enter information that can override data in the environment profile 618, the light profile 620, the user profile 622, and/or actions determined by the diffusion light device 602. The application 626 can generate and present, via a display screen of the device 628, one or more user interfaces with which the user can interact to input information, such as user preferences, selections, commands, and/or other information, that can be used to facilitate selecting or setting parameters, features, functions, etc., of the diffusion light device 602 (e.g., to the extent permitted in accordance with the defined light management criteria. In certain implementations, as an alternative to using the application 626, the user can utilize a web browser presented on the device 628 to interact with the diffusion light device 602 to input (e.g., enter or communicate) the information (e.g., the user preferences, selections, commands, and/or other information).

In some implementations, the diffusion light device 602 can enhance (e.g. upgrade, augment, improve, increase, etc.) operation of a legacy (e.g., older) device. There are many legacy devices that can operate reliably for a long period of time. However, given their lengthy operational lifecycles, they may fall behind in operational capabilities as compared to newer devices. Many of these legacy devices can have lights installed in them. The diffusion light device 602 can be installed in a legacy device as a retrofit to enhance the capability of the legacy device. A legacy device can include any device that can have a light which can be replaced with the diffusion light device 602. Furthermore, a legacy device can include any device that does not have a light, but on which the diffusion light device 602 can be fitted. Non-limiting examples of legacy devices can include a refrigerator, a freezer, a dryer, a washing machine, a vehicle, a machine, a flashlight, a range hood, an oven, a microwave, or any other suitable legacy device.

In certain implementations, the diffusion light device 602 can employ a high-speed data transfer mechanism (e.g. Li-Fi) to transfer content to another diffusion light device(s) 604 and/or a device(s) 628. For example, the diffusion light device 602 can transfer a movie file of a movie to a television, laptop, electronic tablet, or cell phone using Li-Fi for playback on such device.

In some embodiments, one or more diffusion light devices (e.g., 602) can employ their processing capabilities to off-load or enhance processing operations of another device(s) 628 communicating with the one or more diffusion light devices (e.g., 602).

In certain implementations, a set of diffusion light devices (e.g., 602, 604, . . . ) in a building can employ their processing, memory, and/or communication capabilities to act as a cloud platform for the building.

In some implementations, the diffusion light device 602 can take an analog input, convert the analog input to digital output, and/or employ artificial intelligence with a library of functions/templates to facilitate self-configuration and/or self-operation of the diffusion light device 602.

It is to be appreciated and understood that any criteria or thresholds disclosed herein can be pre-defined, operator specified, and/or dynamically determined, for example, based at least in part on learning algorithms.

Figure 7:
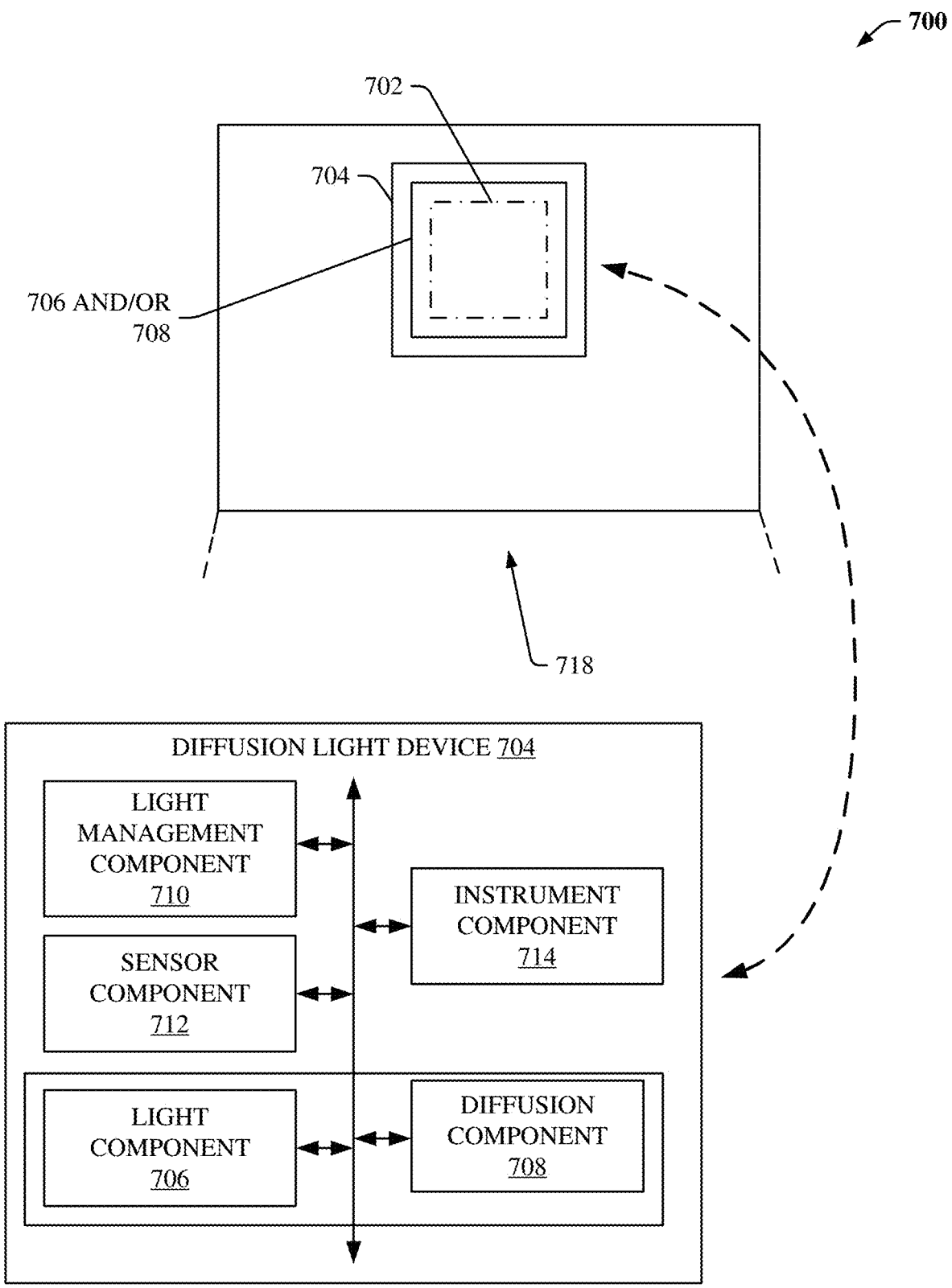
FIG. 7 presents a diagram of an example scenario in which a diffusion light device can be used as a window treatment, in accordance with various aspects and embodiments of the disclosed subject matter.

Referring to FIG. 7, FIG. 7 presents a diagram of an example scenario 700 in which a diffusion light device can be used as a window treatment, in accordance with various aspects and embodiments of the disclosed subject matter. The example scenario 700 can include a window 702 having a defined size and defined shape. For example, the window 702 can be rectangular (as depicted), square, round, elliptical, or irregular shaped.

A diffusion light device 704 can be sized and shaped to correspond, or substantially correspond, to the size and shape of the window 702. The diffusion light device 704 can comprise a light component 706, a diffusion component 708, a light management component 710, a sensor component 712, and an instrument component 714. The light component 706, diffusion component 708, light management component 710, sensor component 712, and instrument component 714 can respectively be the same as or similar to, and/or can comprise the same or similar functionality as, respective components (e.g., respectively named components), as more fully described herein.

The size and shape (e.g., rectangular) of the diffusion component 708 and/or the light component 706 can be sized and shaped to correspond, or substantially correspond, to the size and shape of the window 702, wherein the diffusion component 708 and/or the light component 706 can operate or function as a window treatment (e.g., window shade, window cover, or window blind) when the diffusion light device 704 is placed over the window 702. The light component 706 can comprise one or more light elements, wherein the light elements can be distributed throughout (e.g., across) the window treatment, as desired. The diffusion component 708 and/or the light component 706 can be formed of one or more layers of a material(s) and/or fabric(s) (e.g., an LED fabric(s) or material(s)), wherein light elements can be spread throughout the material(s) or fabric(s), and wherein the diffusion component 708 can be configured to be associated with the light component 706 and interact with the light (e.g., light beam or light energy) being emitted from the light elements of the light component 706 to diffuse or otherwise process (e.g., filter, alter, . . . ) the light to produce diffused light or otherwise processed light (e.g., based on sensed conditions and in accordance with the defined light management criteria), which can be emitted from the diffusion component 708 and perceived by the user(s).

The light management component 710 can control (e.g., modify) the parameters, characteristics, or properties of the light component 706 (e.g., modify illumination level, color, or other characteristics) and/or the diffusion component 708 (e.g., modify the diffusion characteristics or parameters) based at least in part on various sensed conditions, such as, for example, ambient illumination in the environment, weather or air conditions, activity of a user(s) in the environment, music playing in the environment, a program playing on the television in the environment, a time of day, a time of year, and/or other conditions, as more fully described herein. For example, one or more sensors of the sensor component 712 can sense the light conditions (e.g., bright sunny light, overcast daylight conditions, darkness at night time) coming through the window 702. Based at least in part on the result obtained from analyzing the sensor data relating to the light conditions and/or other sensed environmental conditions, the light management component 710 can determine what the parameters, characteristics, or properties of the light component 706 and/or the diffusion component 708 should be, determine the respective adjustments to be made to the respective parameters, characteristics, or properties of the light component 706 and/or the diffusion component 708, and can generate respective instructions regarding such adjustments or otherwise facilitate performing the adjustments to the light component 706 and diffusion component 708. The light component 706 and diffusion component 708 can be (re)configured (e.g., automatically, dynamically, or self configured), based at least in part on the determined respective adjustments, such that the light component 706 emits desired (e.g., enhanced, suitable, or optimal) light, and the diffusion component 708 desirably diffuses or otherwise processes the emitted light (if any) and/or the light (if any) coming in through the window 702 to produce desired (e.g., enhanced, suitable, or optimal) diffused or processed light as an output.

For instance, if the sun is shining brightly through the window 702 of a room 718, it may be desirable (e.g., to the user) to have some of that sunlight emitted into the room 718 where the window 702 resides, but have the sunlight suitably diffused so that it does not shine too brightly in the room 718 and/or so that there is not undesirable sun glare being cast into the room 718 through the window 702, and/or to reduce the amount of heat introduced into the room 718 by the direct sunlight through the window 702. The sensors of the sensor component 712 can sense the bright sunlight being directed at the window 702 and generate sensor data indicating there is bright sunlight being directed at the window 702. The light management component 710 can analyze the sensor data, and, based at least in part on the analysis results, can determine appropriate (e.g., enhanced) parameters for the light component 706 and the diffusion component 708, in accordance with the defined light management criteria, wherein, for example, the parameters for the light component 706 can be set to have the light component 706 emit no light (e.g., in the off state), and the parameters for the diffusion component 708 can be set to have the diffusion component 708 at a relatively high diffusion level to significantly diffuse the sunlight coming into the room 718 through the window 702.

If, however, it is night time, and there is little or no light coming into the room 718 through the window 702, such conditions can be sensed by the sensors of the sensor component 712. Based at least on part the results of analyzing sensor data relating to such conditions, the light management component 710 determine appropriate (e.g., enhanced) parameters for the light component 706 and the diffusion component 708, in accordance with the defined light management criteria, wherein, for example, the parameters for the light component 706 can be set to have the light component 706 emit light at a certain suitable level, and the parameters for the diffusion component 708 can be set to have the diffusion component 708 at a desired diffusion level to desirably diffuse the light emitted by the light component 706, wherein the diffusion level can be lower than the diffusion level employed to diffuse bright sunlight shining through the window 702.

It is to be appreciated and understood that, while the diffusion light device 704 is described herein as being employed as a window treatment, additionally or alternatively, a diffusion light device 704 can be utilized as a wall decoration and diffusion light, an accent and diffusion light for one or more compartments of a bookcase, an accent and diffusion light for one or more compartments of an alcove or a recessed portion(s) of a wall, an accent and diffusion light used in connection with an art display, and/or for other desired uses.

Figure 8:
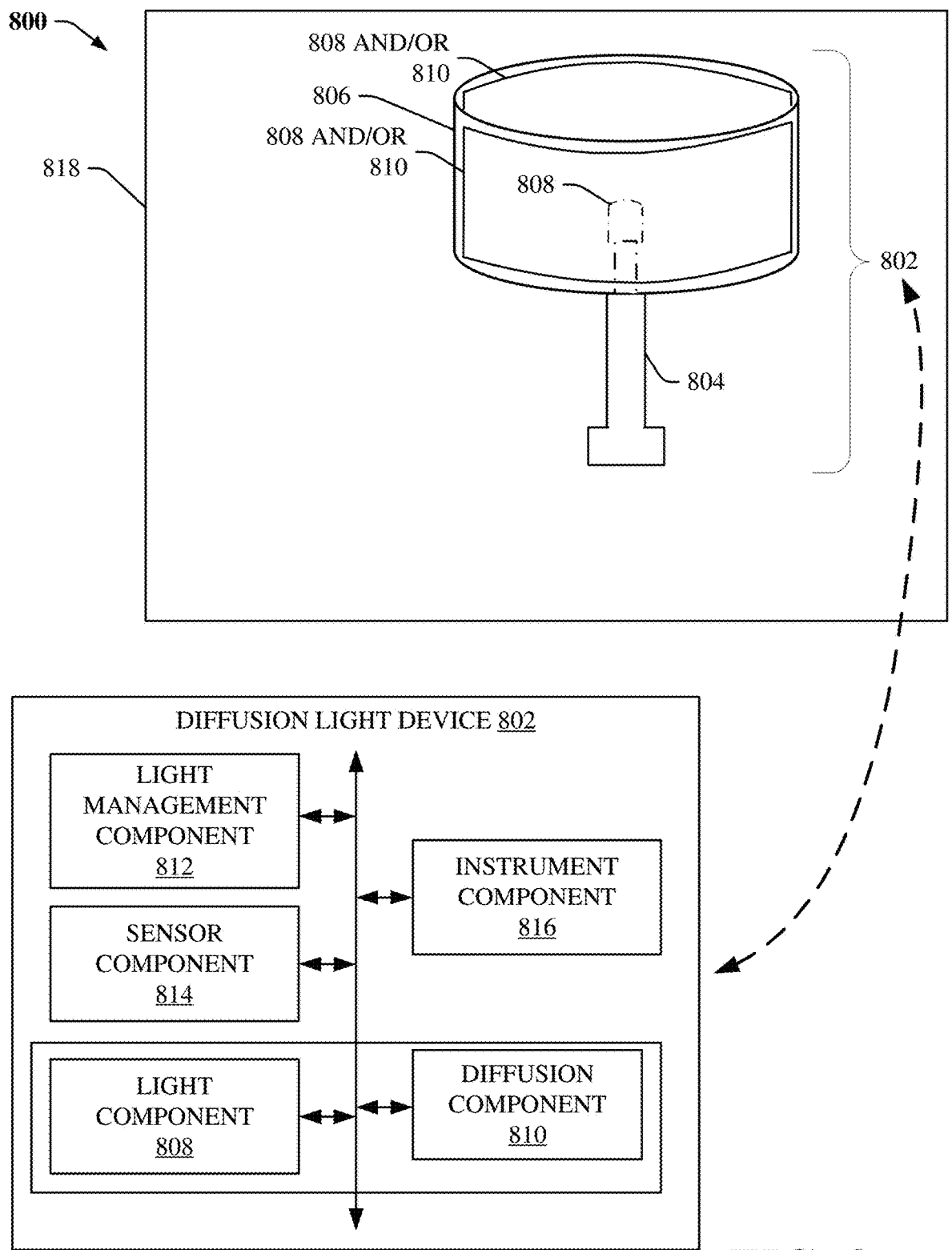
FIG. 8 illustrates a diagram of an example scenario in which a diffusion light device can be used as a lamp or lamp shade, in accordance with various aspects and embodiments of the disclosed subject matter.

Turning to FIG. 8, FIG. 8 illustrates a diagram of an example scenario 800 in which a diffusion light device can be used as a lamp or lamp shade, in accordance with various aspects and embodiments of the disclosed subject matter. The example scenario 800 can include a diffusion light device 802 that can comprise a lamp base component 804 and a lamp shade 806. The lamp base component 804 and the lamp shade can have respective sizes and shapes. For example, the lamp shade 806 can be cylindrical to surround or substantially surround the light being emitted from the light component 808 on the lamp base component 804, or can have another desired shape (e.g., a regular or irregular shape).

The diffusion light device 802 can comprise the light component 808 on the lamp base component 804, a diffusion component 810 that can be part of the lamp shade 806, a light management component 812, a sensor component 814, and an instrument component 816. The light component 808, diffusion component 810, light management component 812, sensor component 814, and instrument component 816 can respectively be the same as or similar to, and/or can comprise the same or similar functionality as, respective components (e.g., respectively named components), as more fully described herein.

In some embodiments, the diffusion component 810 can operate or function as a lamp shade or lamp cover when the diffusion light device 802 is placed around or in proximity to the light component 808. The light component 808 can comprise one or more light elements that can emit light. The diffusion component 810 can be formed of one or more layers of a material(s) and/or fabric(s), wherein the diffusion component 810 can interact with the light (e.g., light beam or light energy) being emitted from the light elements of the light component 808 to diffuse or otherwise process (e.g., filter, alter, . . . ) the light to produce diffused light or otherwise processed light (e.g., based on sensed conditions and in accordance with the defined light management criteria), which can be emitted outward from the diffusion component 810 (e.g., the lamp shade 806 comprising the diffusion component 810) and perceived by the user(s).

In other embodiments, the light component 808 and the diffusion component 810 can be integrated with each other in the material(s) or fabric(s), wherein the lamp shade 806 can be a light cover or shell that can comprises light elements and diffuses or processes the light emitted by the light elements. The light component 808 can comprise one or more light elements, wherein the light elements can be distributed throughout (e.g., across) the lamp cover 806, as desired. The diffusion component 810 and/or the light component 808 can be formed of one or more layers of a material(s) and/or fabric(s) (e.g., an LED fabric(s) or material(s)), wherein light elements can be spread throughout the material(s) or fabric(s), and wherein the diffusion component 810 can be configured to be associated with the light component 808 and interact with the light (e.g., light beam or light energy) being emitted from the light elements of the light component 808 to diffuse or otherwise process (e.g., filter, alter, . . . ) the light to produce diffused light or otherwise processed light (e.g., based on sensed conditions and in accordance with the defined light management criteria), which can be emitted from the diffusion component 810 (e.g., from the lamp cover 806) and perceived by the user(s).

In still other embodiments, one light component can be located on the lamp base component 804, and another light component can be part of the lamp cover 806 (e.g., integrated with the diffusion component 810).

The light management component 812 can control the operation of the light component 808, diffusion component 810, and other components of the diffusion light device 802 to produce (e.g., create, generate) a desired diffusion or processed pattern of light that can emanate from the diffusion light device 802 (e.g., from the diffusion component 810 of the lamp cover 806), in accordance with the sensed conditions, user preferences, and defined light management criteria. For instance, the light management component 812 can control (e.g., modify) the parameters, characteristics, or properties of the light component 808 (e.g., modify illumination level, color, or other characteristics) and/or the diffusion component 810 (e.g., modify the diffusion characteristics or parameters) based at least in part on various sensed conditions, such as, for example, ambient illumination in the environment (e.g., room 818), air or weather conditions, activity of a user(s) in the environment, music playing in the environment, a program playing on the television in the environment, a time of day, a time of year, and/or other conditions, as more fully described herein. For example, one or more sensors of the sensor component 814 can sense the light conditions in the room 818 (e.g., well illuminated room, or dimly illuminated or substantially dark room). Based at least in part on the result obtained from analyzing the sensor data relating to the light conditions and/or other sensed conditions, and/or user preferences of the user, the light management component 812 can determine what the parameters, characteristics, or properties of the light component 808 and/or the diffusion component 810 should be, determine the respective adjustments to be made to the respective parameters, characteristics, or properties of the light component 808 and/or the diffusion component 810, and can generate respective instructions regarding such adjustments or otherwise facilitate performing the adjustments to the light component 808 and diffusion component 810. The light component 808 and diffusion component 810 can be (re)configured (e.g., automatically, dynamically, or self configured), based at least in part on the determined respective adjustments, such that the light component 808 emits desired (e.g., enhanced, suitable, or optimal) light, and the diffusion component 810 desirably diffuses or otherwise processes the emitted light to produce desired (e.g., enhanced, suitable, or optimal) diffused or processed light as an output for emission to the room 818.

For example, when the room 818 is dimly lit, the sensor(s) of the sensor component 814 can sense that the illumination level in the room 818 is relatively low, generating sensor data indication that the illumination level is relatively low. Based at least in part on the results of analyzing the sensor data (and/or other sensor data relating to other conditions of the room 818) and/or user preferences of the user, the light management component 812 can determine parameter settings for the light component 808 to have the light component 808 emit a suitable (e.g., enhanced, or optimal) amount of light into the room 818, and parameter settings for the diffusion component 810 to have the diffusion component diffuse or otherwise process the emitted light to produce a suitable (e.g., enhanced, or optimal) diffused or processed light as an output for emission to the room 818, in accordance with the defined light management criteria. For instance, the diffused or processed light emitted by the diffusion light device 802 can desirably illuminate the dimly light room, while providing desirable diffusion (e.g., diffusion pattern) of the light so that the light does not have a harsh glare to it and the light is desirably spread throughout the room 818.

As another example, a user can have a song by Prince playing on an audio system in the room 818. A sensors(s) (e.g., audio sensor(s)) of the sensor component 814 can sense audio signals of the Prince song being played, and can generate sensor data relating to the audio signals. The light management component 812 can analyze the sensor data. Based at least in part on the results of the analysis of the sensor data, the light management component 812 can determine that the audio signals represent a Prince song. Further, based at least in part on the results of analyzing the defined light management criteria and/or user preferences of the user (or default preferences associated with the diffusion light device 802), the light management component 812 can determine that, when a Prince song is being played, the diffusion light device 802 is to be set to produce a violet (e.g., purple) light that is the same or substantially the same as the violet color associated with Prince, is to use a suitable diffusion level to produce a relatively soft violet light as an output to the room 818, and/or is to generate, on at least a portion of the diffusion component 810 (e.g., on a portion of the material(s) or fabric(s) of the diffusion component 810 of the lamp cover 806), a pattern of diffused and/or processed light that can depict the custom symbol (a.k.a., the "love symbol") that Prince used to identify himself when Prince was referring to himself as "the Artist Formerly Known as Prince" (e.g., wherein the custom symbol can be displayed on the lamp cover 806 and/or projected onto a wall of the room 818). Based at least in part on corresponding instructions or parameter settings received from the light management component 812, the light component 808 can be configured to generate the desired light (e.g., violet light and/or other light) at a desirable illumination level, and the diffusion component 810 can diffuse and/or otherwise process the light emitted from the light component 808 to desirably diffuse the light to produce a relatively soft violet light as an output to the room 818, desirably process (e.g., filter) the light to produce the desired violet color of light, and/or generate, on at least a portion of the diffusion component 810 (e.g., on a portion of the material(s) or fabric(s)), the pattern of diffused and/or processed light that can depict the custom symbol associated with Prince.

Figure 9:
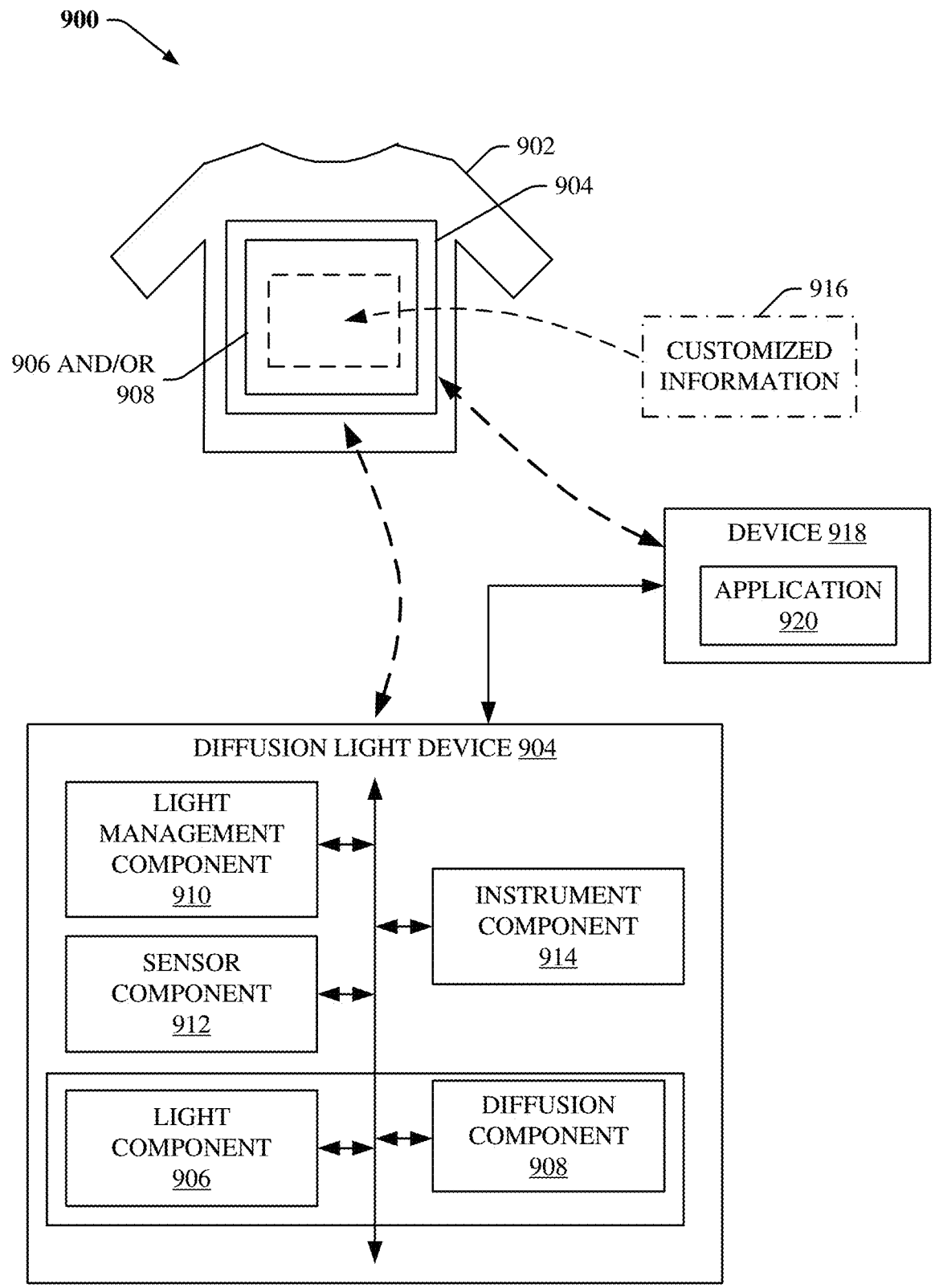
FIG. 9 depicts a diagram of another example scenario that can include an article of clothing that can comprise a diffusion light device, in accordance with various aspects and embodiments of the disclosed subject matter.

FIG. 9 depicts a diagram of another example scenario 900 that can include an article of clothing that can comprise a diffusion light device, in accordance with various aspects and embodiments of the disclosed subject matter. The example article of clothing 902 can comprise a diffusion light device 904. The diffusion light device 904 can comprise a light component 906, a diffusion component 908, a light management component 910, a sensor component 912, and an instrument component 914. The light component 906, diffusion component 908, light management component 910, sensor component 912, and instrument component 914 can respectively be the same as or similar to, and/or can comprise the same or similar functionality as, respective components (e.g., respectively named components), as more fully described herein.

The article of clothing 902 can be or can comprise virtually any desired type of clothing, such as, for example, a shirt (as depicted in FIG. 9), pants, shoes, hat, visor, coat, jacket, scarf, belt, socks, or other type of bodywear. The article of clothing 902 also can have virtually any desired size and shape, for example, to suitably fit the size and shape of at least a portion of the body of the user.

In some embodiments, the article of clothing 902 can be formed from one or more materials or fabrics, wherein the light component 906 and the diffusion component 908 can be integrated with each other in a material(s) or fabric(s) of the one or more materials or fabrics to form at least a portion of the article of clothing 902. The light component 906 can comprise one or more light elements, wherein the light elements can be distributed throughout (e.g., across) at least a portion of the material(s) or fabric(s) of the article of clothing 902, as desired. The light component 906 and/or the diffusion component 908 can be formed of one or more layers of the material(s) and/or fabric(s) (e.g., an LED fabric(s) or material(s)), wherein light elements of the light component 906 can be desirably spread (e.g., distributed) throughout the material(s) or fabric(s), and wherein the diffusion component 908 can be configured to be associated with the light component 906 and interact with the light (e.g., light beam or light energy) being emitted from the light elements of the light component 906 to diffuse or otherwise process (e.g., filter, alter, . . . ) the light to produce diffused light or otherwise processed light (e.g., based at least in part on sensed conditions and in accordance with the defined light management criteria), which can be emitted from the diffusion component 908 (e.g., from the article of clothing 902) and perceived by the user(s) or other people or entities.

The light management component 910 can control the operation of the light component 906, diffusion component 908, and other components of the diffusion light device 904 to produce (e.g., create, generate) a desired diffusion or processed pattern of light that can emanate from the diffusion light device 904 (e.g., from the diffusion component 908 of the diffusion light device 904), in accordance with the sensed conditions, user preferences, and defined light management criteria. For instance, the light management component 910 can control (e.g., modify) the parameters, characteristics, or properties of the light component 906 (e.g., modify illumination level, color, or other characteristics) and/or the diffusion component 908 (e.g., modify the diffusion characteristics or parameters) based at least in part on various sensed conditions, such as, for example, ambient illumination in the environment, air or weather conditions, activity of the user(s) in the environment, music playing in the environment, a program playing on the television in the environment, a time of day, a time of year, and/or other conditions, as more fully described herein. For example, one or more sensors of the sensor component 912 can sense the light conditions in the environment (e.g., well illuminated area, or dimly illuminated or substantially dark area). Based at least in part on the result obtained from analyzing the sensor data relating to the light conditions and/or other sensed conditions, and/or user preferences of the user, the light management component 910 can determine what the parameters, characteristics, or properties of the light component 906 and/or the diffusion component 908 should be, determine the respective adjustments to be made to the respective parameters, characteristics, or properties of the light component 906 and/or the diffusion component 908, and can generate respective instructions regarding such adjustments or otherwise facilitate performing the adjustments to the light component 906 and diffusion component 908. The light component 906 and diffusion component 908 can be (re)configured (e.g., automatically, dynamically, or self configured), based at least in part on the determined respective adjustments, such that the light component 906 can emit desired (e.g., enhanced, suitable, or optimal) light, and the diffusion component 908 can desirably diffuse or otherwise process the emitted light to produce desired (e.g., enhanced, suitable, or optimal) diffused or processed light as an output for emission from the diffusion light device 904 to the environment.

The diffusion light device 904 can operate, for example, as described herein with regard to the clothing (e.g., shirt) example disclosed in connection with FIG. 1 or as otherwise described herein. For instance, while the user is wearing the article of clothing 902, comprising the diffusion light device 904, the sensors of the sensor component 912 can detect conditions associated with the environment in which the user is located and generate sensor data relating to (e.g., representative of) such conditions. The light management component 910 can receive and analyze the sensor data. Based at least in part on the results of analyzing the sensor data and/or other data (e.g., user preferences of the user), the light management component 910 can determine the conditions of the environment, determine adjustments to be made to the parameters, characteristics, and/or properties of the diffusion component 908 and/or light component 906, based at least in part on the conditions, and adjust or facilitate adjusting the parameters, characteristics, and/or properties of the diffusion component 908 and/or light component 906, in accordance with the defined light management criteria.

In some embodiments, the diffusion light device 904 also generate and emit (e.g., automatically or dynamically present) customized information 916 (e.g., customized text, customized images, and/or customized graphics, and/or other customized output) based at least in part on the results of analyzing (e.g., by the light management component 910) sensor data relating to sensed conditions of the environment (e.g., obtained from the sensor component 912) and/or user input (e.g., user preferences from a user profile or other information provided by the user via a user interface), in accordance with the defined light management criteria. The customized text can comprise a desired textual message that the user wants to have presented (e.g., displayed) via the light component 906 and/or diffusion component 908 of the article of clothing 902. The customized images can comprise, for example, an image (e.g., picture) of an artist (e.g., Paul McCartney or The Beatles) in connection with the playing of a song of the artist being sensed in the environment or as otherwise desired by the user, an image of the user or one or more family members or friends of the user, an image that relates to an event or occasion with which the user is associated or at which the user is attending, and/or another desired image that the user desires to be presented by the diffusion light device 904. The customized graphics can comprise, for example, a static illustration or a dynamic illustration wherein one or more objects of the dynamic illustration can change over time, based at least in part on conditions (e.g., change in conditions over time) sensed in the environment by the sensor component 912, and as determined by the light management component 910. For example, the light management component 910 can control the operation of the dynamic illustration and can facilitate making changes to the dynamic illustration, in response to audio signals (e.g., a song, speech, or other sounds) sensed by a sensor(s) (e.g., audio sensor(s)) of the sensor component 912.

In some implementations, the diffusion light device 904 can be associated with a device 918 (e.g., a mobile phone, a computer, . . . ) that can utilize an application 920 or a web browser (not shown in FIG. 9) to communicate with the diffusion light device 904 (e.g., the light management component 910 of the diffusion light device 904) to facilitate controlling operation of the diffusion light device 904, including the diffusion and/or other processing of light by the diffusion light device 904 (e.g., by the diffusion component 908 of the diffusion light device 904). The device 918 and the application 920 can operate or function to facilitate controlling operation of the diffusion light device 904, including facilitating controlling the emission, diffusion, and/or other processing of light of the diffusion light device 904, as more fully described herein.

Figure 10:
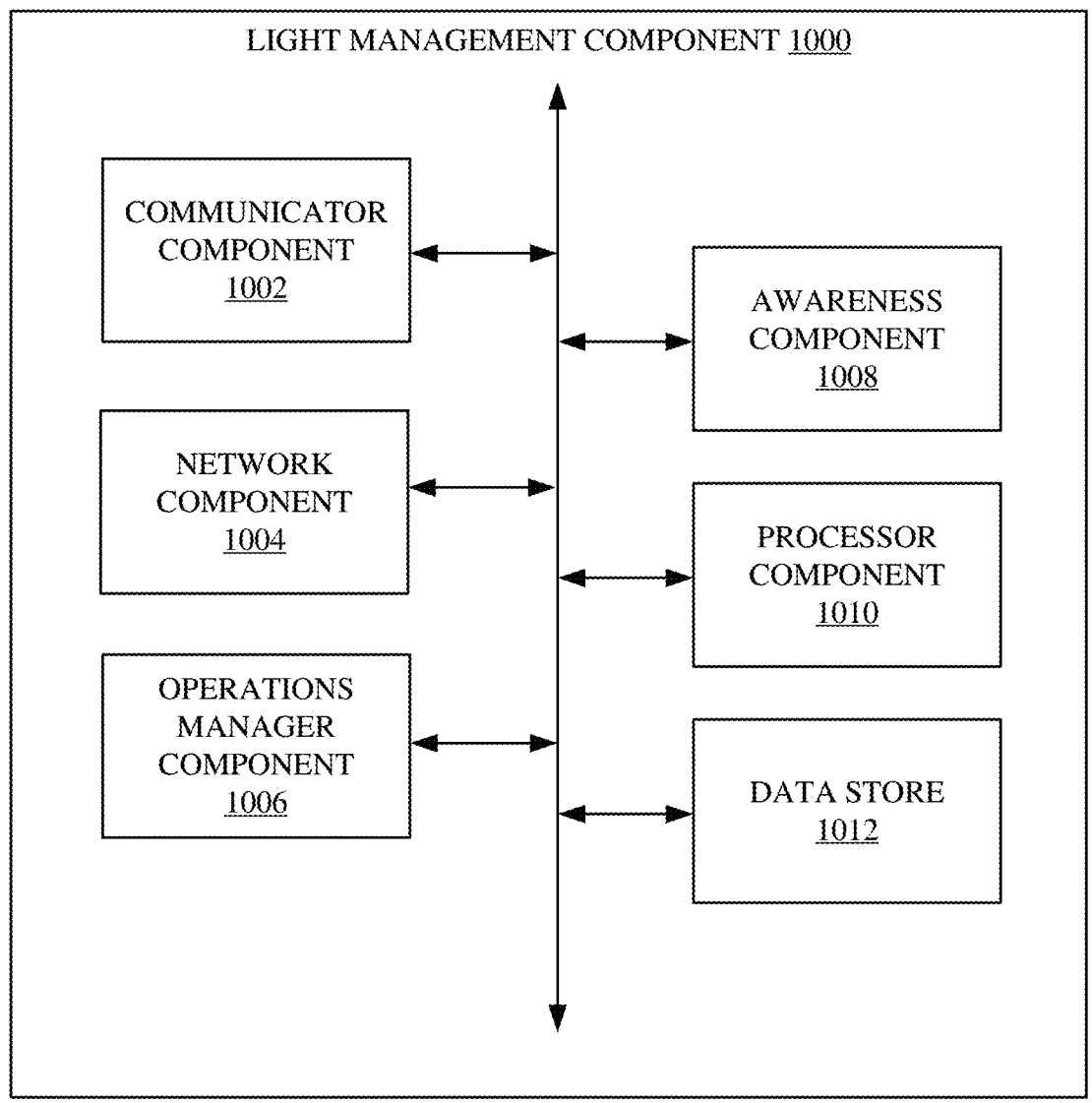
FIG. 10 depicts a block diagram of an example, non-limiting light management component, in accordance with various aspects and embodiments described herein.

FIG. 10 depicts a block diagram of an example, non-limiting light management component 1000, in accordance with various aspects and embodiments described herein. In some implementations, the light management component 1000 can be part of a diffusion light device.

The light management component 1000 can comprise a communicator component 1002 that can communicate data between the diffusion light device and one or more other devices, such as, for example, one or more other diffusion light devices and/or one or more devices (e.g., communication devices, such as a mobile phone, computer, electronic tablet, . . . ) associated with one or more entities (e.g., another user(s), law enforcement, a fire department, an emergency response entity, . . . ). The communicator component 1002 can communicate information using wireline or wireless communication technologies and protocols, as more fully described herein. The communicator component 1002 also can facilitate presenting desired visual information and/or audio information to one or more users in proximity to the diffusion light device.

The light management component 1000 also can include a network component 1004 that can employ one or more communication network technologies and/or protocols to facilitate establishing a communication connection between the diffusion light device and one or more other devices, such as, for example, one or more other diffusion light devices and/or devices associated with one or more entities. The communication connection can be a wireline communication connection and/or a wireless communication connection using wireline or wireless communication technologies and protocols, as more fully described herein.

The light management component 1000 further can comprise an operations manager component 1006 that can control (e.g., manage) operations associated with the light management component 1000. For example, the operations manager component 1006 can facilitate generating instructions to have components of the light management component 1000 perform operations, and can communicate respective instructions to respective components (e.g., communicator component 1002, network component 1004, awareness component 1008, . . . ) of the light management component 1000 to facilitate performance of operations by the respective components of the light management component 1000 based at least in part on the instructions, in accordance with the defined light management criteria and the defined light management algorithm(s). The operations manager component 1006 also can facilitate controlling data flow between the respective components of the light management component 1000 and controlling data flow between the light management component 1000 and another component(s) or device(s) (e.g., another diffusion light device(s) associated with the diffusion light device; a device, such as a communication device; a base station or other component or device of the communication network) associated with (e.g., connected to) the light management component 1000.

The light management component 1000 also can include an awareness component 1008 that can enable the diffusion light device to learn and understand the environment in which the diffusion light device is installed or located, determine one or more objectives of the installation or location of the diffusion light device, determine capabilities and/or features of the diffusion light device, perform a self-configuration of the diffusion light device in accordance with the one or more determined objectives and the determined capabilities and/or features of the diffusion light device, and perform operations to achieve the one or more determined objectives.

The light management component 1000 can comprise a processor component 1010 that can work in conjunction with the other components (e.g., communicator component 1002, network component 1004, operations manager component 1006, awareness component 1008, data store 1012) to facilitate performing the various functions of the light management component 1000. The processor component 1010 can employ one or more processors, microprocessors, or controllers that can process data, such as information relating to conditions (e.g., environmental conditions) associated with the diffusion light device and/or other associated diffusion light devices, operation of the diffusion light device or other associated diffusion light devices, parameters, characteristics and/or properties associated with the diffusion light device, responsive actions (e.g., responsive to environmental conditions of the environment), policies, defined light management criteria, defined environment criteria, algorithms (e.g., defined light management algorithm(s)), protocols, interfaces, tools, and/or other information, to facilitate operation of the light management component 1000 and the diffusion light device, as more fully disclosed herein, and control data flow between the light management component 1000 and other components (e.g., diffusion light devices, communication devices, base station or other devices of the communication network, data sources, applications, . . . ) associated with the light management component 1000.

The data store 1012 that can store data structures (e.g., user data, metadata), code structure(s) (e.g., modules, objects, hashes, classes, procedures) or instructions, information relating to conditions (e.g., environmental conditions) associated with the diffusion light device and/or other associated diffusion light devices, operation of the diffusion light device or other associated diffusion light devices, parameters, characteristics and/or properties associated with the diffusion light device, responsive actions (e.g., responsive to environmental conditions of the environment), policies, defined light management criteria, defined environment criteria, algorithms (e.g., defined light management algorithm(s)), protocols, interfaces, tools, and/or other information, to facilitate controlling operations associated with the light management component 1000 and the diffusion light device. In an aspect, the processor component 1010 can be functionally coupled (e.g., through a memory bus) to the data store 1012 in order to store and retrieve information desired to operate and/or confer functionality, at least in part, to the communicator component 1002, network component 1004, operations manager component 1006, awareness component 1008, and data store 1012, etc., and/or substantially any other operational aspects of the light management component 1000.

Figure 11:
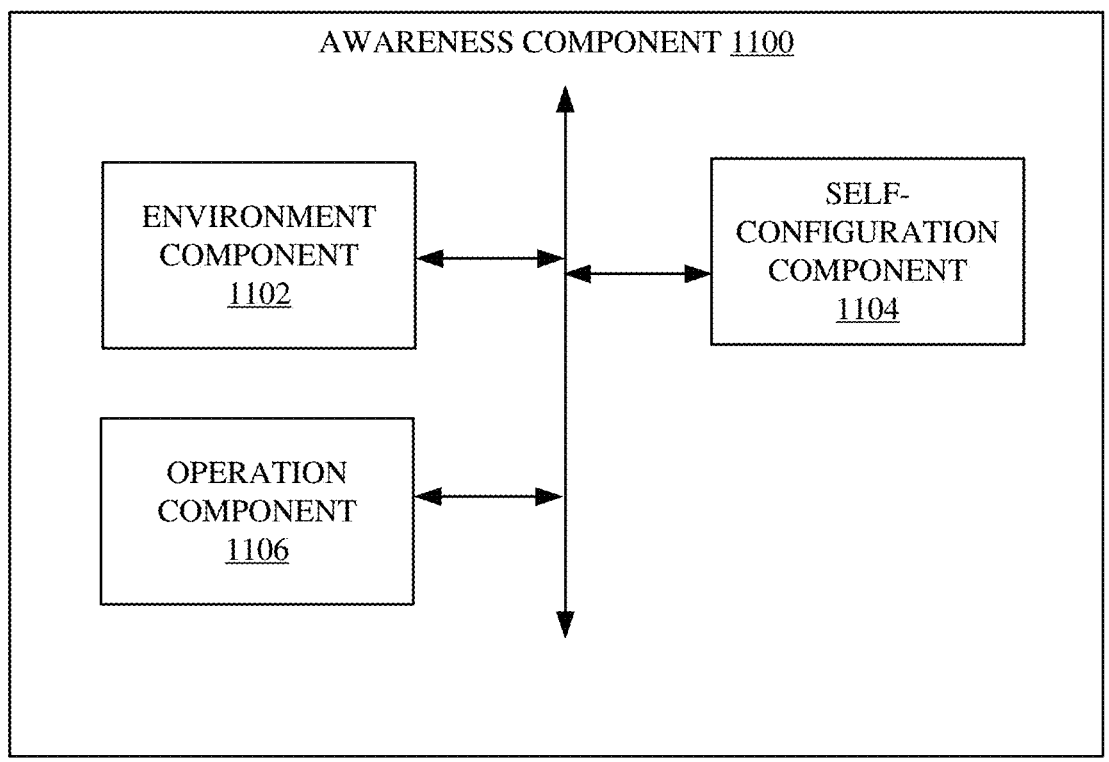
FIG. 11 illustrates a block diagram of an example, non-limiting awareness component, in accordance with various aspects and embodiments of the disclosed subject matter.

FIG. 11 illustrates a block diagram of an example, non-limiting awareness component 1100, in accordance with various aspects and embodiments of the disclosed subject matter. The awareness component 1100 can facilitate enabling a diffusion light device to determine (e.g., ascertain, infer, calculate, predict, prognose, estimate, derive, forecast, detect, and/or compute) characteristics of the environment in which the diffusion light device is installed or located, determine characteristics, capabilities, and/or features of the diffusion light device, determine one or more objectives of the installation or location of the diffusion light device, perform a configuration (e.g., automatic, dynamic, or self configuration) of the diffusion light device in accordance with the determined characteristics, capabilities, conditions, and/or features of the diffusion light device and the one or more determined objectives, and determine and execute one or more desired actions for the diffusion light device to achieve the one or more determined objectives, in accordance with one or more embodiments described herein. Repetitive description of like elements employed in other embodiments described herein is omitted for sake of brevity.

The awareness component 1100 can comprise an environment component 1102 that can determine characteristics, conditions, or features of an environment in which the diffusion light device is installed or located. The environment component 1102 can employ one or more sensors (of a sensor component) or instruments (of an instrument component) to obtain information about the environment in which the diffusion light device is installed or located. The environment component 1102 can determine characteristics or conditions of the environment, and can generate an environment profile of the environment, based at least in part on the results of analyzing the information regarding the environment. In accordance with various non-limiting embodiments, the characteristics or conditions can include objects, devices, people, flora, fauna, predators, pests, colors, scents, hazards, biohazards, chemicals, dimensional characteristics, health status, locations, topography, landscape, seascape, boundaries, atmosphere, manmade features, furniture, toys, equipment, machines, vehicles, buildings, grounds, roads, railroad tracks, water feature, rocks, trees, debris, geographic features, unsafe conditions, weather conditions, property line boundary, ground conditions, water conditions, atmospheric conditions, water currents, air currents, water salinity, air temperature, water temperature, ground temperature, ground traction, network topology, or any other suitable conditions or characteristics of the environment that can be determined from information obtained by the sensors or instruments.

It is to be appreciated and understood that the environment component 1102 can employ intelligent recognition techniques (e.g., spatial relationship recognition, pattern recognition, object recognition, facial recognition, animal recognition, pose recognition, action recognition, shape recognition, scene recognition, behavior recognition, sound recognition, scent recognition, voice recognition, audio recognition, image recognition, motion recognition, hue recognition, feature recognition, edge recognition, texture recognition, timing recognition, location recognition, and/or any other suitable recognition technique) to determine the conditions, characteristics, or features of the environment based at least in part on the information obtained by one or more sensors or instruments.

The awareness component 1100 also can include a self-configuration component 1104 that can determine characteristics, capabilities, conditions, and/or features of the diffusion light device. The self-configuration component 1104 can generate or update a light profile of the diffusion light device based at least in part on the environment profile of the environment associated with the diffusion light device and the characteristics, capabilities, conditions, and/or features of the diffusion light device, in accordance with the defined light management criteria. The self-configuration component 1104 also can determine one or more objectives of the installation or location of the diffusion light device, and perform a self-configuration, automatic configuration, or dynamic configuration of the diffusion light device, in accordance with the one or more determined objectives and the light profile of the diffusion light device.

The awareness component 1100 also can comprise an operations manager component 1006 that can determine and execute one or more desired (e.g., suitable, acceptable, enhanced, or optimal) actions for the diffusion light device to perform to achieve the one or more determined objectives (e.g., to be responsive to the conditions or characteristics of the environment). For example, the operation component 1106 can employ intelligence (e.g., artificial intelligence) to monitor the environment for conditions relating to the characteristics according to the one or more determined objectives using one or more sensors or instruments, determine one or more desired (e.g., suitable, acceptable, enhanced, or optimal) actions for the diffusion light device (e.g., the light component, the diffusion component, and/or one or more instruments of the diffusion light device) to perform to achieve the one or more determined objectives based at least in part on the conditions relating to the characteristics and the determined capabilities, conditions, or features of the diffusion light device, and execute the one or more desired actions (e.g., responsive actions). In an example, the operation component 1106 can select actions from a library of actions stored in a data store or in one or more knowledges sources. In another example, the operation component 1106 can create actions to be performed by the diffusion light device based at least in part on artificial intelligence.

Figure 12:
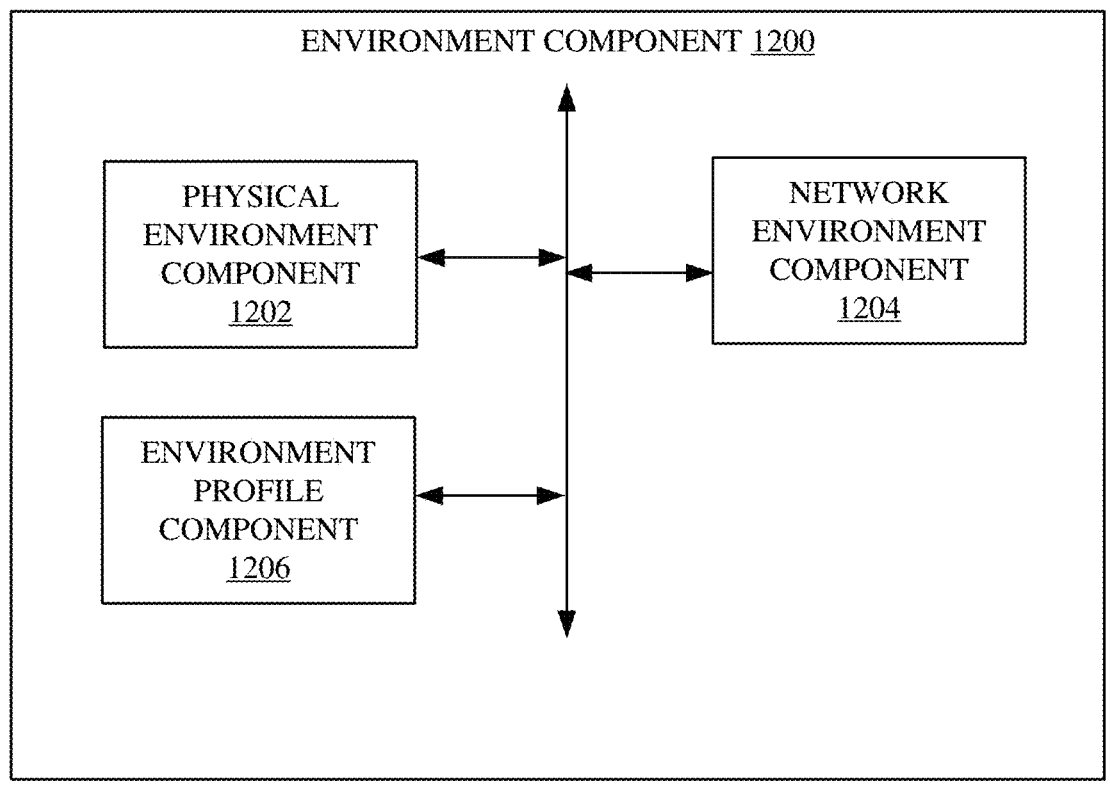
FIG. 12 depicts a block diagram of an example, non-limiting environment component, in accordance with one or more aspects and embodiments described herein.

FIG. 12 depicts a block diagram of an example, non-limiting environment component 1200, in accordance with one or more aspects and embodiments described herein. The environment component 1200 can comprise a physical environment component 1202 that can employ one or more sensors of a sensor component, as described herein, to obtain physical information about the physical environment in which the diffusion light device is installed or located. In an example, the physical environment component 1202 can employ a camera to obtain visual information about the environment. In another example, the physical environment component 1202 can employ a microphone to obtain audio information about the environment. In a further example, the physical environment component 1202 can employ a GPS device to obtain its location in the environment. In still another example, the physical environment component 1202 can employ an LIDAR sensor to obtain mapping information about the environment. In yet another example, the physical environment component 1202 can employ a GPS device and LIDAR sensor to map the locations of characteristics, conditions, or features recognized by the physical environment component 1202 in the environment. It is to be appreciated and understood that the physical environment component 1202 can employ any suitable sensor or instrument to obtain corresponding information produced by the sensor or instrument about the physical environment.

The environment component 1200 can comprise a network environment component 1204 that can employ one or more sensors or instruments as described herein to obtain information about the network environment in which the diffusion light device is installed or located. In an example, the network environment component 1204 can employ a communication device to discover communication networks operating in the environment. The network environment component 1204 can connect to one or more of the networks using suitable security and authentication schemes and obtain device information about devices and/or other flow management lights operating on the one or more networks. In a non-limiting example, device information regarding a device can comprise device type, device model number, device location, device functionality, device configuration, device security, communication protocols supported, or any other suitable attribute of a device. It is to be appreciated and understood that the network environment component 1204 can employ suitable security techniques to prevent unauthorized access to the diffusion light device while obtaining device information regarding other devices on the one or more networks. The diffusion light device (e.g., the light management component or the network environment component 1204) can determine what security and/or communication protocols it should employ and self-configure for operation using the appropriate security and/or communication protocols.

The environment component 1200 also can include an environment profile component 1206 that can create an environment profile that can describe the characteristics, conditions, and/or features of the environment in which the diffusion light device is installed or located based at least in part on the physical information and the device information obtained by the one or more sensors or instruments. For example, the environment profile component 1206 can employ intelligent recognition techniques to recognize characteristics, conditions, and/or features of the environment based at least in part on the physical information and the device information. In an additional example, the environment profile component 1206 can associate device information obtained from the devices with corresponding physical information associated with the devices obtained from sensors. The environment profile component 1206 also can employ knowledge resources (e.g., Internet, libraries, encyclopedias, databases, devices, or any other suitable knowledge resources) to obtain detailed information describing the characteristics, conditions, and/or features of the environment. For example, the environment profile component 1206 can obtain detailed product information related to recognized characteristics, conditions, or features of the environment. In another example, the environment profile component 1206 can obtain risk information related to recognized characteristics, conditions, or features of the environment. In a further example, the environment profile component 1206 can obtain information describing interaction between various recognized characteristics, conditions, or features of the environment. The environment profile component 1206 can obtain any suitable information associated with recognized characteristics, conditions, or features of the environment from any suitable knowledge resource.

Furthermore, the environment profile component 1206 can generate a confidence metric indicative of a confidence of a determination of a characteristic, condition, or feature that has been made by the environment profile component 1206 based at least in part on any suitable function. For example, the environment profile component 1206 can employ the multiple sources of information (e.g., physical information, device information, and information from knowledge sources) and perform a cross-check validation across the various sources to generate a confidence metric indicative of a confidence of an accuracy of a determination of a characteristic, condition, or feature.

The environment profile component 1206 can employ the characteristics, conditions, features, and/or any associated obtained information to generate the environment profile that describes the characteristics, conditions, or features of the environment. The environment profile component 1206 can organize the environment profile in any desired (e.g., suitable, acceptable, or optimal) manner, non-limiting examples of which can include an array, a table, a tree, a map, a graph, a chart, a list, network topology, or any other suitable manner of organizing data in a profile. In a non-limiting example, the environment profile can include respective entries for each characteristic, condition, or feature of the environment that comprise a detailed description of the characteristic, condition, or feature, a location of the characteristic, condition, or feature in the environment, tracking information describing changes to the characteristic, condition, or feature over time, source used to determine the characteristic, condition, or feature, confidence of accuracy of the determined characteristic, condition, or feature, or any other suitable information associated with the characteristic, condition, or feature. The environment profile can comprise a map of the environment identifying characteristics, conditions, or features, and their respective locations on the map.

Figure 13:
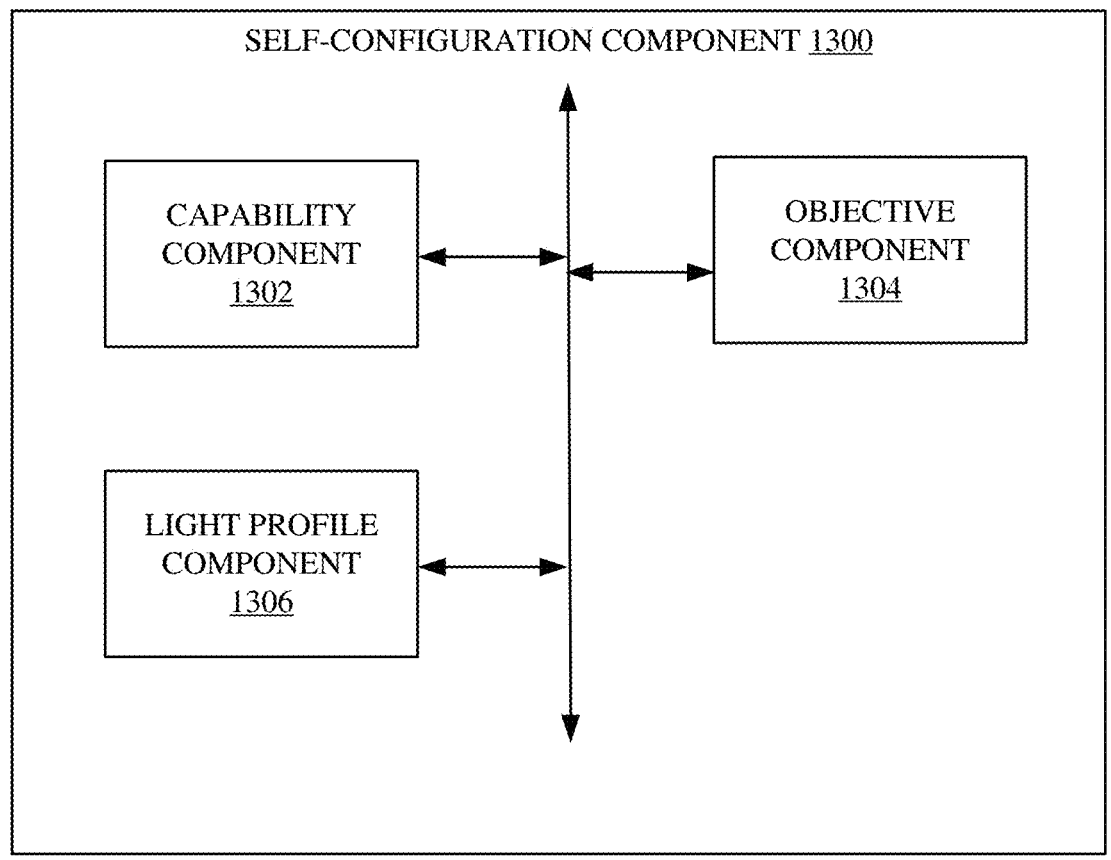
FIG. 13 presents a block diagram of an example, non-limiting self-configuration component, in accordance with one or more aspects and embodiments of the disclosed subject matter.

FIG. 13 presents a block diagram of an example, non-limiting self-configuration component 1300, in accordance with one or more aspects and embodiments of the disclosed subject matter. The self-configuration component 1300 can analyze the diffusion light device (e.g., characteristics, properties, components, features, and/or conditions of the diffusion light device) and/or information relating to the diffusion light device. Based at least in part on the results of the analysis, the self-configuration component 1300 can determine characteristics, properties, capabilities, features and/or conditions of the diffusion light device, determine one or more objectives of the installation or location of the diffusion light device, and perform a self-configuration, and/or an automatic or dynamic configuration, of the diffusion light device according to the one or more determined objectives.

The self-configuration component 1300 can include a capability component 1302 that can perform a self-examination of the diffusion light device to determine characteristics, properties, capabilities, features and/or conditions of the diffusion light device, including in relation to where the diffusion light device is installed or located. For example, the capability component 1302 can determine characteristics, properties, capabilities, features and/or conditions of the diffusion light device, such as, in non-limiting examples, power sources, computers, processor components (e.g., processors, microprocessors, controllers, . . . ), memories (e.g., data stores), programs, sensors, instruments, light component (e.g., light elements), diffusion component (e.g., diffusion capabilities and/or other light processing capabilities), or any other suitable capability of the diffusion light device. In an example, the capability component 1302 can probe a system bus to facilitate determining characteristics, properties, capabilities, features and/or conditions of the diffusion light device. In another example, the capability component 1302 can examine a memory (e.g., data store) for information regarding characteristics, properties, capabilities, features and/or conditions of the diffusion light device. In a further example, the capability component 1302 can obtain information regarding characteristics, properties, capabilities, features and/or conditions of the diffusion light device from one or more knowledge sources. It is to be appreciated and understood that the capability component 1302 can employ any suitable mechanism to determine the characteristics, properties, capabilities, features and/or conditions of the diffusion light device.

The self-configuration component 1300 also can include an objective component 1304 that can determine one or more objectives of the installation or location of the diffusion light device. For example, the objective component 1304 can employ intelligence (e.g., artificial intelligence) to determine an objective of the installation or location of the diffusion light device based at least in part on an environment profile of the environment associated with the diffusion light device and the determined characteristics, properties, capabilities, features and/or conditions of the diffusion light device. In a non-limiting example, an objective can be related to safety, automation, control, communication, instruction, entertainment, social enhancement, economics, mood enhancement, activity enhancement, notification, coordination, monitoring, intervention, time management, workflow management, or any other suitable objective. In an example, the objective component 1304 can select one or more objectives from a library of objectives stored in a data store or in one or more knowledges sources. In another example, the objective component 1304 can create one or more objectives based at least in part on artificial intelligence. In a further example, the objective component 1304 can create linked objectives, wherein one or more objectives can depend on one or more other objectives. For example, an objective can become active if another objective is achieved. In another example, an objective can become inactive if another objective is achieved. It is to be appreciated and understood that the objective component 1304 can employ any suitable mechanism to determine objectives of the diffusion light device.

The self-configuration component 1300 further can comprise a light profile component 1306 that can generate a light profile for (e.g., representative of) the diffusion light device based at least in part on the characteristics, properties, capabilities, features and/or conditions of the diffusion light device and/or the one or more determined objectives. The light profile can comprise or be based at least in part on the environment profile associated with the environment that is associated with the diffusion light device, characteristics, properties, capabilities, features and/or conditions of the diffusion light device, and objectives of the diffusion light device. The light profile component 1306 can organize the light profile in any desired (e.g., suitable or acceptable) manner, non-limiting examples of which can include an array, a table, a tree, a map, a graph, a chart, a list, a topology, or any other suitable manner of organizing data in a profile. In a non-limiting example, the light profile can include respective entries for each objective that comprise a detailed description of the objective, success metrics for the objective, tracking information describing changes to the objective over time, source used to determine the objective, confidence of accuracy of the determined objective, or any other suitable information associated with the objective. Furthermore, the light profile component 1306 can configure settings of one or more parameters of the diffusion light device (e.g., of the light component, light elements, diffusion component, processor component, data store, programs, sensor component, instrument component, light fixture, housing, lens, base component, socket component, or any other suitable parameters of components of the diffusion light device) to achieve the one or more objectives, and store the settings in the light profile.

Some of the processes performed by the components of or associated with the diffusion light device can be performed by specialized computers for carrying out defined tasks related to determining characteristics of the environment in which a diffusion light device is installed or located, determining capabilities of the diffusion light device, determining one or more objectives of the installation or location of the diffusion light device, performing a self-configuration of the diffusion light device according to the one or more determined objectives, and determining and executing suitable actions for the diffusion light device to perform to achieve the one or more determined objectives. The subject computer processing systems, methods, apparatuses, and/or computer program products can be employed to solve new problems that arise through advancements in technology, computer networks, the Internet, and the like. The subject computer processing systems, methods, apparatuses, and/or computer program products can provide technical improvements to systems for determining characteristics or properties of the environment in which the diffusion light device is installed or located, determining capabilities of the diffusion light device, determining one or more objectives of the installation of the diffusion light device, performing a self-configuration, and/or automatic or dynamic configuration, of the diffusion light device according to the one or more determined objectives, and determining and executing suitable actions for the diffusion light device to perform to achieve the one or more determined objectives by improving processing efficiency among processing components in these systems, reducing delay in processing performed by the processing components, reducing memory requirements, and/or improving the accuracy in which the processing systems are determining characteristics of the environment in which the diffusion light device is installed or located, determining capabilities of the diffusion light device, determining one or more objectives of the installation or location of the diffusion light device, performing a self-configuration, and/or automatic or dynamic configuration, of the diffusion light device according to the one or more determined objectives, and determining and executing suitable actions for the diffusion light device to perform to achieve the one or more determined objectives.

The embodiments of systems, devices, and/or methods described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 14-17. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 14:
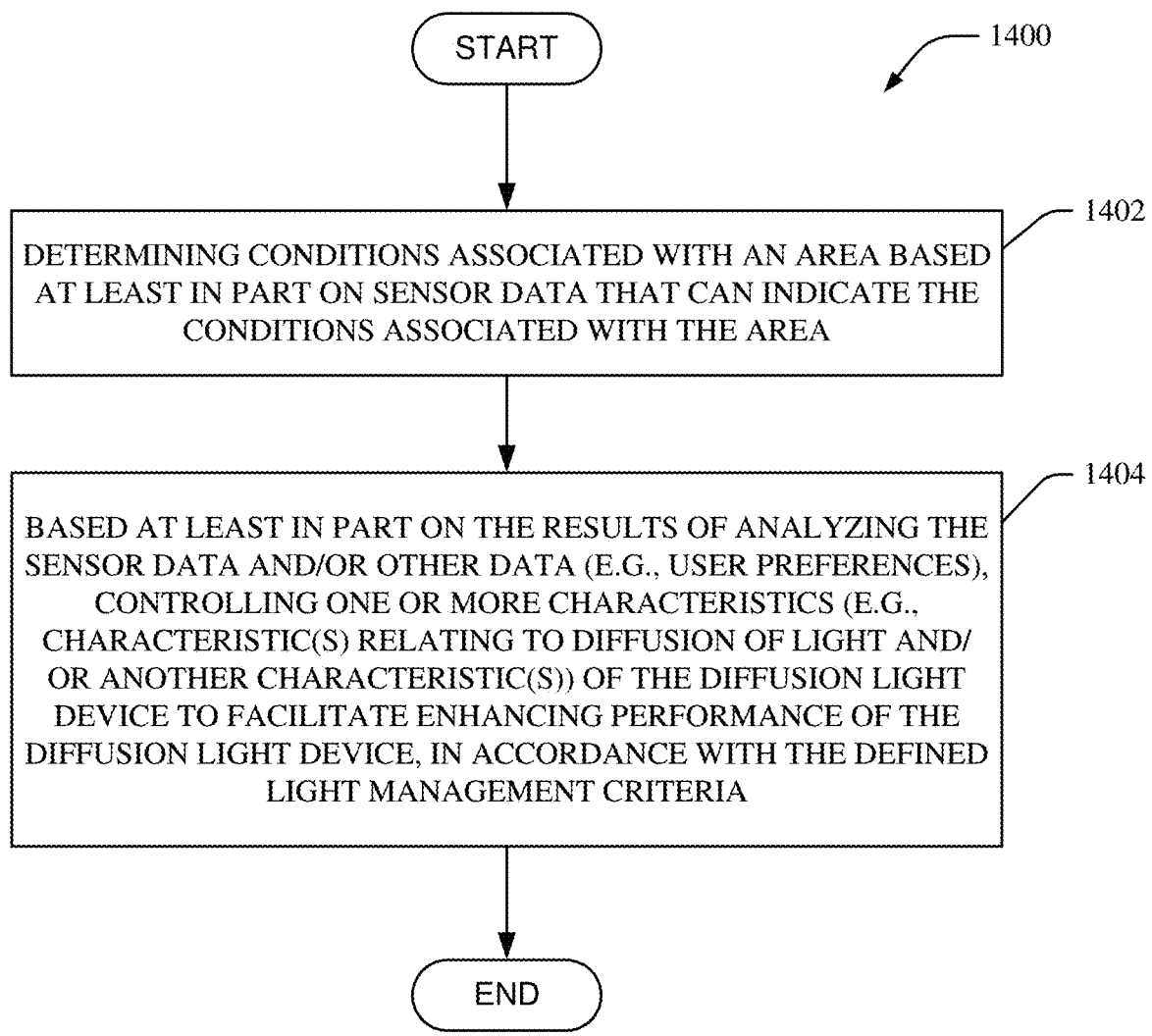
FIG. 14 illustrates a flow diagram of an example, non-limiting method that can facilitate controlling operation of one or more diffusion light devices, in accordance with various aspects and embodiments of the disclosed subject matter.

FIG. 14 illustrates a flow diagram of an example, non-limiting method 1400 that can facilitate controlling operation of one or more diffusion light devices, in accordance with various aspects and embodiments of the disclosed subject matter. The method 1400 can be employed, for example, by a system comprising a processor and/or a light management component of a diffusion light device.

At 1402, conditions associated with an area can be determined based at least in part on sensor data that can indicate the conditions associated with the area. The light management component can receive the sensor data from one or more sensors (e.g., of a sensor component) of or associated with the diffusion light device, wherein the sensor data can indicate the conditions (e.g., environmental conditions) associated with the area, as sensed by the one or more sensors of the sensor component. The light management component can analyze the sensor data to facilitate determining the conditions associated with the area and a responsive action (e.g., a modification) that can be taken with regard to the diffusion light device to control one or more characteristics of the diffusion light device based at least in part on the determined conditions associated with the area.

At 1404, based at least in part on the results of analyzing the sensor data and/or other data (e.g., user preferences of a user associated with the diffusion light device), one or more characteristics (e.g., characteristic(s) relating to diffusion of light and/or another characteristic(s)) of the diffusion light device can be controlled to facilitate enhancing performance of the diffusion light device, in accordance with the defined light management criteria. The light management component can control (e.g., modify or facilitate modifying) the one or more characteristics of the diffusion light device, based at least in part on the results of analyzing the sensor data and/or the other data, in accordance with the defined light management criteria. For instance, the light management component can control respective parameters or configurations (e.g., component configurations) associated with respective characteristics that are associated with respective components (e.g., light component, diffusion component, . . . ) of the diffusion light device, based at least in part on the results of analyzing the sensor data and/or the other data.

The light management component can continue to perform (e.g., automatically and/or dynamically perform) the method 1400 in real time, or substantially real time, to control operation of the diffusion light device, including controlling the one or more characteristics and/or configurations of the diffusion light device.

Figure 15:
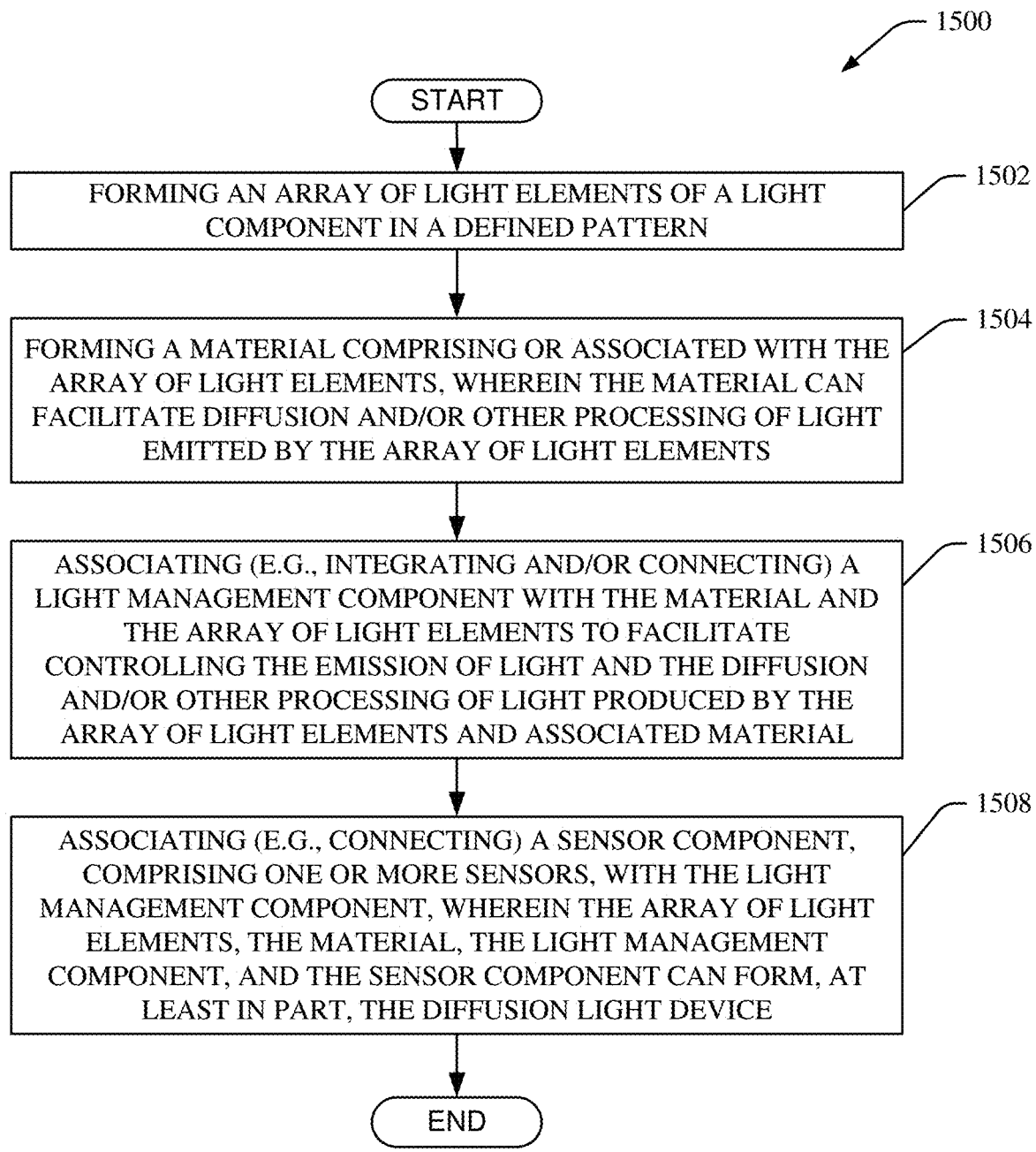
FIG. 15 depicts a flow diagram of an example, non-limiting method that can form a diffusion light device, in accordance with various aspects and embodiments of the disclosed subject matter.

FIG. 15 depicts a flow diagram of an example, non-limiting method 1500 that can form a diffusion light device, in accordance with various aspects and embodiments of the disclosed subject matter. The method 1500 can be employed, for example, by a system comprising a processor. A product (e.g., shirt, jacket, hat, visor, pants, shoes, case (e.g., briefcase), casing, housing, light device, lamp, lamp-related product, window shade, window) can be, can comprise, can be part of, or can be associated with, the diffusion light device.

At 1502, an array of light elements of a light component can be formed in a defined pattern. The system can facilitate determining the defined pattern and forming light elements (e.g., LEDs or other type of light elements) of the light component in the array in the defined pattern.

At 1504, a material comprising or associated with the array of light elements can be formed, wherein the material can facilitate diffusion and/or other processing of light emitted by the array of light elements. The system can form the material comprising and/or associated with the array of light elements, and wherein the material can be shaped and sized to form all or a portion of a product that can be or can comprise the diffusion light device. In accordance with various embodiments, the material can comprise the array of light elements and/or can be associated with (e.g., integrated with) the array of light elements. The portion of the material that can perform the diffusion of the light can be part of the diffusion component of the diffusion light device.

At 1506, a light management component can be associated with (e.g., integrated with and/or connected to) the material and the array of light elements to facilitate controlling the emission of light and the diffusion and/or other processing of light produced by the array of light elements and associated material. The light management component can control the emission of light and the diffusion and/or other processing of light produced by the array of light elements and associated material, in accordance with the defined light management criteria.

At 1508, a sensor component, comprising one or more sensors, can be associated with (e.g., connected to) the light management component, wherein the array of light elements, the material, the light management component, and the sensor component can form, at least in part, the diffusion light device. The one or more sensors of the sensor component can detect conditions associated with an area (e.g., an environment of the area) in which the diffusion light device is located. Based at least in part on the detected conditions, the one or more sensors can generate sensor data that can be communicated to the light management component.

The light management component can analyze the sensor data and/or other data (e.g., user preferences of a user of the diffusion light device, defined light management criteria, . . . ). Based at least in part on the results of analyzing the sensor data and/or other data, the light management component can control the emission of light and the diffusion and/or other processing of light produced by the array of light elements and associated material, in accordance with the defined light management criteria, as more fully described herein. For instance, the light management component can perform or facilitate the performing of adjustments to parameters, configurations, or characteristics of the array of light elements and/or adjustments to parameters, configurations, or characteristics of the material to facilitate controlling (e.g., adjusting, reconfiguring) the diffusion light device, including controlling (e.g., adjusting) the emission of light and the diffusion and/or other processing of light produced by the array of light elements and associated material.

Figure 16:
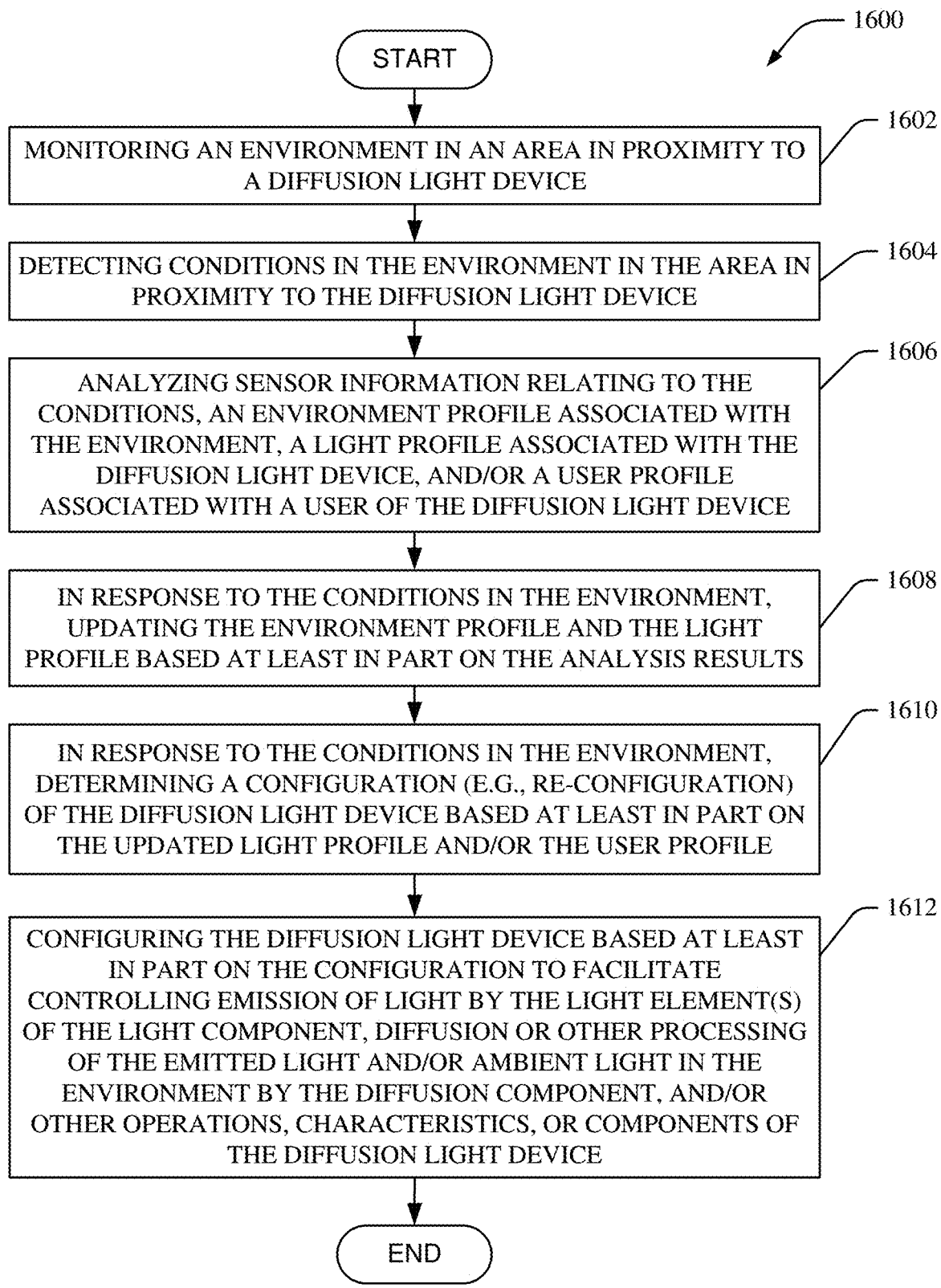
FIG. 16 depicts a flow diagram of another example, non-limiting method that can facilitate controlling operation of one or more diffusion light devices, in accordance with various aspects and embodiments of the disclosed subject matter.

FIG. 16 depicts a flow diagram of another example, non-limiting method 1600 that can facilitate controlling operation of one or more diffusion light devices, in accordance with various aspects and embodiments of the disclosed subject matter. The method 1600 can be employed, for example, by a system comprising a processor, a light management component, a sensor component, and/or an instrument component.

At 1602, an environment in an area in proximity to a diffusion light device can be monitored. One or more sensors of a sensor component of the diffusion light device can monitor the area.

At 1604, conditions (e.g., environmental conditions) can be detected in the environment in the area in proximity to the diffusion light device. One or more of the sensors can detect the conditions (e.g., change in conditions) in the environment in the area in proximity to the diffusion light device and can generate sensor information indicating, representing, and/or describing the conditions.

At 1606, the sensor information relating to the conditions, an environment profile associated with the environment, a light profile associated with the diffusion light device, and/or a user profile associated with a user of the diffusion light device can be analyzed. The light management component can receive the sensor information from one or more of the sensors. The light management component also can access and retrieve the environment profile, the light profile, and/or the user profile from a data store of the diffusion light device. The light management component can analyze the sensor information, the environment profile, the light profile and/or the user profile (e.g., comprising user preferences relating to operation, parameters, and/or configuration of the diffusion light device) to generate analysis results.

At 1608, in response to the conditions in the environment, the environment profile and the light profile can be updated based at least in part on the analysis results. To account for the conditions (e.g., change in conditions) in the environment, the light management component can determine respective updates to, and perform respective updates to, the environment profile and the light profile based at least in part on the analysis results.

At 1610, in response to the conditions in the environment, a configuration (e.g., re-configuration) of the diffusion light device can be determined based at least in part on the updated light profile and/or the user profile. To self-configure the flow management light to respond to the conditions in the environment, the flow management component can determine a configuration of the flow management light based at least in part on the updated light profile and/or user preferences in the user profile (e.g., based at least in part on the results of analyzing the updated light profile and/or the user preferences). The light profile can comprise information (e.g., light profile information) that can indicate or specify the configuration of various parameters of various components (e.g., a light element(s) of the light component, the diffusion component, an instrument(s) of the instrument component, a processor, a program(s), . . . ) of the diffusion light device. In some implementations, the light management component can structure the light profile to map respective configurations of respective parameters of respective components of the diffusion light device to respective conditions of the environment and/or to user preferences of the user.

At 1612, the diffusion light device can be configured based at least in part on the configuration to facilitate controlling emission of light by the light element(s) of the light component, diffusion or other processing of the emitted light and/or ambient light in the environment by the diffusion component, and/or other operations, characteristics, or components of the diffusion light device. The light management component can facilitate configuring the diffusion light device (e.g., respective components of the diffusion light device), in accordance with the configuration determined for the diffusion light device, based at least in part on the light profile and/or user profile, to facilitate controlling the emission of light by the light element(s), diffusion or other processing of the emitted light and/or the ambient light in the environment by the diffusion component, and/or other operations, characteristics, or components of the diffusion light device. For example, one or more respective parameters of one or more respective components of the diffusion light device can be configured (e.g., reconfigured), set, or adjusted to facilitate configuring (e.g., auto or self configuring) the respective components of the diffusion light device, in accordance with the light profile and/or the user profile.

The light management component can update (e.g., automatically or dynamically update) the environment profile and light profile in real time, or substantially real time, and/or in response to a condition detected in the environment in the area in proximity to the diffusion light device, to account for and respond to any changes in the environment in the area in proximity to the diffusion light device. The light management component can control (e.g., automatically or dynamically control), in real time or at least substantially real time, the configuration and the operation of the diffusion light device based at least in part the light profile (e.g., as updated) and/or the user profile associated with the user of the diffusion light device.

Figure 17:
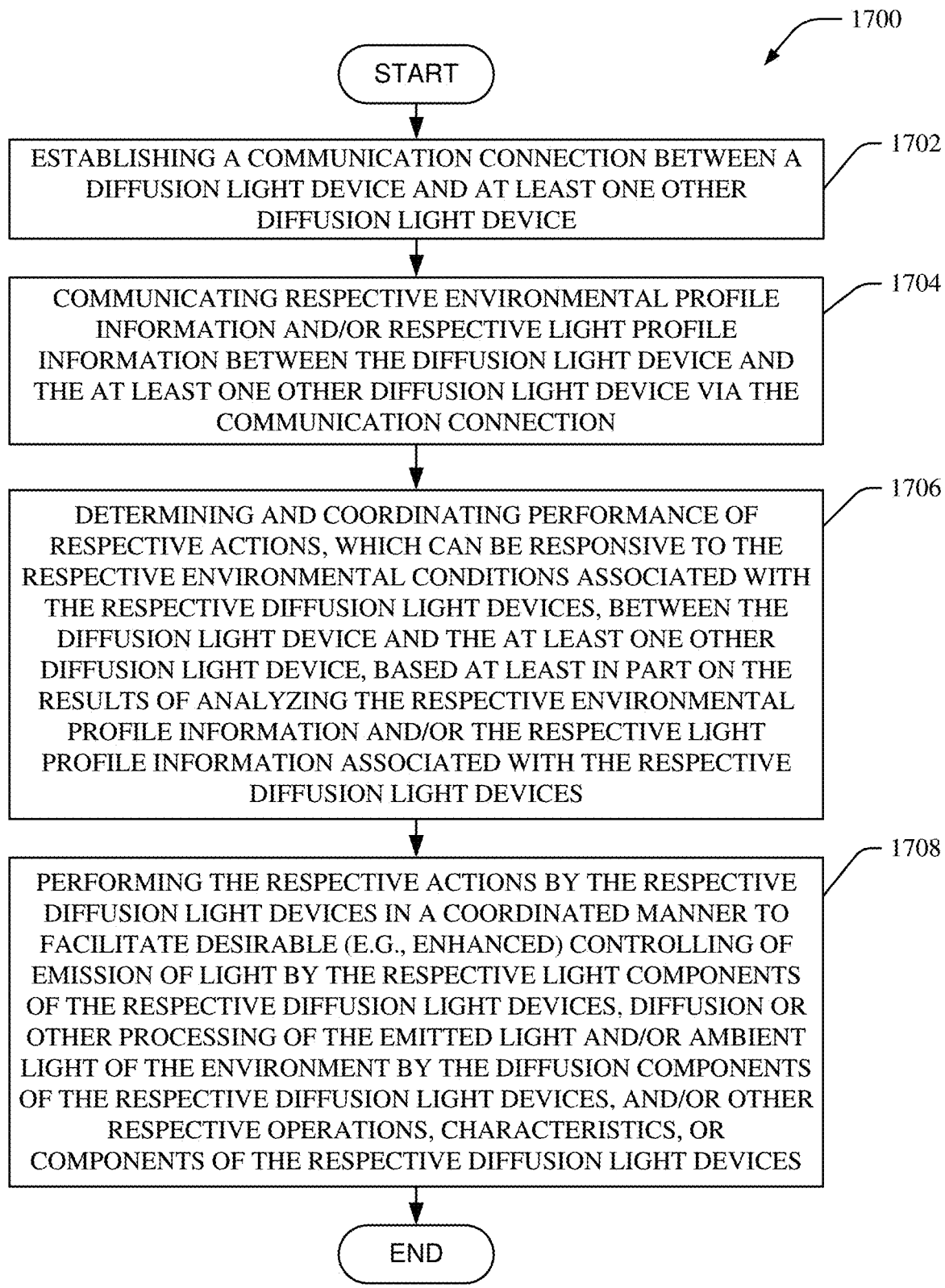
FIG. 17 illustrates a flow diagram of an example, non-limiting method that can facilitate controlling and coordinating respective operation of diffusion light devices, in accordance with various aspects and embodiments of the disclosed subject matter.

FIG. 17 illustrates a flow diagram of an example, non-limiting method 1700 that can facilitate controlling and coordinating respective operation of diffusion light devices, in accordance with various aspects and embodiments of the disclosed subject matter. The method 1700 can be employed, for example, by a system comprising respective processors and/or respective light management components of respective diffusion light devices.

At 1702, a communication connection can be established (e.g., created, generated) between a diffusion light device and at least one other diffusion light device. The diffusion light device can be associated with an area, and the at least one other diffusion light device can be associated with at least one other area, which can be completely distinct from the area or can partially cover (e.g., encompass) the area. The light management component (e.g., a network component of the light management component) can detect and contact the at least one other diffusion light device (e.g., at least one network component of at least one other light management component of the at least one other diffusion light device). The respective light management components can exchange network-related information and/or other information to facilitate setting up a communication connection (e.g., at least one communication connection) with each other, and can establish the communication connection between the diffusion light device and the at least one other diffusion light device based at least in part on the network-related information and/or other information. The communication connection can be a wireline communication connection and/or a wireless communication connection.

At 1704, respective environmental profile information and/or respective light profile information can be communicated between the diffusion light device and the at least one other diffusion light device via the communication connection. The diffusion light device can communicate the environment profile and the light profile associated with the diffusion light device to the at least one other diffusion light device, wherein the environment profile can comprise environmental profile information regarding the environmental conditions associated with the area associated with (e.g., in proximity to) the diffusion light device, and the light profile can comprise light profile information regarding the features (e.g., characteristics, attributes, functions, . . . ) of the diffusion light device. The at least one other diffusion light device can communicate at least one environment profile and at least one light profile associated with the at least one other diffusion light device to the diffusion light device, wherein the at least one other environment profile can comprise environmental profile information regarding the environmental conditions associated with the at least one other area associated with (e.g., in proximity to) the at least one other diffusion light device, and the at least one other light profile can comprise light profile information regarding the features (e.g., characteristics, attributes, functions, . . . ) of the at least one other diffusion light device.

At 1706, respective actions, which can be responsive to the respective environmental conditions associated with the respective diffusion light devices, can be determined and coordinated (e.g., performance of the respective actions can be coordinated) between the diffusion light device and the at least one other diffusion light device, based at least in part on the results of analyzing the respective environmental profile information and/or the respective light profile information associated with the respective diffusion light devices. The light management component of the diffusion light device, and/or the at least one other light management component of the at least one other diffusion light device, can analyze (e.g., respectively analyze) the respective environmental profile information and/or the respective light profile information associated with the respective diffusion light devices. Based at least in part on the results (e.g., the respective results) of the analysis (e.g., the respective analysis), the light management component and/or the at least one other light management component can determine the respective actions (e.g., action to emit light, action to diffuse the light and emit diffused light, or other action) that are to be performed by the respective diffusion light devices, in accordance with the defined light management criteria. The light management component and the at least one other light management component can negotiate and coordinate with each other to facilitate determining the respective actions that the respective diffusion light devices are to perform to be responsive to the respective environmental conditions associated with the respective diffusion light devices.

At 1708, the respective actions can be performed by the respective diffusion light devices in a coordinated manner to facilitate desirable (e.g., enhanced) controlling of emission of light by the respective light components of the respective diffusion light devices, diffusion or other processing of the emitted light and/or ambient light of the environment by the diffusion components of the respective diffusion light devices, and/or other respective operations, characteristics, or components of the respective diffusion light devices. The diffusion light device and the at least one other diffusion light device can perform their respective actions in a coordinated manner to be responsive to the respective environmental conditions associated with the respective diffusion light device. The respective light management components, respective instrument components, respective processor components, etc., of the respective diffusion light device scan facilitate the respective performance of the respective actions by the respective diffusion light devices.

Figure 18:
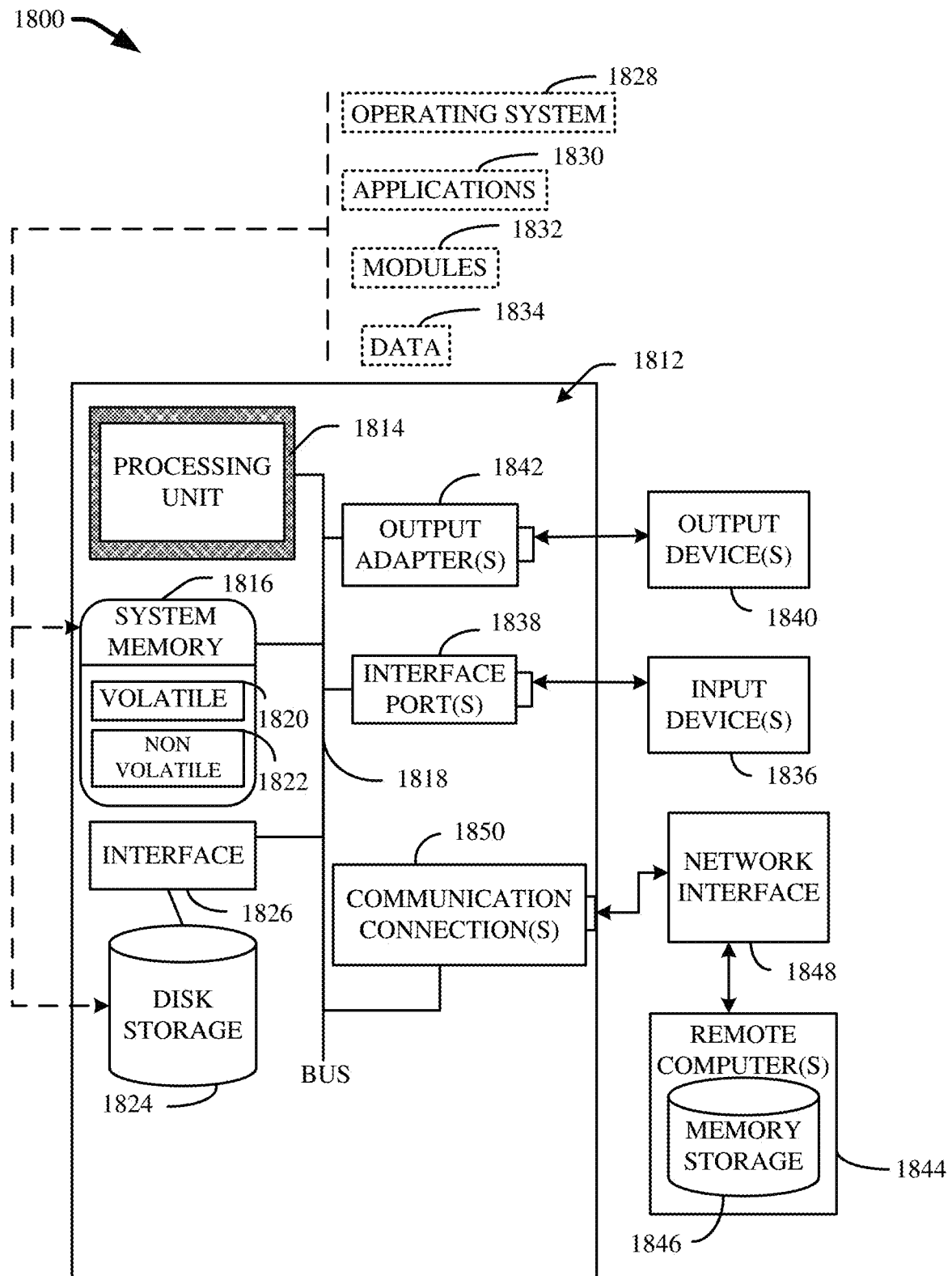
FIG. 18 illustrates a block diagram of an example, non-limiting operating environment in which one or more embodiments described herein can be facilitated.
Figure 19:
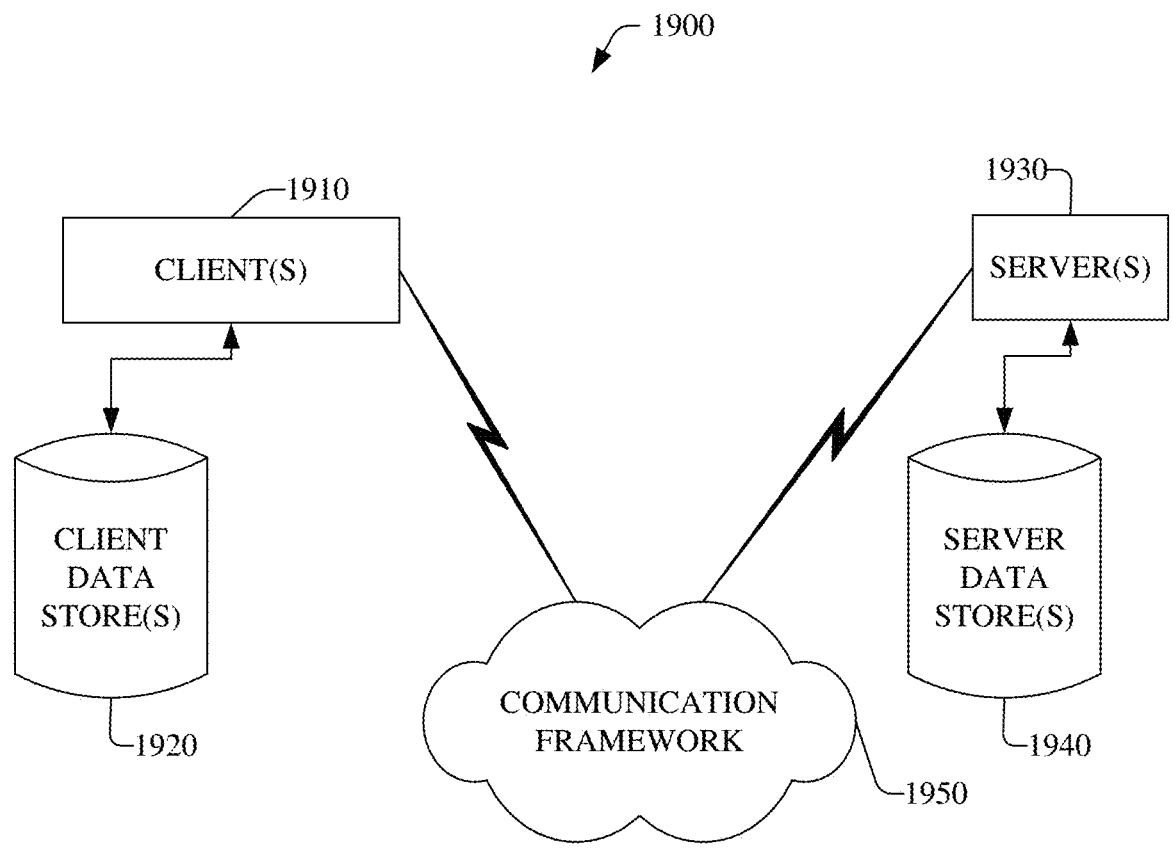
FIG. 19 is a schematic block diagram of a sample-computing environment.

In order to provide a context for the various aspects of the disclosed subject matter, FIGS. 18 and 19 as well as the following discussion are intended to provide a general description of a suitable environment in which the various aspects of the disclosed subject matter can be implemented. FIG. 18 illustrates a block diagram of an example, non-limiting operating environment in which one or more embodiments described herein can be facilitated. Repetitive description of like elements employed in other embodiments described herein is omitted for sake of brevity.

With reference to FIG. 18, a suitable operating environment 1800 for implementing various aspects of this disclosure can also include a computer 1812. The computer 1812 can also include a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814. The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394, IEEE 1494), and Small Computer Systems Interface (SCSI). The system memory 1816 can also include volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1812 can also include removable/non-removable, volatile/non-volatile computer storage media. FIG. 18 illustrates, for example, a disk storage 1824. Disk storage 1824 can also include, but is not limited to, devices like a magnetic disk drive, floppy disk drive, tape drive, Jaz drive, Zip drive, LS-100 drive, flash memory card, or memory stick. The disk storage 1824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used, such as interface 1826. FIG. 18 also depicts software that acts as an intermediary between users and the basic computer resources described in the suitable operating environment 1800. Such software can also include, for example, an operating system 1828. Operating system 1828, which can be stored on disk storage 1824, acts to control and allocate resources of the computer 1812. System applications 1830 take advantage of the management of resources by operating system 1828 through program modules 1832 and program data 1834, e.g., stored either in system memory 1816 or on disk storage 1824. It is to be appreciated that this disclosure can be implemented with various operating systems or combinations of operating systems. A user enters commands or information into the computer 1812 through input device (s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port can be used to provide input to computer 1812, and to output information from computer 1812 to an output device 1840.

Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a computer, a server, a router, a network PC, a workstation, a microprocessor based appliance, a peer device or other common network node and the like, and typically can also include many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1850 refers to the hardware/software employed to connect the network interface 1848 to the system bus 1818. While communication connection 1850 is shown for illustrative clarity inside computer 1812, it can also be external to computer 1812. The hardware/software for connection to the network interface 1848 can also include, for exemplary purposes only, internal and external technologies such as, modems including regular telephone grade modems, cable modems and DSL modems, ISDN adapters, and Ethernet cards.

FIG. 19 is a schematic block diagram of a sample-computing environment 1900 (e.g., computing system) with which the subject matter of this disclosure can interact. The system 1900 includes one or more client(s) 1910. The client(s) 1910 can be hardware and/or software (e.g., threads, processes, computing devices). The system 1900 also includes one or more server(s) 1930. Thus, system 1900 can correspond to a two-tier client server model or a multi-tier model (e.g., client, middle tier server, data server), amongst other models. The server(s) 1930 can also be hardware and/or software (e.g., threads, processes, computing devices). The servers 1930 can house threads to perform transformations by employing this disclosure, for example. One possible communication between a client 1910 and a server 1930 may be in the form of a data packet transmitted between two or more computer processes.

The system 1900 includes a communication framework 1950 that can be employed to facilitate communications between the client(s) 1910 and the server(s) 1930. The client(s) 1910 are operatively connected to one or more client data store(s) 1920 that can be employed to store information local to the client(s) 1910. Similarly, the server(s) 1930 are operatively connected to one or more server data store(s) 1940 that can be employed to store information local to the servers 1930.

It is to be appreciated and understood that components (e.g., diffusion light device, light component, diffusion component, light management component, sensor component, instrument component, network component, processor component, data store, . . . ), as described with regard to a particular system or method, can include the same or similar functionality as respective components (e.g., respectively named components or similarly named components) as described with regard to other systems or methods disclosed herein.

Embodiments of the disclosed subject matter can be a system, a method, an apparatus and/or a machine (e.g., computer) program product at any possible technical detail level of integration. The machine program product can include a machine (e.g., computer) readable storage medium (or media) having machine readable program instructions thereon for causing a processor to carry out aspects of the disclosed subject matter. The machine readable storage medium can be a tangible device that can retain and store instructions for use by an instruction execution device. The machine readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the machine readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A machine readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Machine readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives machine readable program instructions from the network and forwards the machine readable program instructions for storage in a machine readable storage medium within the respective computing/processing device. Machine readable program instructions for carrying out operations of various aspects of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The machine readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the machine readable program instructions by utilizing state information of the machine readable program instructions to customize the electronic circuitry, in order to perform aspects of the disclosed subject matter.

Aspects of the disclosed subject matter are described herein with reference to flowchart illustrations and/or block diagrams of methods, apparatus (systems), and machine program products according to embodiments of the disclosed subject matter. It will be understood that each block of the flowchart illustrations and/or block diagrams, and combinations of blocks in the flowchart illustrations and/or block diagrams, can be implemented by machine readable program instructions. These machine readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These machine readable program instructions can also be stored in a machine readable storage medium that can direct a computer, a programmable data processing apparatus, and/or other devices to function in a particular manner, such that the machine readable storage medium having instructions stored therein comprises an article of manufacture including instructions which implement aspects of the function/act specified in the flowchart and/or block diagram block or blocks. The machine readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosed subject matter has been described above in the general context of machine (e.g., computer)-executable instructions of a machine program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the disclosed machine (e.g., computer)-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executed computer executable components stored in memory;
   a sensor component that senses ambient conditions;
   a light component that emits light;
   a diffusion component that diffuses light emitted by the light component; and
   a light management component that analyzes the sensed ambient conditions and controls the diffusion component to diffuse the emitted light.

2. The system of claim 1, wherein the light management component determines an environment profile relating to environmental conditions associated with an area.

3. The system of claim 1, wherein the light management component is further configured to analyze light characteristics data relating to characteristics of the light component and the environment profile, and determine a light profile associated with the light device based at least in part on a second analysis result of the analysis of the characteristics and the environment profile.

4. A method, comprising:
   sensing, by a system, ambient conditions;
   emitting light, by the system;
   diffusing, by the system, the emitted light component; and
   analyzing, by the system, the sensed ambient conditions and controlling diffusion of the emitted light.

5. The system of claim 1, wherein the diffusion component is further configured to diffuse at least one light associated with light component and to emit the diffused light into at least one area.

6. The system of claim 5, wherein the diffusion component is at least partially formed of a fabric that is configurable to diffuse the at least one of light to produce the diffused light.

7. The system of claim 6, wherein the fabric is a light-emitting-diode fabric comprising at least one light emitting diode of the light component, and wherein the light emitting diode emits at least a portion of the light.

8. The system of claim 1, wherein the light management component is further configured to control operation of the diffusion component, including control of configuration of the fabric of the diffusion component to control the diffusion of at least one of the light or the other light to produce the diffused light based at least in part on the light profile.

9. The system of claim 1, wherein the sensor component comprises one or more sensors configured to sense the environmental conditions associated with the area and generate sensor data based at least in part on the sensing of the ambient condition.

10. The system of claim 1, wherein the light management component is further configured to receive the sensor data from the sensor component, analyze the sensor data, and determine an environment profile relating to the environmental conditions associated with the area based at least in part on a first analysis result of the analysis of the sensor data.

11. The system of claim 1, wherein the light management component is further configured to analyze light characteristics data relating to the characteristics of the diffusion light device and the environment profile, and determine the light profile associated with the diffusion light device based at least in part on a second analysis result of the analysis of the characteristics and the environment profile.

12. The system of claim 1, wherein the light management component is further configured to control emission of the light and control configuration of the fabric to control diffusion of the light to produce the diffused light comprising customized information, based at least in part on the light profile, wherein the customized information is presented, by the diffusion light device, as an output to the area, wherein the customized information comprises at least one of a customized visual image or customized textual information, and wherein the light profile is determined based at least in part on the characteristics of the diffusion light device and a result of an analysis of sensor data relating to the environmental conditions associated with the area.

13. The system of claim 1, wherein the light management component is further configured to receive diffusion-related parameter data from a device via a communication connection and determine a diffusion parameter value for a diffusion parameter of the diffusion component based at least in part on a result of an analysis of the diffusion-related parameter data, sensor data relating to the environmental conditions, and characteristics data relating to the characteristics of the diffusion light device, to facilitate the control of the diffusion of the light to produce the diffused light.

14. The system of claim 1, wherein, based at least in part on the light profile, the light management component is further configured to determine at least one action to perform in response to the environmental conditions associated with the area and facilitate performance of the at least one action by at least one of the diffusion component, the light component, or an instrument of an instrument component of or associated with the diffusion light device.

15. The system of claim 1, wherein the machine-executable components further comprise a network component configured to create a communication connection between the diffusion light device and at least one other diffusion light device, wherein the light management component is further configured to control the diffusion light device to have the diffusion light device communicate with the at least one other diffusion light device to coordinate operation of the diffusion light device with at least one operation of the at least one other diffusion light device, and wherein the communication connection is at least one of a wireline communication connection or a wireless communication connection.

16. The system of claim 1, wherein the light management component is further configured to facilitate presenting a user interface that is configured to receive user input from a user and, based at least in part on the user input, modify a diffusion parameter of the diffusion component, a light parameter of the light component, or at least a portion of light profile data in the light profile;

and wherein the light management component is further configured to determine at least one context of at least one of a user, a vehicle, vehicle traffic, an object, or an entity associated with the area based at least in part on a result of an analysis of sensor data relating to the environmental conditions associated with the area, and control at least one operation of the diffusion light device based at least in part on the at least one context.

17. The method of claim 4, further comprising:
establishing, by the system, a communication connection between the device and another device; and
receiving, by the system, from the other device via the communication connection, at least one of another light profile or information regarding other conditions associated with another area associated with the other device, wherein the controlling at least one of the emission of the light or the diffusion of the light comprises controlling the emission of the light or the diffusion of the light based at least in part on at least one of the other light profile or the information regarding the other conditions associated with the other area;
analyzing, by the system, condition information relating to the conditions associated with the area;
determining, by the system, the conditions associated with the area based at least in part on a first result of the analyzing the condition information; and
in response to determining the conditions associated with the area, controlling, by the system, a diffusion parameter based at least in part on the light profile to facilitate the controlling the diffusion of the light.

18. A device, comprising:
a light component configured to emit light to facilitate illumination of an area associated with the device;
a sensor component configured to comprise one or more sensors configured to sense conditions associated with the area and generate sensor data based at least in part on the sensing of the conditions;
a diffusion component configured to diffuse at light associated with the area to produce diffused light;
a memory that stores machine-executable components; and
a processor that executes the machine-executable components stored in the memory, wherein the machine-executable components comprise:
a light management component configured to generate a light profile for the device based at least in part on characteristics of the device and the sensor data relating to the conditions associated with the area, and wherein the light management component is further configured to control operation of the diffusion component, including control of configuration of the material of the diffusion component, to control the diffusion of the light to produce the diffused light based at least in part on the light profile.

19. The device of claim 18, wherein the diffusion component is further configured to emit the diffused light to the area, and wherein at least a portion of the diffusion component is formed of a material that is configurable to diffuse the light to produce the diffused light.

* * * * *